United States Patent [19]

Blum et al

[11] Patent Number: 5,237,408
[45] Date of Patent: Aug. 17, 1993

[54] RETROFITTING DIGITAL VIDEO SURVEILLANCE SYSTEM

[75] Inventors: Jeffrey D. Blum, Potomac, Md; Mark J. Sandford, Manassas, Va.

[73] Assignee: Presearch Incorporated, Fairfax, Va.

[21] Appl. No.: 740,390

[22] Filed: Aug. 2, 1991

[51] Int. Cl.⁵ ............................................... H04N 7/18
[52] U.S. Cl. ....................................... 358/108; 358/181
[58] Field of Search ................ 358/108, 181, 100, 210

[56] References Cited

U.S. PATENT DOCUMENTS

| | | | |
|---|---|---|---|
| 4,511,886 | 4/1985 | Rodriguez | 340/534 |
| 4,628,362 | 12/1986 | Waehner | 358/174 |
| 4,814,869 | 3/1989 | Oliver, Jr. | 358/108 |
| 4,876,597 | 10/1989 | Roy et al. | 358/141 |
| 4,943,854 | 7/1990 | Shiota et al. | 358/108 |
| 5,109,278 | 4/1992 | Erickson et al. | 358/108 |
| 5,111,291 | 5/1992 | Erickson et al. | |

OTHER PUBLICATIONS

Considerations in the Design of Video Storage for Security Surveillance Systems, Jancowskis and Dusalis, May 18, 1979, pp. 139-142.
Final Draft, Corps of Engineers Guide Specification (CEGS 16751) Developed by U.S. Army Engineer Division, 1989, p. 27.
NAC Publication, Test Report for the Video Storage System (VSS), TR-2278, Apr. 1980.
NSSC Mark I and Mark IV documentation.
American Dynamics brochure.

*Primary Examiner*—Victor R. Kostak
*Attorney, Agent, or Firm*—Jacobson, Price, Holman & Stern

[57] ABSTRACT

A system which retrofits to an existing surveillance system and cooperates with sensors, video cameras and video monitors of the existing surveillance system. The system comprises a plurality of processing boards having a substantially similar architecture. Several frame grabber/frame storage processing boards are provided, each of which digitize the analog video signals from the video cameras and stores the digital data in a solid state buffer memory. Several display boards are provided to display the digitized video data on display monitors. A controller board controls the exchange of video data and command or control messages over a video link and between processing boards, respectively. Additional expansion boards may be added to support additional buffering and system options. Each processing board is built around a parallel processing computer chip.

27 Claims, 13 Drawing Sheets

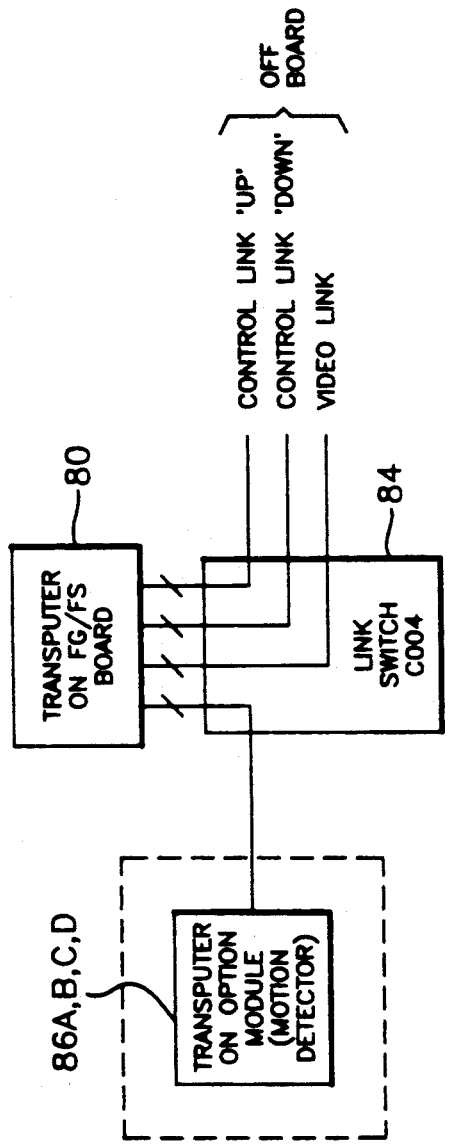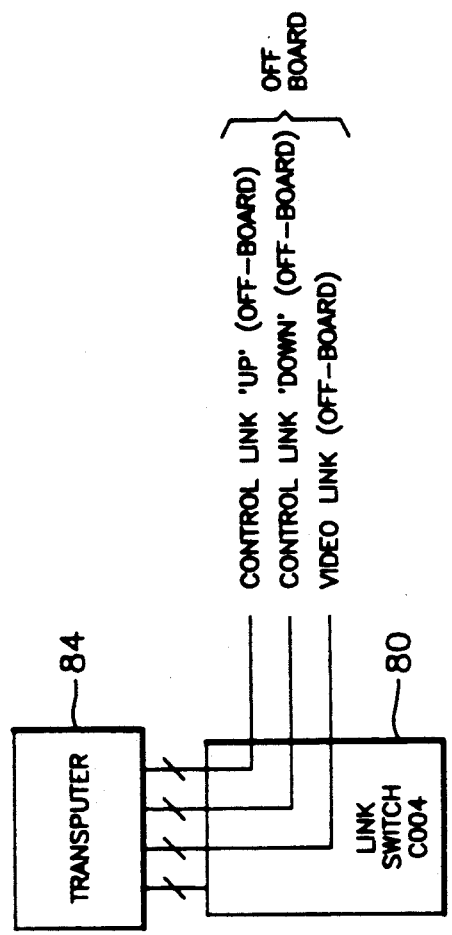

1 ALARM

2 ALARMS

FIG. 18

| TIME | ZONE | TYPE |
|---|---|---|
| ▷ 0805  6/10/91 | 07 | MOTION |
| ▵ | | |

| CLEARED ALARMS | | |
|---|---|---|
| 0801  6/9/91 | 06 | TAMPER |

FIG. 17

| ALARM CAUSE | |
|---|---|
| ANIMAL | |
| WIND | |
| RAIN | |

RETROFITTING DIGITAL VIDEO SURVEILLANCE SYSTEM

BACKGROUND OF THE INVENTION

The present invention relates to a digital video surveillance system and more particularly to a system which connects to and integrates with existing video camera networks, alarm security and other process monitoring systems to enhance physical protection of high-value assets and installations.

Automated security systems have become extremely valuable for protecting highly sensitive facilities. Many security systems available today provide for real-time evaluation of images as viewed by video cameras. Alarm conditions are declared when a sensor detects an intrusion or other abnormal event within the field of view of a camera. See, for example, U.S. Pat. Nos. 4,876,597 to Roy et al., 4,943,854 to Shiota et al. and 4,511,886 to Rodriguez.

Furthermore, some systems now available have the ability to digitize and store video images of a sequence just prior to, during and after an alarm condition. This allows an operator to view what caused the alarm condition so as to take the appropriate action (or inaction). This feature is known as "pre-alarm image recall".

It has been recognized that a security system often must be designed and actually "specialized" or configured for a particular application. For example, there are security systems known which are designed to monitor areas in nuclear power plant facilities. These types of security systems are, however, limited to use only in nuclear power facilities and would need to be completely revised and redesigned to work in other applications. Further, these systems each address only one aspect of physical security providing, for example, only pre-alarm image recall, motion detection or image storage. That the prior security systems of this type are so limited in use is a major draw-back in the art.

SUMMARY OF THE INVENTION

It is a primary object of the present invention to provide a digital video surveillance system capable of addressing all aspects of physical security with flexibility for adaption for use in an unlimited number of applications. Specifically, the system according to the present invention provides configuration options to enhance detection, transmit images, assess alarms, improve response force allocation, documentation and guard-force training at secure facilities.

It is another object of the present invention to provide a retrofitting digital video surveillance system to connect to and integrate with an existing security or other process monitoring system to enhance the capabilities of the existing system.

It is another object of the present invention to provide a retrofitting digital video surveillance system which is flexible in installation with an existing security system.

It is yet another object of the present invention to provide a digital video surveillance system to which functions may easily be augmented according to particular applications, and which can integrate with an existing security or process monitoring system.

It is still another object of the present invention to provide a retrofitting digital video surveillance system employing parallel processing computer architecture to achieve complete modularity, expandability and flexibility in configuration.

Briefly, the present invention relates to a digital video surveillance system which preferably retrofits to an existing security system and cooperates with alarm sensors, video cameras and video monitors of the existing security system. The digital video surveillance system comprises a plurality of processing boards having a substantially similar architecture. Several frame grabber/frame storage processing boards are provided, each of which digitizes the analog video signals from the video cameras and stores the digital data in a solid state buffer memory. Several display boards are provided to display the digitized video data on dedicated display monitors. A controller board is further provided to control the exchange of video data and command or control messages over communication links and between processing boards, respectively. Additional expansion boards may be added to support additional buffering and system options. Each processing board is built around a parallel processing computer chip.

The present invention interfaces with security or process monitoring systems such as, for example, those used at facilities requiring real time alarm monitoring and video display of alarm conditions. In a broader sense, the utility of the present invention lies with any type of surveillance, security, personnel access control or other conditions which are monitored; such other conditions may be parameters of physical processes performed by machines.

The above and other objects and advantages will become more readily apparent when reference is made to the following description taken in conjunction with the accompanying drawings.

BRIEF DESCRIPTION OF THE DRAWINGS

FIGS. 6–8 are block diagrams illustrating the variations in which option modules are connected with the Transputer processor on the processing boards.

FIGS. 17 and 18 are views of examples of the display screen menus.

DETAILED DESCRIPTION OF THE DRAWINGS AND PREFERRED EMBODIMENT

Figure 1:
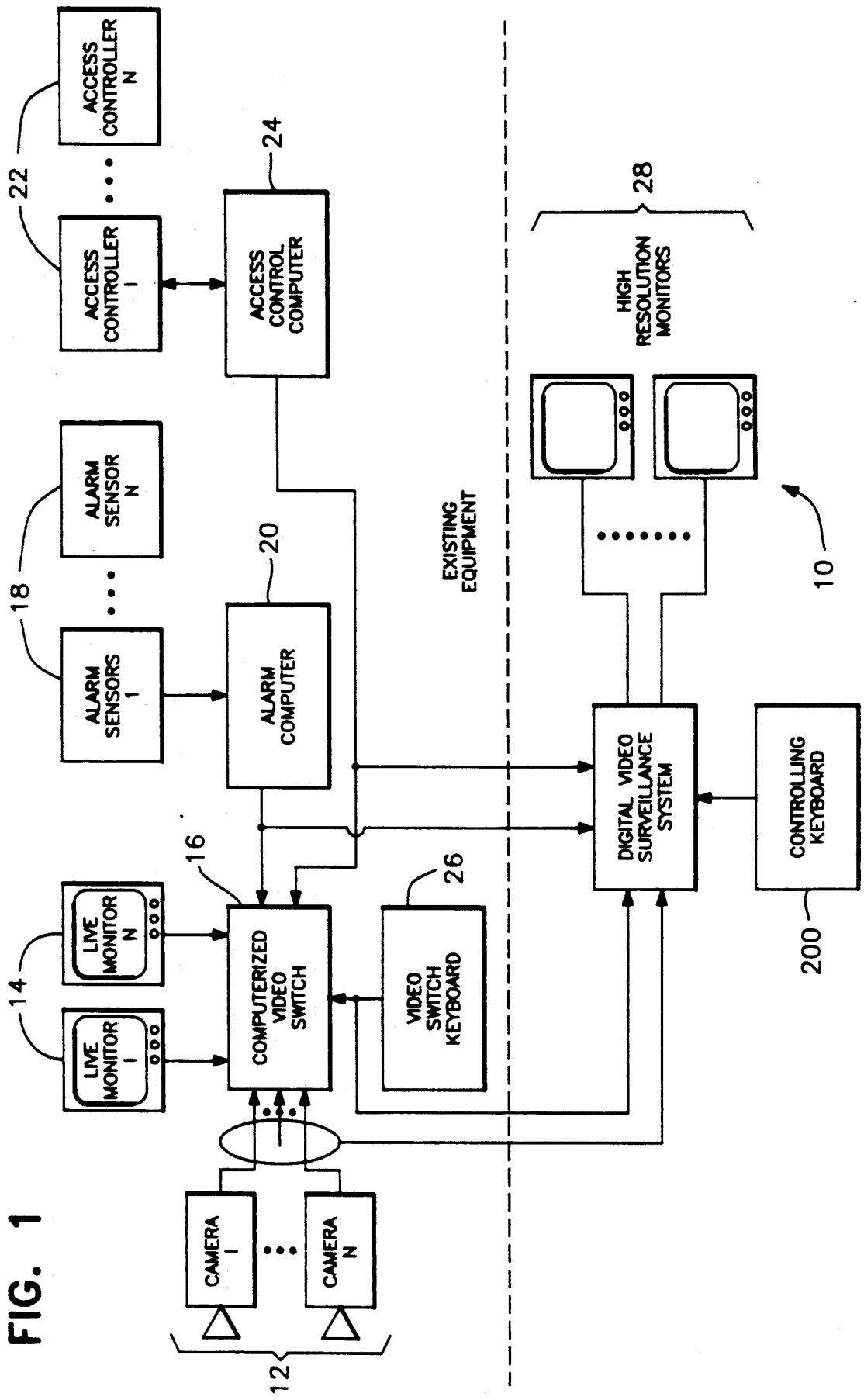
FIG. 1 is a block diagram illustrating the connection of the retrofitting digital video surveillance system with a conventional video camera network/alarm system.

With reference first to FIG. 1, some components of an existing security system are shown connected to the digital video surveillance system (hereinafter referred to as DVSS") 10 according to the present invention. The existing security system may comprise any number and variety of sensing devices but, for explanatory purposes, it is shown to comprise N video cameras 12, N live video monitors 14, a computerized video switch 16 with an associated video switch keyboard 26, alarm sensors 18 with an associated alarm computer 20, access controllers 22 with an associated access control computer 24. The alarm sensors may monitor intrusion, fire, process control, temperature or other situations. The access control computer 24 monitors and controls, for example, personnel access to doors and gates.

The computerized video switch 16 is controlled by the alarm computer 20 and the access control computer 24. Both the alarm computer 20, which monitors the status of the alarm sensors 18, and the access control computer 24 send signals to the computerized video switch 16 to display the live view from the cameras 12 located in protected areas when any of the alarm sensors 18 are tripped or an attempt is made to violate the access control system through the access controller 22. The video switch keyboard 26 allows an operator to manually route a video signal from any camera to any live video monitor.

To integrate the DVSS 10 with an existing security system (also hereinafter referred to as the host security system), all of the input signals to the video switch 16 are tapped so that the DVSS 10 can respond to all events, whether computer or operator generated. Also tapped are the analog video signals from the cameras 12 so that the DVSS 10 may digitize the video data.

Figure 2:
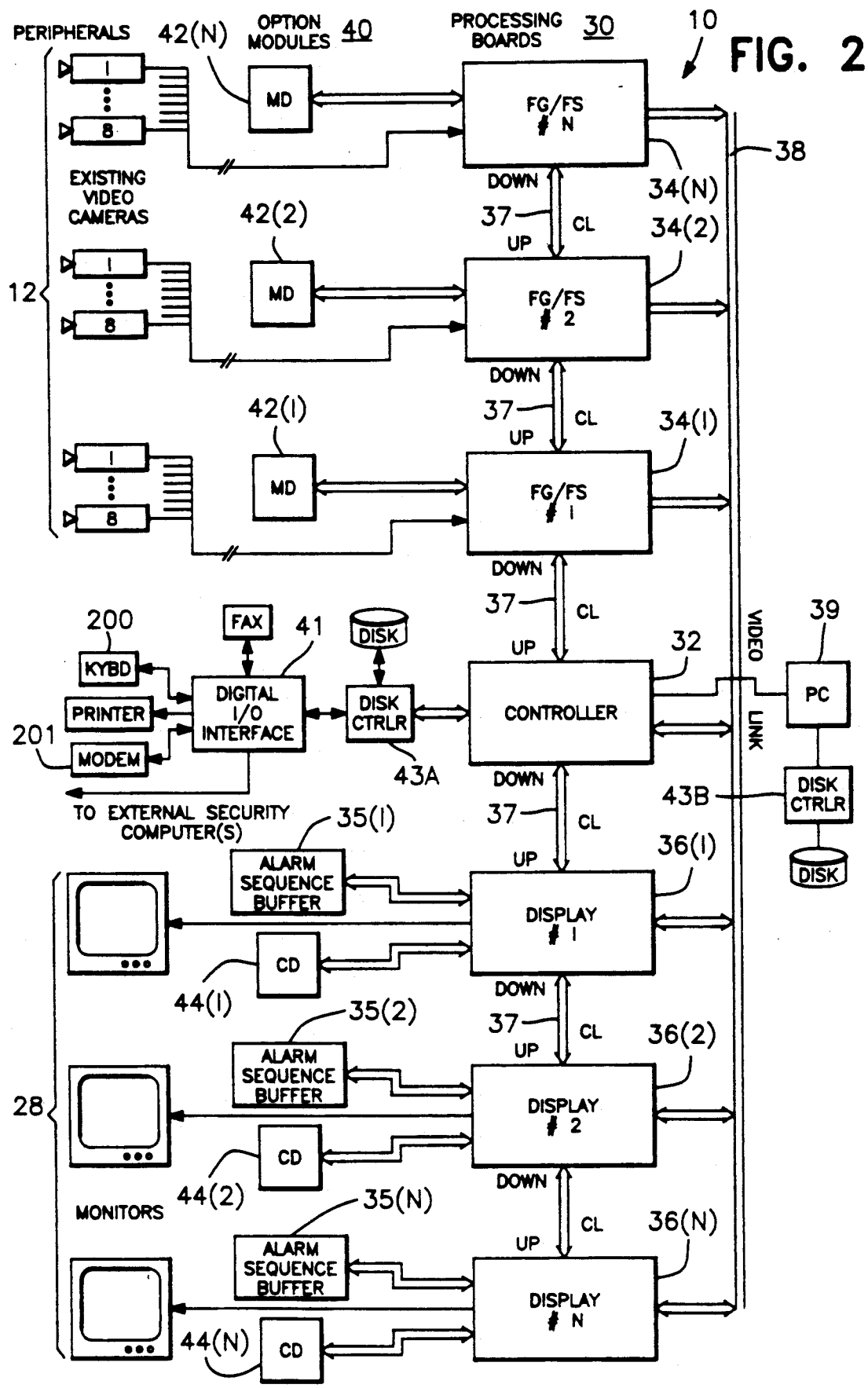
FIG. 2 is a block diagram illustrating the architecture of the retrofitting digital video surveillance system according to the present invention.

FIG. 2 illustrates in detail the architecture of the retrofitting DVSS 10. The DVSS 10 may be configured in many variations depending upon the particular use of the system and the existing security system with which the DVSS 10 integrates.

The heart of the DVSS 10 is the array of processing boards 30. The processing boards are variations of a custom board on which integrated circuit chips are installed. There are three types of processing boards: 1) a controller board 32; 2) several frame grabber/frame storage (FG/FS) boards 34(1)-34(N); and 3) several display boards 36(1)-36(N). Further, each display board is connected to one of a plurality of high resolution video monitors 28. As will be explained hereinafter, each processing board is built around a parallel processing computer chip termed a Transputer which is manufactured by Inmos, Inc., which is a subsidiary of SGS Thomson Microelectronics, of France. Connected to each display board may be an alarm sequence buffer board 35(1)-35(N). The FG/FS boards and display boards are connected in a cascaded configuration outward from the controller board 32.

The controller board 32 is the only board which has direct access to the computers 20 and 24 of the host security system. This is accomplished through a digital I/O interface 41, which also includes a Transputer chip. The interface 41 connects directly with the computer of the host security system and also with other external devices such as a controller keyboard, modem, printer, facsimile machine, etc. In addition, the controller board 32 connects directly to a disk controller 43A which in turn is connected to one or more hard disk drive(s).

The alarm sequence buffer boards 35(1)-35(N) are provided to buffer the sequences of images associated with an alarm event when the built-in buffers of the display boards are full. This may happen only when alarm events occur faster than operator(s) can assess and clear them. A personal computer (PC) 39 may be provided to interface with the controller board 32 and is preferably used to load system software stored on a hard disk via a second disk controller 43B.

The processing boards are connected to each other with Transputer links, which for illustrative purposes are shown by double lines in FIG. 2. A Transputer has 4 links with which to connect with other Transputers. Each Transputer link comprises a group of 4 conductors that directly connect the Transputer processor in each board and permit serial communication at a rate of 20 Mbits/second between processors. While most processors require an array of other components to communicate, the Transputer requires just 4 wires for each of up to 4 links, thus facilitating interconnection. Four links connect each board in the system, two of which are for control messages and one is for digital images. One is left as a spare for communication with option modules and boards.

Control links (CL) 37 are provided between adjacent processing boards. As a result, each Transputer on the respective boards sends messages not designated for its receipt down the line to eventually reach the board designated to receive the message. Each re-transmission of a message to another board inherently adds a latency to the overall transmission time of the message. However, control messages are short and occur at relatively low rates compared to the transmission speed of the link; therefore, this latency is not a problem with respect to control messages. On the other hand, this is not true for the transmission of data intensive digitized video images. Rather, with each image represented by approximately 256K bytes of data, the cascaded transmission process would severely impact the response time of the system to move and display an image. Therefore, a video link 38 is connected to a link switch (shown in FIGS. 3-5) on each board and the respective Transputer connects itself to the video link 38 only when instructed by the Transputer on the controller board 32 (through a control message). As a result, only two Transputers are connected to the video link 38 at any given time thus allowing any two Transputers to communicate video data with a minimum latency. A second video link may be provided in parallel with the other to augment exchange of video data between processing boards should the remaining fourth link of the respective processing board not be needed for connection to option modules or boards.

Also forming part of the DVSS 10 are several option modules 40. These modules fit into expansion sites built onto the boards that meet a published specification for TRAM (Transputer/RAM, referred to hereinafter as TRAM) modules. Consequently, commercially available modules or (specialized modules) may be used with the system to permit unlimited adaptability and expandability. For example, motion detection modules (MD) 42(1)-42(N) may be connected to the FG/FS boards 34(1)-34(N), respectively to analyze the digitized video data for any motion or change in a field of view of any camera associated with the motion detection module. In this regard, the DVSS 10 may have primary detection capabilities. Alternatively, change detection modules (CD) 44(1)-44(N) may be provided and connected to the display boards 36(1)-36(N), respectively, which run an algorithm similar to that run on the motion detection modules except that primary detection is not effected with these modules. The CD modules 44(1)-44(N) identify areas of change in images displayed as a result of an external sensor alarm.

Other types of option modules may be used to support data transmission. For example, the option modules connected to the FG/FS boards may include image data compressors which operate on the digitized images to compress the digital image data. The compressed data is then stored back in the FG/FS board and placed over the video link, when desired. Likewise, the option modules connected to display boards may comprise decompressors to decompress the compressed data which is then supplied to a monitor. This would result in increased image storage capabilities and decreased transmission times. Compressed images could also be communicated out of the DVSS 10 via a modem 201 for decompression in a remote system.

Figure 3:
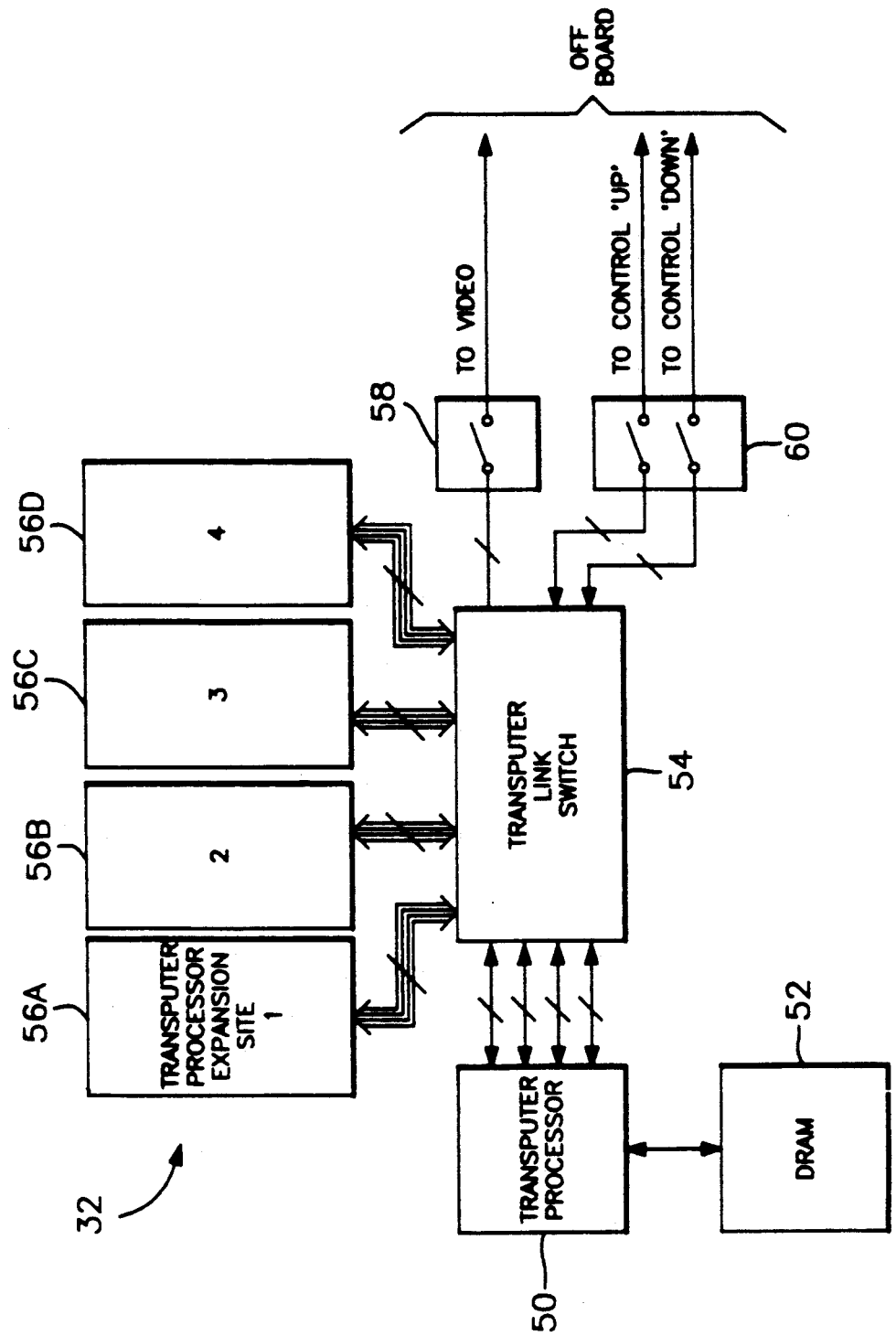
FIG. 3 is a block diagram illustrating the architecture of a controller circuit board of the digital video surveillance system according to the present invention.

FIG. 3 illustrates the controller board 32 in detail. The controller board 32 comprises a Transputer processor 50, Dynamic Random Access Memory (DRAM) 52, a Transputer link switch 54 (32×32 crossbar), Transputer processor expansion sites 56A, 56B, 56C and 56D, and link switches 58 and 60. The link signals of the Transputer 50 are routed through the Transputer link switch 54 to connect either with other processing boards (via link switches 58 or 60) or with any of the installed option modules via the Transputer processor expansion sites. The option modules comprise Transputers, memory and other specialized hardware mounted on small circuit boards (TRAM's) which plug into the expansion sites. Communication with the option modules occurs over the Transputer links.

Specifically, control message signals are transported off the controller board 32 via the link switch 60 in the direction of the destination processor board ("UP" or "DOWN"). The control message signals pass through the normally closed link switches 60 (in the respective processing board). These switches may be opened in order to remove a faulty board from the system so as not to disrupt the control message path or link to the remaining boards. In this case, both of the "link side" contacts of the switch are connected thereby providing continuity of the control link.

An alarm sequence buffer board has an architecture similar to that of the controller board 32.

The video signals from the controller board 32 are transported off-board through the normally opened link switch 58. The Transputer 50 controls the position of the link switch 58. The switch may be closed to connect the Transputer 50 to the video link 38 to transmit video data to or from one of its associated option modules or interfaces and another processing board. In such a case, the Transputer 50 would instruct the Transputer on the corresponding processing board to close its video link switch to establish communications over the video link 38.

When communications are required between two other processing boards, the Transputer 50 on the controller board 32 issues an instruction to both of the Transputers on the other two boards to close their link switches and establish communications. These control messages are transmitted on the control link 37. After the communication of video data is complete, the Transputer 50 of the controller board 32 instructs the Transputers on the two communicating boards to open their link switches and free the video link 38 for other use. Such a process would take place after an alarm event occurs when video data must be transmitted from the proper FG/FS board 34 to the appropriate display board 36.

Figure 4:
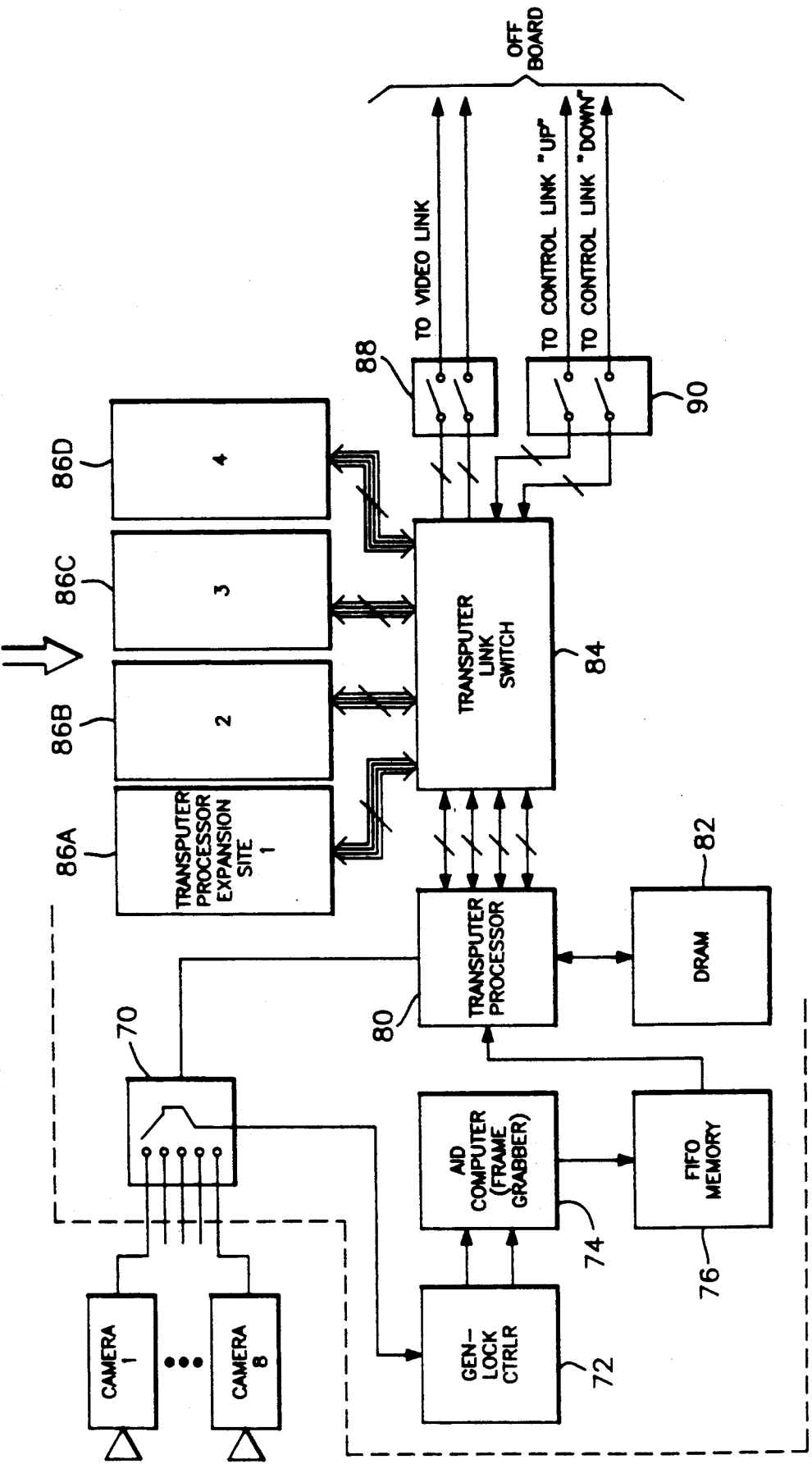
FIG. 4 is a block diagram illustrating the architecture of the frame grabber/frame storage circuit board.

FIG. 4 illustrates one of the FG/FS boards 34(1)-34(N) in detail. This board digitizes the analog video signal generated by the cameras 1-8 and stores the digital video image temporarily in a hardware FIFO buffer 76. The FG/FS board includes a camera interfacing switch 70 associated with the 8 video cameras. A gen-lock controller 72 is provided and connected to the interfacing switch 70. An analog-to-digital (A/D) converter 74 is connected to the gen-lock controller 72 to digitize the analog video signal to generate a digital video signal which is stored in the FIFO memory 76. The gen-lock controller ensures the proper synchronization of the A/D converter 74 with the analog video signal so that digitizing starts at the top of a video frame and ends at the bottom of the frame. This is critical to ensure frame-to-frame alignment for downstream signal processing. The gen-lock controller 72, A/D converter 74 and FIFO memory 76 comprise frame grabbing circuitry, which is well known in the art.

The output of the FIFO memory 76 is connected to a Transputer processor 80. Associated with the Transputer 80 are DRAM 82, Transputer link switch 84, Transputer processor expansion sites 86A-86D, and link switches 88 and 90. The latter component is analogous to that shown in FIG. 3, as part of the controller board. The switch 88 can connect one or two of the links to the video link 38 for point-to-point communication. That is, the switch 88 can connect to only one, or both of the video links.

As shown in FIG. 4, up to eight cameras can be connected to a single FG/FS board through the switch 70, which is controlled by the Transputer 80. Normally, an image is taken from each camera connected to the switch 70 in succession by way of a conventional multiplexing procedure. The analog video signal is analyzed by the gen-lock controller which passes the video signal together with sync information to the A/D converter 74. The A/D converter 74 digitizes the analog video signal and stores the digital information in a hardware controlled FIFO memory 76, which serves as a buffer. The Transputer 80 then removes the digitized image from the FIFO buffer 76 and stores it in a large software controlled FIFO buffer located in the DRAM 82. The FIFO buffer in the DRAM contains sufficient memory space for storing an entire sequence of images for each camera. For pre-alarm image recall, the system is configured to store M images per camera for viewing after an alarm. These images will then represent pre-, during and post-alarm views. This collection of images is an alarm sequence and this process of successive image capturing continues without end.

The Transputer 80 of the FG/FS board communicates with the rest of the system over the control links (CL). Commands from the Transputer 50 in the controller board 32 are received over the control links (CL) as are messages from other Transputers on various processing boards of the system.

When an event occurs requiring the display of images stored in the FG/FS board, the Transputer 50 on the controller board sends a message requesting the FG/FS Transputer send the particular image(s) for that camera down the video link 38. The FG/FS Transputer then closes the link switch 88 to the video link 38 and transmits the requested image(s) to the Transputer of the proper display board 36. Upon completion of the transmission, the FG/FS Transputer opens the link switch 88, freeing the video link 38 for use by other Transputers in the system.

Figure 5:
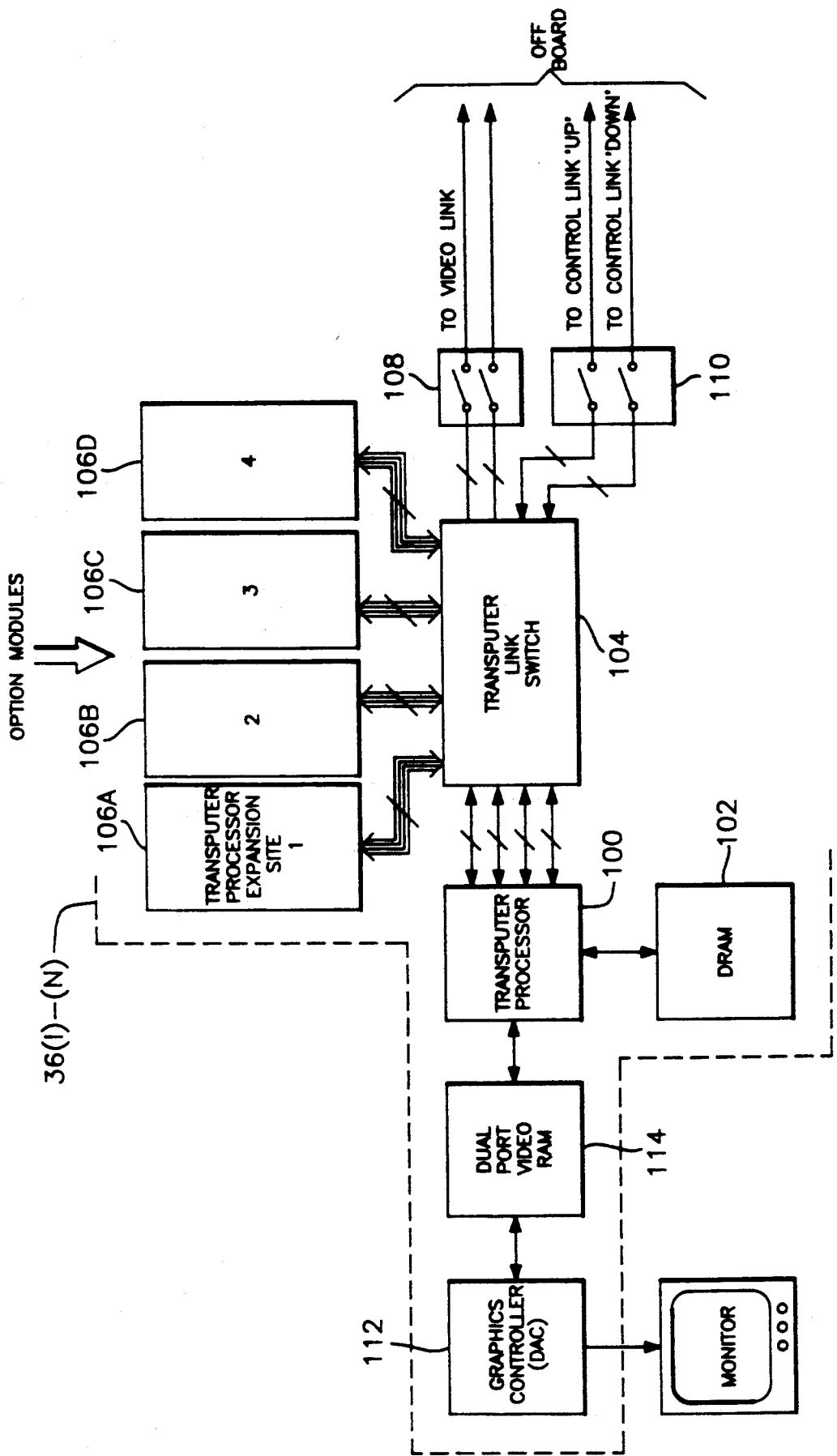
FIG. 5 is a block diagram illustrating the architecture of a display circuit board.

FIG. 5 illustrates the architecture of a display board in detail. Like the other processing boards, the display board comprises a Transputer 100, DRAM 102, a Transputer link switch 104, Transputer processor expansion sites 106A-106D, and link switches 108 and 110. In addition, the display board comprises a digital-to-analog (D/A) converter graphic controller 112 for displaying images on the associated video monitor according to images represented in the dual-port video random access memory (VRAM) 114. The VRAM is manipulated by the Transputer 100 in response to user commands received from the Transputer 50 of the controller board 32. The DAC 112 is capable of controlling traditional low resolution type displays as well as high resolution color monitors, such as monitors 28.

Figure 8:
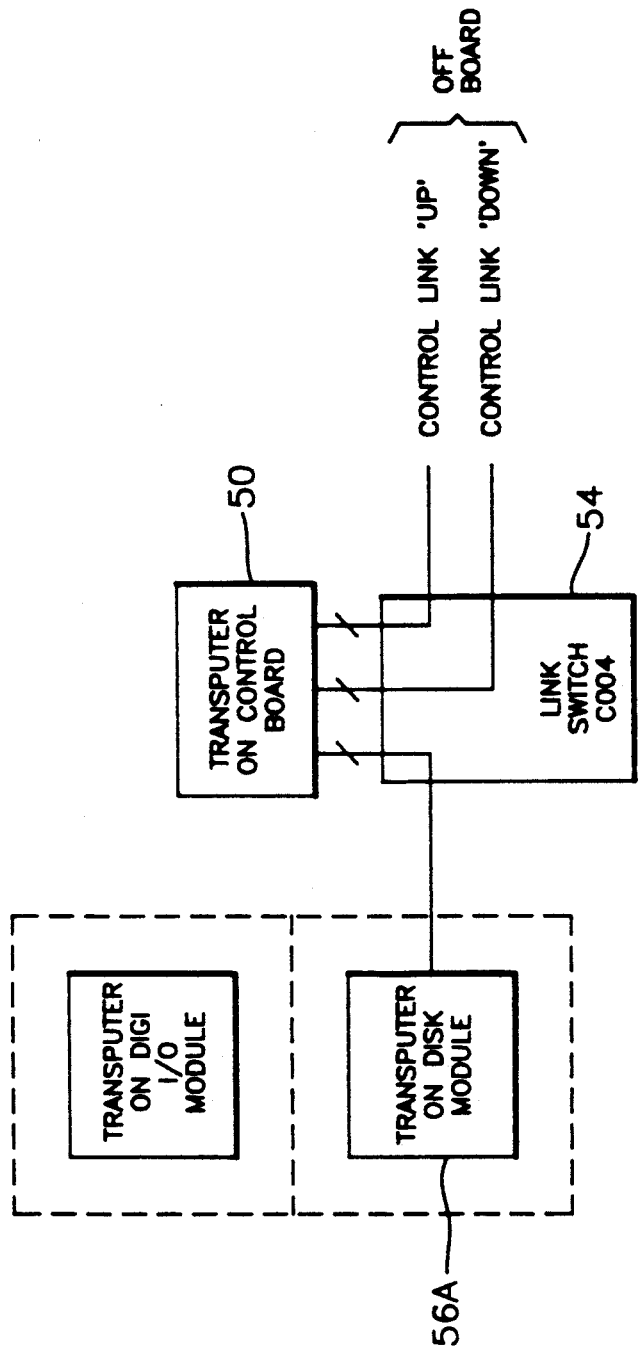

FIGS. 6-8 illustrate examples of the manner in which a Transputer is connected through its associated link switch to other components. FIG. 6 shows a Transputer 80 on a FG/FS board in cooperation with an option module. Specifically, in this example, a motion detector option module occupies one of the expansion sites on the FG/FS board. The Transputer switch 84 receives the four links from the Transputer 80 and feeds the appropriate three to the corresponding "off-board" destinations while the remaining link is connected to the option module 86A (86B, 86C or 86D). The Transputer switch 84 may be a silicon chip that is instructed by the Transputer 80 to switch a matrix of 32×32 links, accordingly. Alternatively, the Transputer switch 84 may be a pre-wired header which would reduce cost in applications where the link configurations will remain constant.

FIG. 7 illustrates an example in which no option modules are connected to the FG/FS board. In this type of configuration, one link is unused or could optionally be routed to an additional video link.

FIG. 8 illustrates an example in which a disk module occupies one of the option module sites of the control board. The control board Transputer 50 interfaces with the Transputer on the disk module 56 via the link switch 54. Specifically, three links from the Transputer 50 are fed "off-board" while a single link is fed to the Transputer on the disk module.

The software which runs on each of the Transputers is written in a language called OCCAM. OCCAM is unique to the Transputer and is designed for parallel processing, both inter and intra processor. That is, each Transputer has multiple programs executing in parallel in the Transputer.

As mentioned above, control messages are passed between the boards over the control link 37. There are no pre-defined message formats. Each message is preceded by a tag indicating how many bytes in the message are to follow. This permits message types to be added at any time without changing the fundamental operation of each board.

In FIGS. 9-12, the numbered circles or "Bubbles" represent individual programs which run on the Transputer chips. These programs run in parallel, but may be dependent upon the results generated by another program running on that Transputer. The intra- and interprocessor parallelism of the Transputer allows the OCCAM programs to be distributed to physical Transputer processors as appropriate for the functional and performance requirements of each application.

Figure 9:
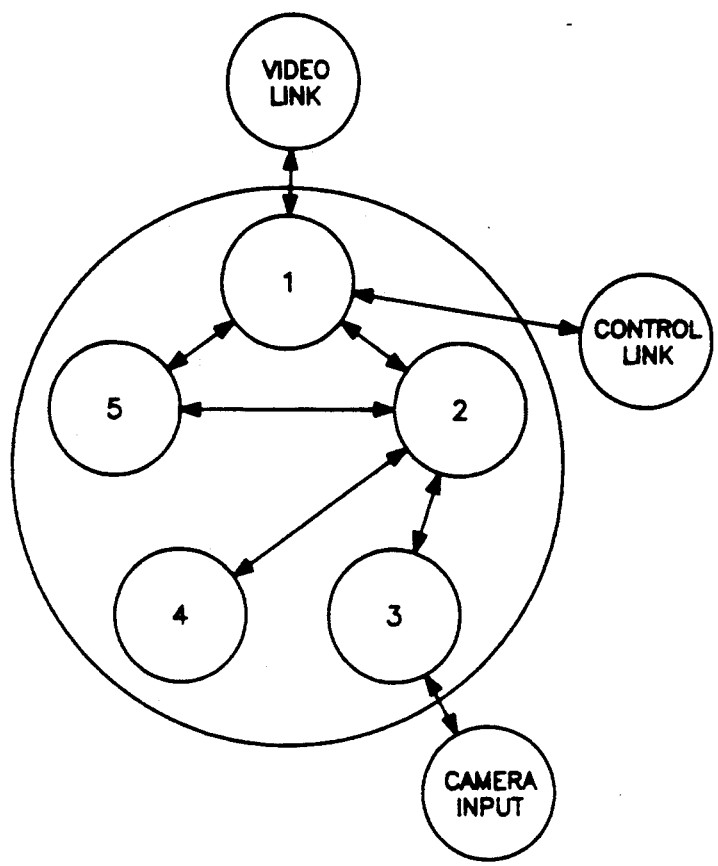
FIG. 9 is a flowchart diagram depicting the software which controls the function of the frame grabbing processing board.

With reference to the flowchart of FIG. 9, the function of each of the FG/FS boards as controlled by the software running on each board, will be described. Bubble 1 represents a program for controlling video and control link switching, decoding of message packets and directing required messages to the appropriate board. Bubble 2 represents the frame grabber software control for controlling frame grabbing sequencing, and creation of header information as to camera, time, zone and other appropriate information. Bubble 3 represents the program for frame grabber hardware control which controls the digitizer and gen-lock chips that actually acquire the image and controls the camera input. Bubble 4 represents the software clock which serves as a local time reference from which the frame grabber calculates grabbing sequences. Bubble 5 represents the data manager program which controls access to locally stored image data areas in DRAM from output requests received over the control link 37.

The Transputer of the controller board 32 is responsible for several macro-type of operations. Particularly, the controller board 32 accepts input from all devices external to the DVSS 10. Such external devices include the personal computer 39, serial I/O devices such as alarm computers, video switches, access control card readers, the user keyboard, modems, fax devices, etc. The external devices may also be parallel I/O devices such as a video printer, line printer, etc.

Communication with the host security system is accomplished through an option board 41 capable of RS-232, RS-422 and Centronics parallel communication. Connections to the existing system are made passively by splitting existing communications lines with y-cables or modem splitters. The DVSS 10 maintains a user defined table of command strings and associated actions. The system monitors the existing communications and searches all of the communication messages for these command strings. A.1. in the Appendix is a listing of the software for each Bubble which runs on the FG/FS boards, and described above.

The controller board communicates with disk I/O devices via a Small Computer System Interface (SCSI) disk controller 43. This provides for access to devices that conform to the SCSI protocol, hard disk storage and retrieval, file management, copying and deleting for disk stored files, activity log maintenance, etc.

The controller board 32 also connects to the personal computer (PC) 39 for access to the PC's peripherals. This gives the DVSS 10 a gateway to PC compatible hardware and software.

Figure 10:
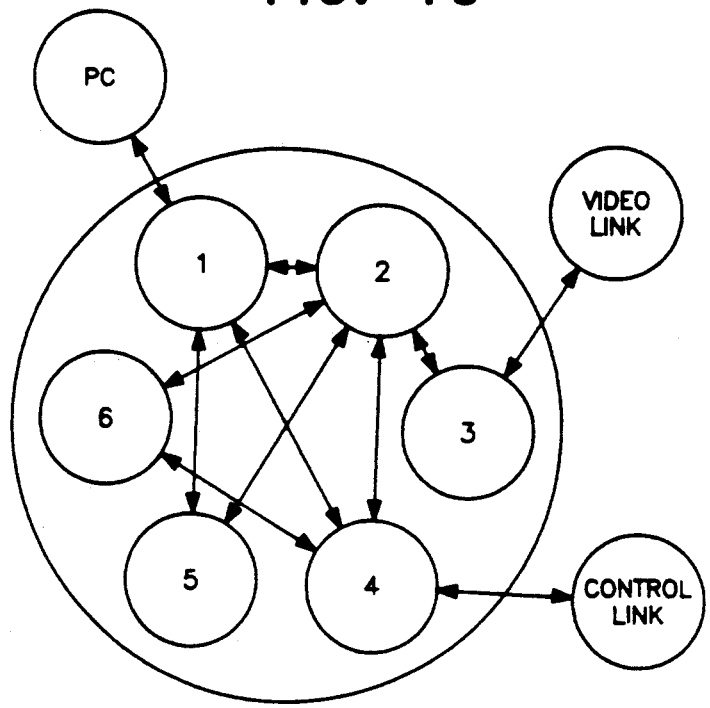
FIG. 10 is a flowchart diagram depicting the software which controls the function of the controller and display processing boards.

By virtue of its direct connection to the display boards 36 and its connection to all system peripherals, the control board 32 and the display board 36 software are tightly coupled. FIG. 10 illustrates the group of parallel programs that run on the controller board 32 and the display board 36. These program are responsible for controlling interface to all computers on the existing security system as well as the peripherals to the DVSS 10 such as a high resolution display monitor 28 and controlling keyboard 200. Bubble 1 of FIG. 10 represents a program to interface with the personal computer 39 and which gives Transputers in the network access to personal computer functions, such as keyboard, disks, communication ports, etc. Bubble 2 represents a display program which interfaces with the user controls, accepts keyboard codes which are converted into display control commands. This software also operates the interactive menu, to be described hereinafter. Bubble 3 represents a graphics library program which generates graphics commands for line drawing, image display, text, menu display, etc. Bubble 4 represents a control link interface program which controls bus messages, formats outgoing messages, decodes incoming messages, and directs messages to the designated boards. Bubble 5 represents a software clock which maintains system time with respect to which events are controlled and referenced. Bubble 6 represents a video link program which controls access to the video link for any of the processing boards. The display program of Bubble 2 makes video link access requests to access data and resources on other boards. Such data or resources may include images from frame grabbers and access to buffer boards. A.2. in the Appendix is a listing of the software for each Bubble which runs on the controller board 32.

The programs represented by Bubbles 2, 3, 4 and 6 are implemented on the controller board 32 and each of the display boards 36(1)–36(N).

Figure 11:
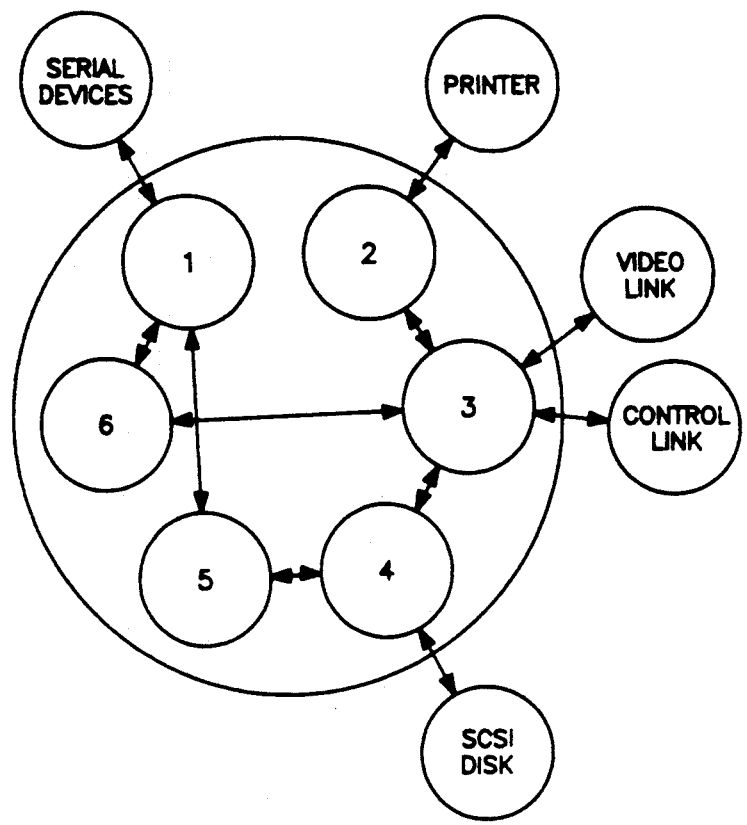
FIG. 11 is a flowchart diagram depicting the software which controls the operation of a digital I/O interface option board.

FIG. 11 is a Bubble representation of the software which controls the digital I/O interface 41. Bubble 1 represents software for interfacing with the serial input and output devices such as fax machines, modems, alarm computers, card readers, video switches, etc. Bubble 2 represents software for interfacing with parallel devices such as text printers, image printers, etc. Bubble 3 represents software for controlling the supply and retrieval of data from the video and control links. Bubble 4 represents software for controlling the SCSI disk controller 43A. Bubble 5 represents software for communication data preparation including software for compression and decompression of data for interface with fax machines and modems. Bubble 6 represents software for decoding input data to extract necessary information from the pre-defined communications on the tapped serial communications lines of the existing security systems. A.3. in the Appendix is a listing of the software for each Bubble which runs on the digital I/O interface 41.

Figure 12:
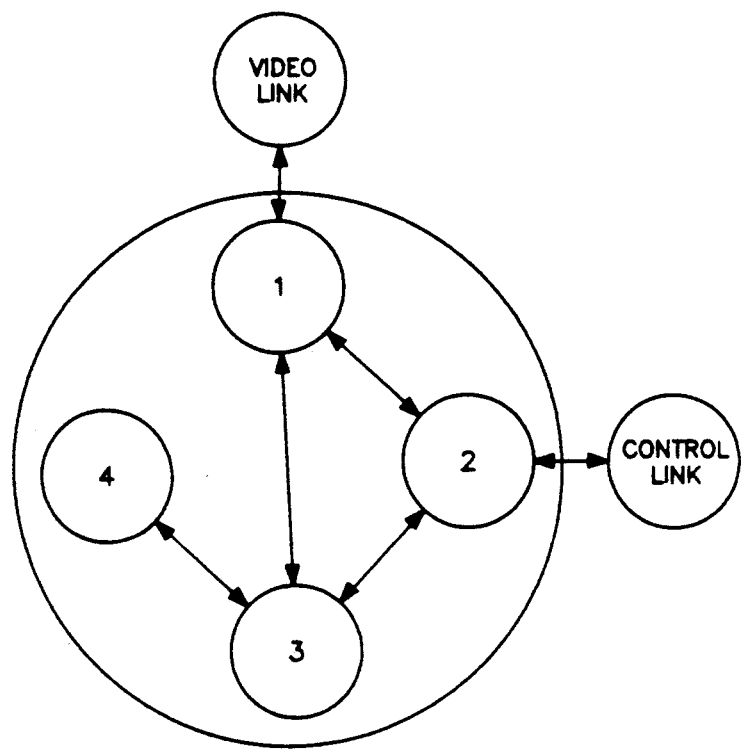
FIG. 12 is a flowchart diagram depicting the software which controls the alarm sequence buffer option boards.

FIG. 12 is a Bubble representation of the software which runs on the alarm sequence buffer boards 44(1)–44(N). Bubble 1 represents software for controlling access to the video link and for multiplexing incoming and outgoing messages. Bubble 2 represents software for controlling message traffic over the control link and for multiplexing resource requests. Bubble 3 represents data management software which controls and limits access to a main image data base stored in DRAM, and interfaces between multiple requests for images from the frame grabber and display board requests via the video link. Bubble 4 represents the main image data base which is a storage area for images of an alarm sequence stored in the alarm sequence buffer in DRAM. A.4. in the Appendix is a listing of the software for each Bubble which runs on the alarm sequence buffer boards.

Figure 13:
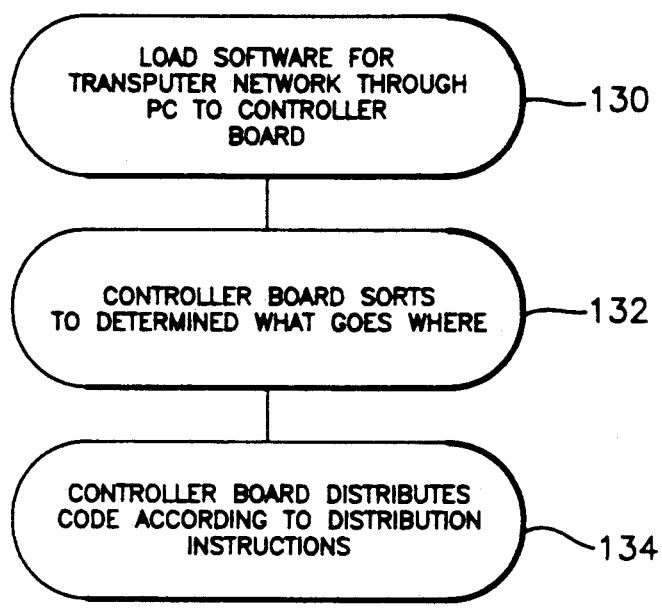
FIG. 13 is a flowchart depicting the manner in which the system software is loaded into each processing board.

FIG. 13 depicts the manner in which the system software for each Transputer is loaded. The Transputer of the controller board 32 is the only Transputer which connects with the personal computer 39. Initially, in step 130, the main software file for controlling the operation of all Transputers including that of the controller board 32, is loaded from hard disk through the personal computer 39 via disk controller 43B. Once the code is loaded into the controller board 32, the Transputer of the controller board in step 132 deciphers distribution instructions to determine which portions of the executable code goes to which Transputer. The controller board 32 controls the various switches and processing boards to distribute the code to the various Transputers according to the distribution instructions in step 134.

Included within the main software file is a file called a Configuration File. The Configuration File contains a set of programmable parameters for a specific host system and DVSS 10 configuration. The Configuration File will be described in detail hereinafter.

In accessing disk storage devices, the disk controller 43A responds to disk access requests sent to it on the control link via the Transputer of the controller board 32. The command is intercepted on the Transputer of the controller board 32 which acts as a data buffer for the disk controller 43A. The access request is translated into a SCSI protocol command sequence by the Transputer on the controller board 32 and sent to the disk controller 43A. The disk controller 43A will then access the disk and perform the necessary operations. The controller board 32 Transputer will keep a record of the file locations on the disk including a description of their contents. A copy of this information will also be kept on the disk.

Figure 14:
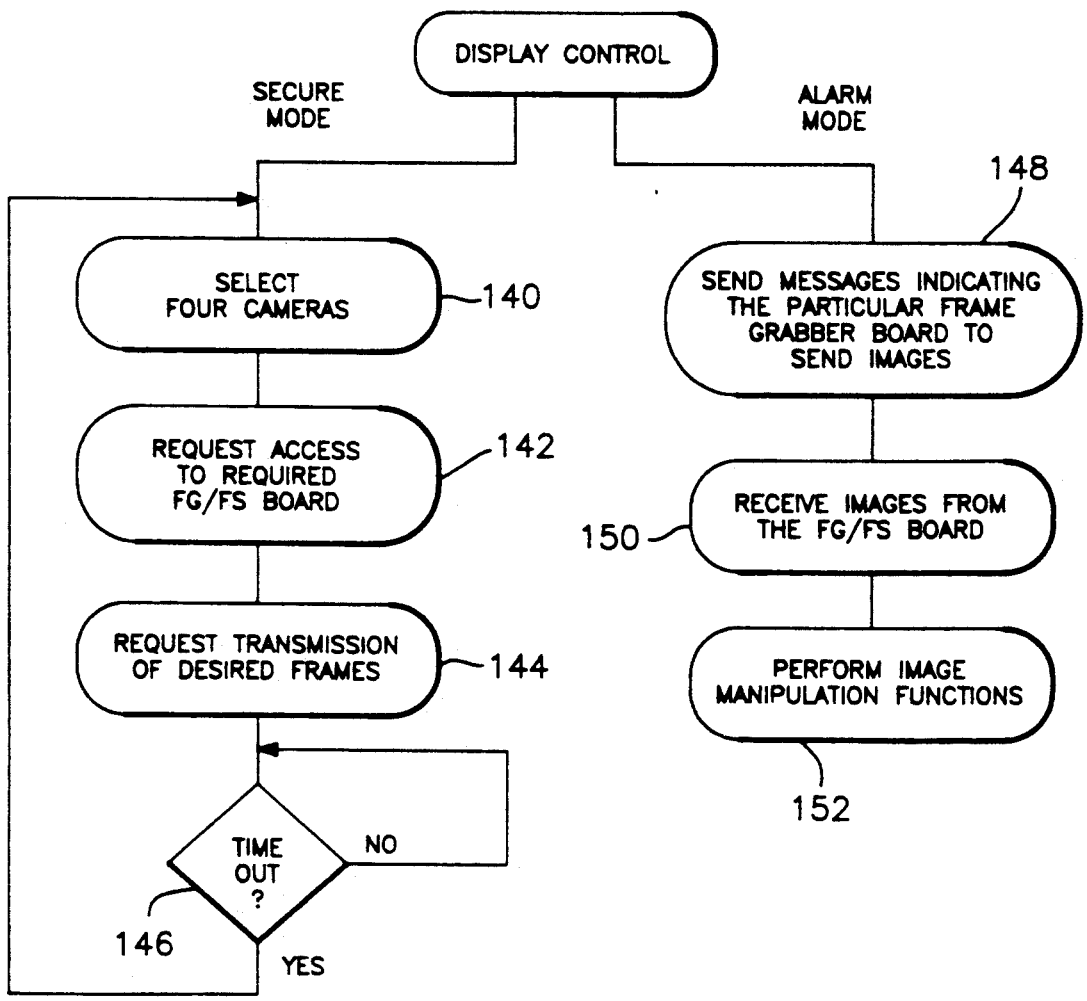
FIG. 14 is a flowchart depicting functions performed by the display board in an alarm mode and a secure mode.

FIG. 14 illustrates the general functionality of the display boards in interacting with an FG/FS board. The display boards operate either in a secure mode or display mode. The secure mode is the display mode that exists when there are no uncleared alarms to be viewed. Four slow-scan, live-view images from 4 cameras at a time are shown. Each set of 4 cameras is shown for a period of time and then a new set is displayed, and so on. The first step 140 involves the selection of the four cameras for secure mode display. Next, in step 142 the display board requests that the controller board 32 access the required FG/FS board for display. In this capacity, the controller board 32 acts as a hub for video link control. Once the appropriate FG/FS board has been identified, in step 144, the display board requests, via the video link, that the desired frames of images be sent to it. The video images from the selected FG/FS board are displayed and are updated as new images become available from the associated FG/FS board. This process may continue for a specified period of time, as illustrated by step 146, and then switch to another set of cameras. However, the occurrence of an alarm event or other user interaction may override the display board into the alarm mode.

A display board may be switched into the alarm mode either by an external alarm or manual entry. In either case, the system will be notified of the zone number of interest. By way of a look-up table in the DRAM 52 on the controller board 32, the controller board 32 will determine which particular display board is connected to the camera(s) that covers that particular zone.

A message is sent to the controller board 32 to switch the video link to connect the required FG/FS board to the display board directly. This is a high priority request that overrides the secure mode displays, but not other alarms. Once the connection is made, the selected display board, in step 148, sends messages over the video link instructing the corresponding FG/FS board to send images over the video link. The display board will request the image closest to the alarm first, and once it is received change the display format to that of the alarm mode. The operator will thereby be allowed to examine the alarm image while the rest of the sequence is being downloaded. A horn will sound in the keyboard 200 at the time of switching from the secure mode to the alarm mode. The display board then receives these images in step 150 and in step 152, the user is permitted to perform any of the available image manipulations functions.

Figure 15A:
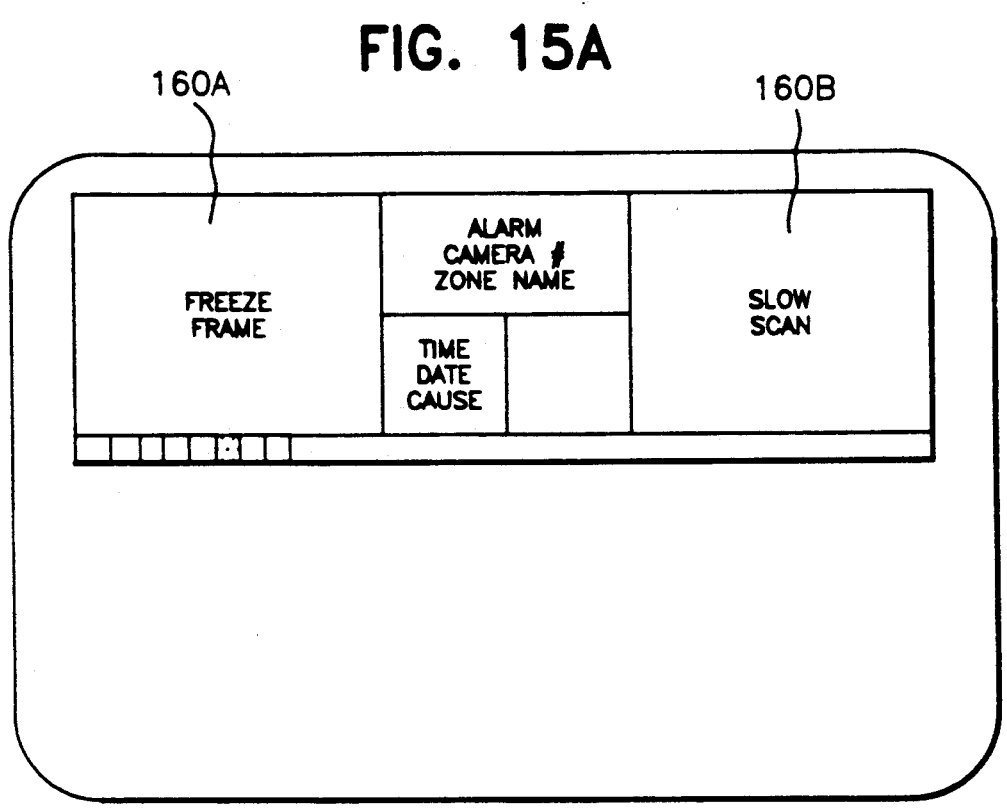
FIGS. 15A and 15B illustrate the display screen in the alarm mode.
Figure 15B:
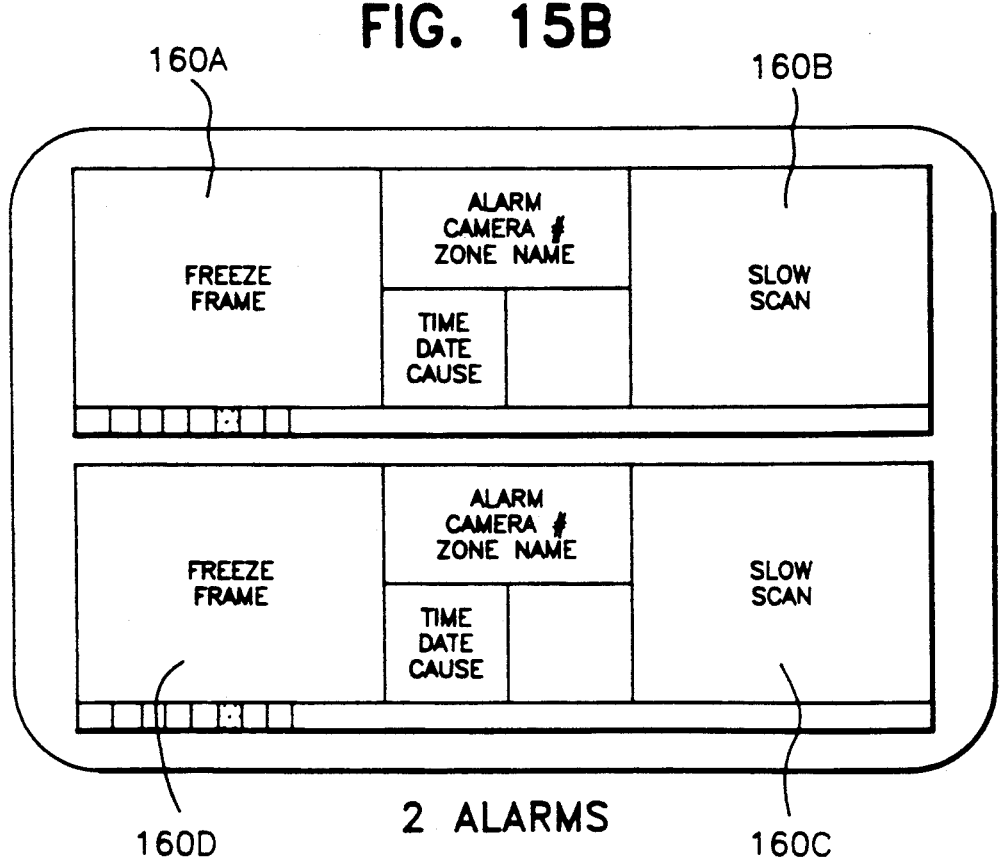

The image manipulation functions include image scanning in time; saving images to disk; marking images with cause and a pointer to indicate location of interesting features; zooming in on an interesting feature with the ability to pan and scroll the field of view; adjusting contrast; transmitting images by facsimile machine or modem; printing images; etc. The appearance of the display in the alarm mode is shown in FIGS. 15A and 15B. As shown in these Figures, there is a maximum of four image areas 160A–160D (under 2 alarms) which are selectable for further manipulation, as will be explained in greater detail in conjunction with FIGS. 16–18. In particular, the image areas 160A–160D may be configured so as to display freeze frame for a primary camera in areas 160A and 160D and freeze frame for a secondary camera in areas 160B and 160C. Optionally, a slow scan live-view of the primary cameras could be substituted for the secondary camera freeze frame in areas 160B and 160C.

If additional alarms occur while already in the alarm mode, the required images will be downloaded as described above. As shown in FIG. 15B, the display board provides for two alarm displays as well as an alarm window to warn of additional, undisplayed alarms.

Figure 16:
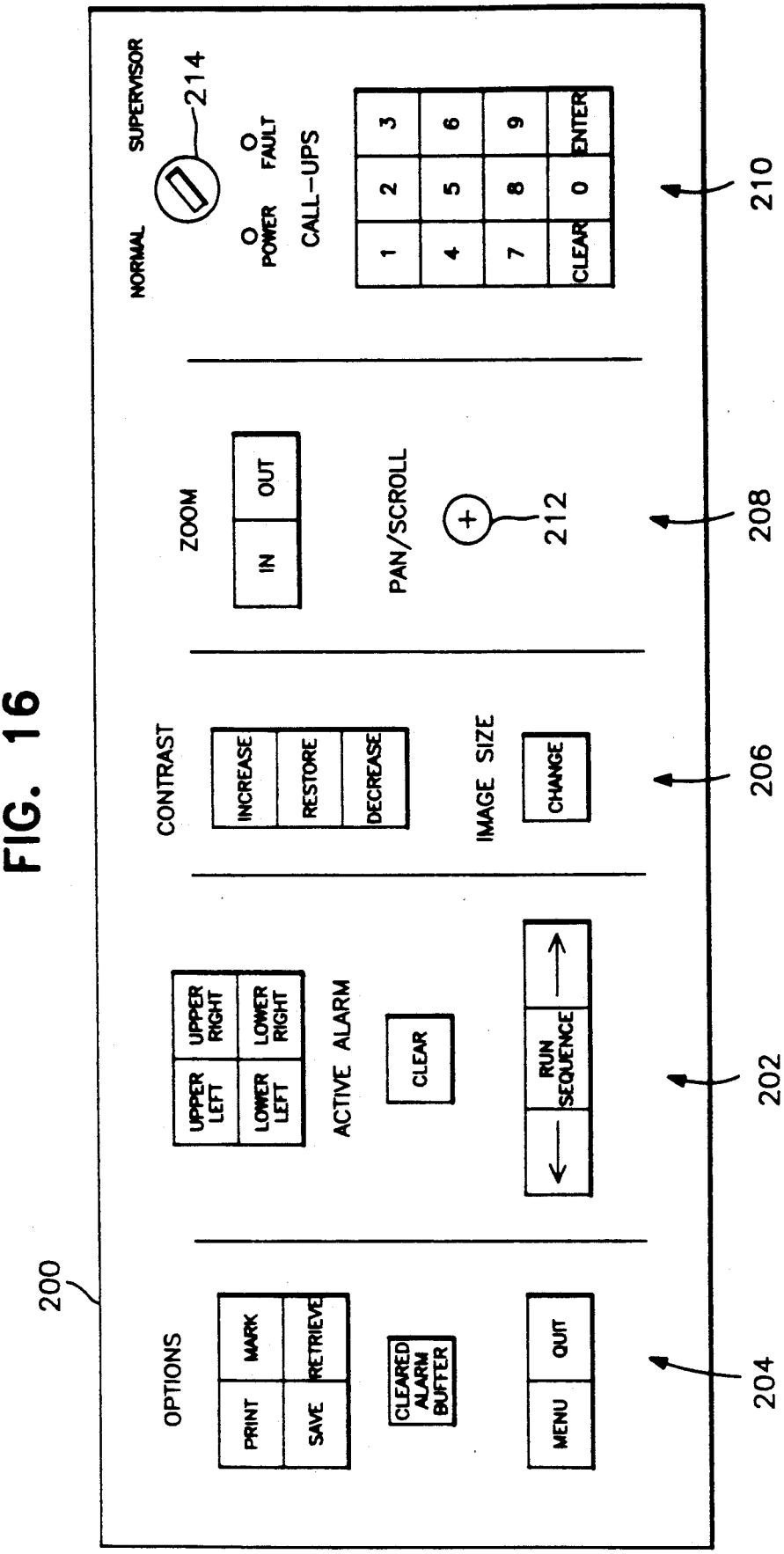
FIG. 16 is a top view of the user keyboard according to the present invention.

FIGS. 16–18 illustrate the user keyboard 200 and examples of display menus, in accordance with the present invention. The keyboard 200 is connected to the digital I/O interface 41, as shown in FIG. 2, to provide for access to the DVSS 10. The keyboard 200 comprises five sections of controls: (1) active alarm section 202; (2) options section 204; (3) contrast section 206; (4) zoom section 208; and (5) call-ups section 210. Selections are displayed on one of the monitors 28 together with a menu for the particular function selected, as will be explained in detail hereinafter.

Critical to interaction with menus displayed on the monitor is the joystick 212. The joystick 212 allows the operator to scroll up and down within a menu. It permits the user to toggle between selections for user prompts. During zoomed images, the joystick scrolls the image left, right, up and down. While using the MARK function, the joystick controls the position of the pointer in the displayed image.

In the alarm section 202, the UPPER LEFT, UPPER RIGHT, LOWER LEFT and LOWER RIGHT buttons are used for selecting between the named display window cameras. Specifically, as shown in FIG. 15B, there are four image display areas on a monitor screen. Hitting one of these buttons highlights the selected area as the active display window and all subsequent display window operations are performed on this selected camera image.

The CLEAR button is used to clear the current active alarm and to remove the alarm from the active display window. In addition, the alarm is removed from the current alarm buffer menu. If no other alarm exists, the system is returned to a wait state. Referring to FIGS. 15A and 15B, if the cleared alarm was in the upper portion of the display, it is cleared and the image in the lower window is moved into the top position. The next active alarm image will be displayed in the lower portion of the display.

The arrow buttons in section 202 are used to replace the active alarm camera image with a preceding or succeeding frame, depending on which button is actuated. Consecutive actuation of a button will step through the frames to the maximum number of preceding or succeeding frames saved. The arrow buttons become inactive once the maximum number of preceding or succeeding frames has been reached.

The RUN SEQUENCE button is used to step through each stored frame in a predetermined timing from the oldest frame to the newest frame in the sequence.

In the options section 204, there are provided buttons labelled PRINT, MARK, SAVE and RETRIEVE. The PRINT button is used to print to an external printer the image on the active display window. The MARK button is selected to lock the current image, zoom and contrast. An alarm cause menu is then brought up on the monitor and display annotation is initiated for the active display window. The alarm cause menu is a programmed list of possible causes for an alarm, and is part of the Configuration File. For example, as shown in FIG. 17, a menu of possible alarm causes is listed and by moving the joystick 212 (in zoom section 208), the user may highlight on the monitor the appropriate cause within the listed options. Hitting the MARK button a second time selects the cause from the menu and displays the pointer in the active camera on the monitor. The joystick is then movable within the display to locate the pointer to the apparent cause of the alarm. A third actuation of the MARK button locks the pointer in place and exits the display annotation.

The SAVE button is used to save images of the active display window alarm to an external disk. Once the SAVE button is depressed, the operator is prompted with the option to save the single displayed image or the entire sequence. The joystick 212 is used to highlight the desired option. Hitting the SAVE button a second time prompts the operator for specifying the destination disk. The joystick is used to make this selection and a third actuation of the SAVE button stores the selected image data to the selected external disk.

The RETRIEVE button is used for accessing images stored on external disk drives. The operator is prompted with a menu of available display files. The joystick is moved to select the desired file and a second actuation of the RETRIEVE button selects the highlighted file and prompts the operator for the appropriate source disk. Much like the prior described procedures, the joystick and RETRIEVE button are used to display the stored image in the active display window. The image will remain on display until it is replaced or the CLEAR ALARM button is actuated.

The CLEARED ALARM BUFFER button is used to bring up a list of alarm sequences which have been cleared by the operator but still remain in buffer memory. This list is appended to the current alarm list which shows all alarm events that have not been cleared. The joystick is used to select a particular alarm from the menu and the CLEARED ALARM BUFFER is actuated again to display the selected information of the active display window. This allows the operator to go back and view alarms that may have been cleared prematurely.

The MENU button provides the operator with a list of system features not directly accessible from individual buttons on the keyboard panel. Selection of each menu item prompts the operator appropriately. This allows flexibility to modify the control software to meet particular site requirements without redesigning the keyboard 200.

The QUIT button causes the current operation to be aborted and returns the display to the configuration prior to the aborted operation. Any active open menu is closed. The QUIT button is not active unless an operation is in progress.

The buttons in the contrast section 206 are used for controlling the quality of the image being displayed. The INCREASE button increases the contrast level for the entire display. Consecutive actuation of the button increases the level to a maximum of 16 times, at which the button becomes inactive. The contrast level remains in effect until modified by another contrast adjustment. The DECREASE button works in a similar manner.

The RESTORE button restores the contrast level for the entire display to a default established in the Configuration File.

The CHANGE button causes the active display window to be enlarged to the full size of the display.

In the zoom section 208, the IN button is used for zooming in on the active display window's images. When actuated once, the image is zoomed in 2 times, up to a maximum of three presses for 8 times zoom. The display will be zoomed to center unless the MARK button is active in which case the display will zoom to the pointer. Panning and scrolling with the joystick 212 is permissible in the zoomed image. While in zoom, all new images will be displayed from the current zoomed center.

The OUT button is active only if preceded by an IN selection. The images are zoomed out with actuation of the OUT button. Consecutive actuation of the OUT button moves the image out to a maximum display area, maintaining the display center. Panning and scrolling with the joystick 212 is likewise permissible as long as the image is zoomed at least one level (2 times).

The CALL-UPS section 210 includes a key operated switch 214 having a NORMAL position and a SUPERVISOR position. In the normal position, only certain types of functions are accessible whereas in the SUPERVISOR position, all functions are accessible including many from the menu which are not accessible to an operator in the NORMAL mode.

The CALL-UPS keypad is used to access directly a particular camera. Hitting any number and the ENTER button triggers a display window which shows the operator the numbers selected and initiates an alarm event within the DVSS 10 for the selected camera. The CLEAR button in the keypad removes any numbers and window from the display prior to pressing the enter button.

The following is a list of examples of programmable parameters forming the Configuration File.

USER INTERFACE OPTIONS

Auto Cycle Speed—The rate at which images are played back when the RUN SEQUENCE button is selected.

Image Display From Single Video Input—Up to four frames can be shown simultaneously from one alarm sequence for a single camera. (Only a single camera shown in entire display.)

Alarm Window Contents—Standard alarm window contains a freeze-frame from a primary and secondary camera. Alternative configurations include a primary freeze-frame shown in conjunction with a slow scan live image.

Override/Privileged User Capabilities—In systems having multiple external controlling keyboards 200, a hierarchy can be defined allowing one keyboard to override the action of another.

Supervisor Action Definitions—Features that are restricted to the supervisor mode (key switch 214 protected) versus being available to all operators.

Default Contrast Level—The contrast level which will act as the default for the system, i.e., which contrast will be restored when the RESTORE button is selected.

Pop-Up Window Defaults—Default selections used when pop-up windows are presented to the operator (to continue or to quit).

SITE DEFINABLE OPTIONS

Alarm Cause List—The list of choices an operator has for defining the cause of an alarm when the MARK button is pressed.

Transmission List—The list of choices an operator has for forwarding images directly from the system when the transmit option is selected from the menu.

Pre-Alarm Frames Per Video Input—Number of frames per video input that can be captured prior to the occurrence of an alarm. System maximum up to 63 (63 pre-alarm frames+1 at time of alarm+0 post-alarm frames).

Post-Alarm Frames Per Video Input—Number of frames per video input that can be captured after the occurrence of an alarm. System maximum up to 63 (0 pre-alarm frames+1 at time of alarm+63 post-alarm frames).

Default Alarm Display Frame—The frame from the sequence to be displayed to the operator as the default when the alarm is first displayed on the video monitor.

Alarm Overload Management—The manner in which the system responds when the alarm buffers become overloaded. Options include buffering alarms to disk, disregarding new alarms until the operator has cleared space in the buffer, or replacing the oldest alarms with new ones as they enter the system. In all cases operators would be alerted that overload management is in effect.

Zones (Number and Naming)—Defining the number of zones and providing a name which will appear on the display when that zone is "alarmed".

Camera Allocations to Zones—Defining which cameras are assigned to specific zones. Includes primary and secondary camera definitions.

Alarm Trigger—Messages from the host computer which cause an alarm to occur in the DVSS 10.

HARDWARE CONFIGURATION

Disk Storage Devices (Number and Types)—The storage space the operator has for archiving images. Types include fixed disks (various sizes) and/or combinations of removable disks.

Printers (Number and Types)—Number of printers for outputting video and non-video (i.e. operator log) images. Types include digital thermal printers and/or wax transfer color printers.

Monitors (Number)—Multiple monitors can be connected to the system all showing the same information or individual video outputs which can be used to show different images.

Frame Grabber Boards (Number)—Number of frame grabber boards within the system. Tied to the number of cameras, the resolution and the number of frames stored per camera. Also impacts on the number of chassis required to house the DVSS 10.

Video Inputs (Number)—Number of cameras which can be connected to the system.

Independent Video Outputs—Number of high resolution video monitors 28 which can be connected to the system containing unique video information.

External Controlling Devices (Number and Types)—Number of external controllers that can influence the system. Types include the operator controlling console keyboard 200, the host alarm computer 20, etc. System maximum of 16.

MEMORY RELATED OPTIONS

Frames Per Camera—Total number of frames per camera that can be captured when an alarm occurs. System maximum of 64.

Display Resolution—The system resolution for the images presented to the operator. Options include 256×240 pixels or 512×480 pixels (normal).

Alarm Images Buffered (Number)—Number of alarm sequences that can be buffered on buffer boards 35 (i.e., waiting for operator review). Add 2 to this number for the images already on the display and 1 more dedicated buffer for each camera for the total number of image buffers available.

Frame Grab Rate—Interval between image frame grabs. System minimum of 500 milliseconds, maximum of 99 seconds. Separately programmable for each camera.

OTHER OPTIONS

Scenario Development and Training—A number of software configurations for developing realistic training scenarios.

Loss of Video Indication—Software which will recognize the loss of a signal due to cut cables and/or loss of power.

Motion Detection Capabilities—Software which will use image comparison techniques to determine if a change has occurred between the images (motion).

Frame Grabber Parameters (Synchronization With Site)—Parameters which synchronize the system with the analog signals of the cameras. These are site specific and not likely to be modified unless the connected cameras change.

APPENDIX

A.1 FRAME GRABBER - FIGURE 9

Bubble 1

```
PROC bus(CHAN OF [8]BYTE  down.channel.out,up.channel.out,
                          down.channel.in ,up.channel.in,BYTE Board.ID,
         CHAN OF ANY time.request,time.reply,CHAN OF INT send.time.reply,
         CHAN OF BYTE send.vidlink.control.request,
         send.vidlink.off.reply,send.vidlink.on.reply,
         send.vidlink.on.request,send.vidlink.off.request,send.time.request)
#INCLUDE "protocol.inc"
#INCLUDE "bus.inc"
#INCLUDE "ttgscon.inc"
VAL [8]BYTE dummy.packet IS [BYTE 0,BYTE 0,BYTE 0,BYTE 0,BYTE 0,BYTE 0,BYTE 0,
BYTE any:
CHAN OF [8]BYTE down.channel.out.1,down.channel.out.2,down.channel.out.3,
                down.channel.out.4,down.channel.out.5,down.channel.out.6,
                down.channel.out.7,down.channel.out.8:
CHAN OF [8]BYTE up.channel.out.1,up.channel.out.2,up.channel.out.3,
                up.channel.out.4,up.channel.out.5,up.channel.out.6,
                up.channel.out.7,up.channel.out.8:
SEQ
  PAR
    WHILE TRUE
      [8]BYTE transfer.packet:
      SEQ
        ALT
          down.channel.out.1 ? transfer.packet
            down.channel.out ! transfer.packet
          down.channel.out.2 ? transfer.packet
            down.channel.out ! transfer.packet
          down.channel.out.3 ? transfer.packet
            down.channel.out ! transfer.packet
```

```
            down.channel.out.4  ? transfer.packet
              down.channel.out  ! transfer.packet
            down.channel.out.5  ? transfer.packet
              down.channel.out  ! transfer.packet
            down.channel.out.6  ? transfer.packet
              down.channel.out  ! transfer.packet
            down.channel.out.7  ? transfer.packet
              down.channel.out  ! transfer.packet
            down.channel.out.8  ? transfer.packet
              down.channel.out  ! transfer.packet
    WHILE TRUE
      [8]BYTE transfer.packet:
      SEQ
        ALT
            up.channel.out.1   ? transfer.packet
              up.channel.out   ! transfer.packet
            up.channel.out.2   ? transfer.packet
              up.channel.out   ! transfer.packet
            up.channel.out.3   ? transfer.packet
              up.channel.out   ! transfer.packet
            up.channel.out.4   ? transfer.packet
              up.channel.out   ! transfer.packet
            up.channel.out.5   ? transfer.packet
              up.channel.out   ! transfer.packet
            up.channel.out.6   ? transfer.packet
              up.channel.out   ! transfer.packet
            up.channel.out.7   ? transfer.packet
              up.channel.out   ! transfer.packet
            up.channel.out.8   ? transfer.packet
              up.channel.out   ! transfer.packet

[8]BYTE send.packet:
[8]BYTE pop.packet:
BOOL ok:
WHILE TRUE
  SEQ
    ok := FALSE
    ALT
      up.channel.in ? pop.packet
        IF
          pop.packet[Dest.board] <> Board.ID
            up.channel.out.1 ! pop.packet
          TRUE
            ok := TRUE
      down.channel.in ? pop.packet
        IF
          pop.packet[Dest.board] <> Board.ID
            down.channel.out.1 ! pop.packet
          TRUE
            ok := TRUE
    IF
      ok
        CASE pop.packet[Command]
          send..time
            INT intrnl.time,intrnl.utc.time:
            SEQ
              send.packet := dummy.packet
              time.request ! BYTE 0
              time.reply ? intrnl.time; intrnl.utc.time
              send.packet[Dest.board] := pop.packet[Source.board]
              send.packet[Source.board] := Board.ID
              send.packet[Command] := send..time..reply
              [2]INT int.send.packet RETYPES send.packet:
              SEQ
                int.send.packet[1] := intrnl.time
                up.channel.out.2 ! send.packet
          send..time..reply
            [2]INT int.send.packet RETYPES pop.packet:
            SEQ
              send.time.reply ! int.send.packet[1]
          send..vidlink..request
            BOOL ok:
            SEQ
              send.vidlink.control.request ! pop.packet[Param1]
              send.packet := dummy.packet
              send.packet[Dest.board] := pop.packet[Source.board]
              send.packet[Source.board] := Board.ID
```

```
            IF
              pop.packet[Param1] = Vidlink.OFF
                send.packet[Command] := send..vidlink..disconnect..ok
              pop.packet[Param1] = Vidlink.ON
                send.packet[Command] := send..vidlink..connect..ok
              TRUE
                STOP
              down.channel.out.6 ! send.packet
          send..vidlink..disconnect..ok
            send.vidlink.off.reply ! pop.packet[Source.board]
          send..vidlink..connect..ok
            send.vidlink.on.reply !  pop.packet[Source.board]
          NUL..command
            SKIP
          ELSE -- TRUE
            CAUSEERROR()
        TRUE
          SKIP
    WHILE TRUE
      [8]BYTE send.packet:
      BYTE any:
      BYTE vidlink.end:
      INT key:
      SEQ
        send.packet := dummy.packet
        ALT
          send.time.request ? any
            SEQ
              send.packet[Dest.board] := BYTE 0
              send.packet[Source.board] := Board.ID
              send.packet[Command] := send..time
              down.channel.out.3 ! send.packet
          send.vidlink.on.request ? vidlink.end
            SEQ
              send.packet[Dest.board] := vidlink.end
              send.packet[Source.board] := Board.ID
              send.packet[Command] := send..vidlink..request
              send.packet[Param1] := Vidlink.ON
              up.channel.out.4 ! send.packet
          send.vidlink.off.request ? vidlink.end
            SEQ
              send.packet[Dest.board] := vidlink.end
              send.packet[Source.board] := Board.ID
              send.packet[Command] := send..vidlink..request
              send.packet[Param1] := Vidlink.OFF
              up.channel.out.5 ! send.packet
```

Bubble 2

```
PROC current(CHAN OF ANY frame.created,frame.request,frame.ready,
             frame.time.request,frame.time.reply,
             display.frame.request,display.frame.ready)
  #INCLUDE "ttgscon.inc"
  SEQ
    -->> display frame buffer <<--
    INT camera,frame,fractime,longtime:
    [6]INT buffer:
    [6][num.frames][2]INT times.buffer:
    SEQ
      SEQ i = 0 FOR 6
        buffer[i] := (-1)
      WHILE TRUE
        ALT
          frame.created ? camera; frame; longtime; fractime
            SEQ
              buffer[camera] := frame
              times.buffer[camera][frame][0] := longtime
              times.buffer[camera][frame][1] := fractime
          frame.request ? camera
            frame.ready ! buffer[camera]
          display.frame.request ? camera
            display.frame.ready ! buffer[camera]
          frame.time.request ? camera ; frame
            frame.time.reply ! times.buffer[camera][frame][0]; times.buffer[came
```

```
PAR
  SEQ
    -->> FG sequencer and timer <<--
    INT longtime,fractime:
    INT camera.to.show,frame.to.show:
    INT time.to.show,frac.to.show:
    [so.time.string.len]BYTE string:
    INT ONEorTWO,reply:
    [128]INT header.int,fg.reply:
    [512]BYTE  header.byte RETYPES header.int:
    INT grabtime,sincegrab,loop:
    VAL frame.quantity IS num.frames * 4:
    TIMER clock:
    SEQ
      grabtime := 0
      loop := 0
      ONEorTWO := 0
      WHILE TRUE
        SEQ
          ONEorTWO := ONEorTWO >< 1
          clock.request ! 0
          clock.reply ? longtime; fractime
          fractime := fractime/156
          so.time.to.ascii(INT32 longtime,FALSE,FALSE,string)
          clock ? sincegrab
          clock ? grabtime
          clock ? AFTER grabtime PLUS #180
          header.int[hi.frame.buffer] := ONEorTWO
          header.int[hi.camera.number] := (loop \ 4)   --REM 2   --<< tvid board t
          IF
            (loop \ 4) < 3
              header.int[hi.switcher.state] := 0
            TRUE
              header.int[hi.switcher.state] := 1
          header.int[hi.frame.number] := (loop \ frame.quantity)/4
          header.int[hi.time]         := INT longtime
          header.int[hi.time.frac]    := INT fractime
          header.int[hi.zoom.level]   := 1
          header.int[hi.marker.x]     := -1
          header.int[hi.marker.y]     := -1
          header.int[hi.msg.tag]      := fg.io
          [header.byte FROM hb.time.date FOR 19] := [string FROM 0 FOR 19]
          [header.byte FROM hb.cause.1 FOR 14] := "              "
          [header.byte FROM hb.cause.2 FOR 14] := "              "
          host.to.fg ! c.vidlink.control
          host.to.fg ! c.tvid.grab
          host.to.fg ! header.int
          fg.to.host ? reply
          camera.to.show := header.int[hi.camera.number]
          frame.to.show  := header.int[hi.frame.number]
          time.to.show   := header.int[hi.time]
          frac.to.show   := header.int[hi.time.frac]
          frame.created ! camera.to.show ; frame.to.show ; time.to.show ; frac.t
          loop := loop + 1

BYTE vidlink.state,any:
  SEQ
    vidlink.state := Vidlink.OFF
    WHILE TRUE
      ALT
        send.vidlink.control.request ? vidlink.state
          SKIP
        vidlink.control.state.request ? any
          vidlink.control.state.reply ! vidlink.state
```

Bubble 3

```
PROC video.fg(CHAN OF ANY host.to.fg, fg.to.host,CHAN OF BYTE vidlink.control.st
              vidlink.control.state.reply,CHAN OF ANY Vidlink.in,Vidlink.out,
              CHAN OF ANY display.access.request,display.access.clear,
              CHAN OF ANY display.access.frame,
              CHAN OF BOOL display.access.reply,fg.access.reply,
              CHAN OF ANY fg.access.request,fg.access.clear,
              display.frame.request,display.frame.ready)
```

```
[4][8][481][512]BYTE frame.buffer:
[6][10]BOOL access:
INT control.word:
BOOL dead :
INT status.port:
PLACE status.port AT #20000020:
PORT OF INT control.port:
PLACE control.port AT #2000003C:
VAL g300.register.base IS #30000000 (INT):
[#1BF]PORT OF INT registers:
PLACE registers AT g300.register.base:
VAL nil      IS #DEFACED :
VAL modeOR  IS 0 :
VAL modeXOR IS 1 :
VAL modeSET IS 2 :

[4]BYTE bt261.adr.rd:
[4]BYTE bt261.adr.wr:
[4]BYTE bt261.data.rd:
[4]BYTE bt261.data.wr:
PLACE bt261.adr.rd AT #30080000:
PLACE bt261.adr.wr AT #30080010:
PLACE bt261.data.rd AT #30080001:
PLACE bt261.data.wr AT #30080011:
[4]BYTE bt251addr.rd:
[4]BYTE bt251addr.wr:
[4]BYTE bt251cont.rd:
[4]BYTE bt251cont.wr:
[4]BYTE bt251ram.rd:
[4]BYTE bt251ram.wr:
PLACE bt251addr.rd AT #20000000:
PLACE bt251addr.wr AT #20000010:
PLACE bt251cont.rd AT #20000002:
PLACE bt251cont.wr AT #20000012:
PLACE bt251ram.rd  AT #20000001:
PLACE bt251ram.wr  AT #20000011:
VAL INT mask.register     IS #140:

PROC init.fg ()
  PROC set.sync.slice(VAL BYTE value)
    BYTE mask, temp:
    SEQ
      IF
        value = (BYTE 0)
          mask := (BYTE #00)
        value = (BYTE 1)
          mask := (BYTE #04)
        value = (BYTE 2)
          mask := (BYTE #08)
        TRUE
          SEQ
            mask :=(BYTE #0C)
            --value := (BYTE 3)
      bt251addr.wr [1]:= 0 (BYTE)
      temp := bt251cont.rd [1] -- get old value
      temp := BYTE((INT temp) /\ #F0) -- get rid of old value
      temp := BYTE((INT temp) \/(INT  mask)) -- set new value
      bt251addr.wr [1]:= 0 (BYTE)
      bt251cont.wr [1]:= temp
:

PROC setup.genlock ()

VAL []INT bt261.setup IS [#58,  -- Command Register 0  01011000    bits
                                    -- reset each recovered Hsync      76
                                    -- syncronized to field            5
                                    -- sync detect select 125 mV       43
                                    -- oscillator TTL compat. OSC1     210

#83,  -- Command Register 1  10000010
                                    -- interlaced                      7
                                    -- drive clock output              6
                                    -- drive csync output              5
                                    -- drive Vsync output              4
                                    -- drive Hsync output              3
                                    -- reset status bit                2
                                    -- internally generated Hsync      1
                                    -- inhibit phase limiting          0
```

```
                    #F8,   -- Command Register 2   00001010
                              -- phase lock pixel count 0      7654
                              -- stop pixel clock at Hcount     3
                              -- lock override normal oper.    2
                              -- pixel clock select osc drives
                                            --clock direct    10

#00,   -- Command Register 3   00000000
                              -- number of scan lines for lock
                    140,   -- Vsync Sample Register
                    2,     -- OSC count Low Period (set to #02
                    2,     -- OSC count High Period   to enable clock)
                    #00,   -- Status Reg., Value Don't Care
                    100,   -- Hsync Start Low Byte
                    #00,   -- Hsync Start High Nibble
                    100,   -- Hsync Stop Low Byte -- 50 in testfifo
                    #02,   -- Hsync Stop High Nibble
                    19,    -- Clamp Start Low Byte
                    #00,   -- Clamp Start High Nibble
                    32,    -- Clamp Stop Low Byte (550 total)
                    #00,   -- Clamp Stop High Byte
                    #00,   -- Zero Start Low Byte
                    #00,   -- Zero Start High Nibble
                    #32,   -- Zero Stop Low Byte
                    #00,   -- Zero Stop High Nibble
                    128,   -- Field Start Low Byte
                    #00,   -- Field Start High Nibble
                    128,   -- Field Stop Low Byte
                    #01,   -- Field Stop High Nibble
                    231,   -- Noise Gate Start Low Byte        -- 231 i
                    #00,   -- Noise Gate Start High Nibble     -- 1 in
                    #B0,   -- Noise Gate Stop Low Byte (280)
                    #01,   -- Noise Gate Stop High Nibble
                    #80,   -- H Count Low Byte
                    #02]:  -- H Count High Nibble
BYTE bt261.rd.val :
SEQ
  bt261.adr.wr [3] := #00 (BYTE)
  SEQ i=0 FOR 30   -- Initialize Registers
    bt261.data.wr [3] := BYTE (bt261.setup [i])

-- Now we check to see if the chip was set up correctly
  bt261.adr.wr [3] := #00 (BYTE)
  SEQ i=0 FOR 30
    SEQ
      bt261.rd.val := bt261.data.rd [3]
      IF
        i=7    -- Ignore the status Register.
          SKIP
        TRUE
          IF
            bt261.rd.val <> (BYTE bt261.setup [i])
              SEQ
                STOP
                --so.write.string (fs, ts, "Bt261 ERROR: Location ")
                --so.write.int (fs, ts, i, 0)
                --so.write.string (fs, ts, ", Expected ")
                --so.write.int (fs, ts, bt261.setup [i], 0)
                --so.write.string (fs, ts, ", Found ")
                --so.write.int (fs, ts, INT (bt261.rd.val), 0)
                --so.write.nl (fs, ts)
            TRUE
              SKIP
:
PROC set.capture.lut(VAL [256]BYTE buffer)
  SEQ
    bt251addr.wr [1] := 0 (BYTE)
    SEQ i=0 FOR 256
      SEQ
        bt251ram.wr [1]:= buffer[i]
```

```
          -- Now check to see if it is correct
          bt251addr.wr [1]  := 0 (BYTE)
          SEQ i=0 FOR 256
            BYTE bt251.rd.val:
            SEQ
              bt251.rd.val := bt251ram.rd [1]
              IF
                bt251.rd.val <> buffer[i]
                  SEQ
                    STOP
                    --so.write.string (fs, ts, "Bt251 LUT ERROR: Location ")
                    --so.write.int (fs, ts, i, 0)
                    --so.write.string (fs, ts, ", Expected ")
                    --so.write.int (fs, ts, INT (buffer [i]), 0)
                    --so.write.string (fs, ts, ", Found ")
                    --so.write.int (fs, ts, INT (bt251.rd.val), 0)
                    --so.write.nl (fs, ts)
                TRUE
                  SKIP
      :
      PROC set.top.ref(VAL BYTE value)
        SEQ
          bt251addr.wr [1]:= 1 (BYTE)
          bt251cont.wr [1]:= (BYTE ((INT value) /\ #FC)) -- set bottom two bits lo
      :
      PROC set.bottom.ref(VAL BYTE value)
        SEQ
          bt251addr.wr [1]:= 0 (BYTE)
          bt251cont.wr [1]:= (BYTE ((INT value) /\ #FC)) -- set bottom two bits lo
      :
      [256]BYTE luts:
      SEQ
        set.sync.slice(1 (BYTE))
        set.top.ref(#FC (BYTE))
        set.bottom.ref(#FC (BYTE))
        SEQ i = 0 FOR 256
          luts[i] := BYTE (i)
        set.capture.lut (luts)
        setup.genlock ()
:

#INCLUDE "access.occ"
#INCLUDE "fg.occ"
SEQ
  control.word := 0
  control.port ! control.word
  init.fg()
  SEQ i = 0 FOR 6
    SEQ j = 0 FOR 10
      access[i][j] := TRUE
  PAR
    fg(host.to.fg, fg.to.host)

access.control()

INT camera.requested,frame.requested,mode,frame.base:
    BOOL wait:
    WHILE TRUE
      SEQ
        Vidlink.in ? mode
        IF
          mode = display.mode
            SEQ
              Vidlink.in ? camera.requested
              display.frame.request ! camera.requested
              display.frame.ready ? frame.requested
              wait := FALSE
              WHILE (NOT wait)
                SEQ
                  display.access.request ! camera.requested; frame.requested
                  display.access.reply ? wait
              Vidlink.out ! frame.buffer[camera.requested][frame.requested]
              display.access.clear ! camera.requested; frame.requested
          mode = alarm.mode
            SEQ
              Vidlink.in ? camera.requested
```

```
                        display.frame.request ! camera.requested
                        display.frame.ready ? frame.requested
                        frame.base := frame.requested
                        SEQ
                          wait := FALSE
                          WHILE (NOT wait)
                            SEQ
                              display.access.request ! camera.requested; frame.requested
                              display.access.reply ? wait
                          Vidlink.out ! frame.buffer[camera.requested][frame.requested]
                          display.access.clear ! camera.requested; frame.requested
                        SEQ loop = 0 FOR frames.before
                          SEQ
                            frame.requested := ((frame.base + num.frames)-(frames.before
                            wait := FALSE
                            WHILE (NOT wait)
                              SEQ
                                display.access.request ! camera.requested; frame.request
                                display.access.reply ? wait
                            Vidlink.out ! frame.buffer[camera.requested][frame.requested
                            display.access.clear ! camera.requested; frame.requested
                        SEQ loop = 0 FOR frames.after
                          SEQ
                            frame.requested := ((frame.base + num.frames)+(loop+1))\num.
                            wait := FALSE
                            WHILE (NOT wait)
                              SEQ
                                display.access.request ! camera.requested; frame.request
                                display.access.reply ? wait
                            Vidlink.out ! frame.buffer[camera.requested][frame.requested
                            display.access.clear ! camera.requested; frame.requested
                  TRUE
                    SKIP
:
#INCLUDE "ttgscon.inc"
PROC fg(CHAN OF ANY host.to.fg, fg.to.host)
  VAL INT x.pixel IS 512:
  VAL INT y.pixel IS 240:
  PROC select.video(VAL BYTE value)
    BYTE mask, temp:
    SEQ
      IF
        (INT (value)) > 3
          SEQ
            control.word := control.word /\ #FFCFFFFF
            control.word := control.word \/ #00200000
            mask := BYTE ( ((INT (value)) - 4) << 6)
        TRUE
          SEQ
            control.word := control.word /\ #FFCFFFFF
            control.word := control.word \/ #00100000
            mask := BYTE ( (INT (value)) << 6)
      bt251addr.wr [1]:= 0 (BYTE)
      temp := bt251cont.rd [1] -- get old value
      temp := BYTE ((INT temp) /\ #3F) -- get rid of old value
      temp := BYTE ((INT temp) \/ (INT mask)) -- set new value
      bt251addr.wr [1]:= 0 (BYTE)
      bt251cont.wr [1]:= temp
      control.port ! control.word
  :
  PROC select.sync(VAL BYTE value)
    BYTE mask, temp:
    SEQ
      IF
        (INT (value)) > 3
          mask := BYTE ( ((INT (value)) - 4) << 4)
        TRUE
          mask := BYTE ( (INT (value)) << 4)
      bt251addr.wr [1]:= 0 (BYTE)
      temp := bt251cont.rd [1] -- get old value
      temp := BYTE ((INT temp) /\ #CF) -- get rid of old value
      temp := BYTE ((INT temp) \/ (INT mask)) -- set new value
      bt251addr.wr [1]:= 0 (BYTE)
      bt251cont.wr [1]:= temp
  :
  PROC wait.for.hsync ()
    SEQ
      WHILE (status.port /\ #00100000) <> 0 -- wait for hsync
        SKIP
```

```
PROC wait.for.full.hsync ()
   SEQ
     SEQ
       WHILE (status.port /\ #00100000) <> 0 -- wait for hsync
         SKIP
       WHILE (status.port /\ #00100000) = 0 -- wait for hsync to go inactive
         SKIP
:
PROC wait.for.vsync.0 ()
   INT count,count2:
   SEQ
     WHILE ((status.port /\ #05000000) <> 0)    -- wait for vsync
       SKIP
     WHILE ((status.port /\ #05000000) = 0)     -- wait for end of vsync
       SKIP
:
PROC wait.for.vsync.1 ()
   SEQ
     WHILE ((status.port /\ #05000000) <> #01000000)    -- wait for vsync
       SKIP
     WHILE ((status.port /\ #05000000) = #01000000)     -- wait for end of vsync
       SKIP
:
PROC grab.frame ([2][y.pixel][x.pixel]BYTE frame.data)
   VAL FrameSize IS (x.pixel*y.pixel)/4:
   [x.pixel/4]INT pix.line.rd:
   PLACE pix.line.rd AT #20080000:
   [FrameSize]INT pix.rd:
   PLACE pix.rd AT #20080000:
   [2][FrameSize]INT frame RETYPES frame.data:
   INT dummy:
   [x.pixel/4]INT trash:
   PLACE trash IN WORKSPACE:
   BOOL done:
   VAL INT grab.on IS control.word \/ #00800000:
   VAL INT grab.off IS control.word /\ #FF7FFFFF:
   SEQ
     wait.for.vsync.0 ()
     SEQ loop = 0 FOR 14                    -- loose unused lines at top
       wait.for.full.hsync ()
     wait.for.hsync ()                      -- start grabbing during Hsync
     control.port ! grab.on                 -- Grab a frame
     WHILE (status.port /\ #20000000) = 0   --wait for FIFO Not-Empty Flag
       SKIP
     frame[0] := pix.rd
     control.port ! grab.off
     SEQ loop = 0 FOR 16 --6
       wait.for.full.hsync ()
     wait.for.hsync ()
     control.port ! grab.on
     WHILE (status.port /\ #20000000) = 0
       SKIP
     frame[1] := pix.rd
     control.port ! grab.off
:
INT command:
SEQ
  WHILE TRUE
    SEQ
      host.to.fg ? command
      CASE command
        c.vidlink.control
          BYTE vidlink.state:
          SEQ
            vidlink.control.state.request ! BYTE 0
            vidlink.control.state.reply ? vidlink.state
            IF
              vidlink.state = Vidlink.ON
                SEQ
                  IF
```

```
                        (control.word /\ #00400000) = #00400000
                          SEQ
                            control.word := control.word >< #00400000
                            control.port ! control.word
                        TRUE
                          SKIP
                  vidlink.state = Vidlink.OFF
                    SEQ
                      control.word := control.word \/ #00400000
                      control.port ! control.word
                  TRUE
                    CAUSEERROR()
          c.tvid.grab
            SEQ
              [2][y.pixel][x.pixel]BYTE frame.store:
              --[481][5121]BYTE frame:
              [128]INT fg.header:
              BOOL wait:
              SEQ
                host.to.fg ? fg.header
                select.video(4 (BYTE))
                select.sync(4 (BYTE))
                PRI PAR
                  grab.frame(frame.store)
                  SKIP
                wait := FALSE
                WHILE (NOT wait)
                  SEQ
                    fg.access.request ! fg.header[hi.camera.number]; fg.header[h
                    fg.access.reply ? wait
                frame IS frame.buffer[fg.header[hi.camera.number ]][fg.header[hi
                [481][128]INT frame.int RETYPES frame:
                frame.int[0] := fg.header
                frame IS frame.buffer[fg.header[hi.camera.number]][fg.header[hi.
                SEQ i = 0 FOR y.pixel
                  SEQ
                    frame[(i*2)+1] := frame.store[0][i]
                    frame[((i*2)+1)+1] := frame.store[1][i]
                fg.access.clear ! fg.header[hi.camera.number]; fg.header[hi.fram
                fg.to.host ! e.ok
          ELSE -- TRUE
            fg.to.host ! e.invalid.command
:

Bubble 4 .

PROC clock(CHAN OF BYTE send.time.request,CHAN OF INT send.time.reply,
          CHAN OF ANY clock.request,clock.reply)
  SEQ
    --==>> occam clock <<==--
    INT intrnl.time,intrnl.utc.time:
    INT start.time,intrnl.time.frac:
    INT time.now:
    INT any2:
    TIMER clock:
    SEQ
      send.time.request ! (BYTE 0)
      send.time.reply ? intrnl.time --; intrnl.utc.time
      clock ? start.time
      intrnl.time.frac := 0
      WHILE TRUE
        SEQ
          clock.request ? any2
          clock ? time.now
          intrnl.time.frac := intrnl.time.frac + (time.now MINUS start.time)
          WHILE (intrnl.time.frac > 15625)
            SEQ
              intrnl.time.frac := intrnl.time.frac - 15625
              intrnl.time := intrnl.time + 1
          clock.reply ! intrnl.time; intrnl.time.frac
          clock ? start.time
:
```

Bubble 5

```
PROC access.control()
  INT camera,frame:
  SEQ
    WHILE TRUE
      ALT
        -->> request from display for access to frame buffer
        display.access.request ? camera;frame
          IF
            access[camera][frame]
              SEQ
                access[camera][frame] := FALSE
                display.access.reply ! TRUE
                --display.access.frame ! frame.buffer[camera][frame]
            TRUE
              display.access.reply ! FALSE
        -->> request from frame grabber for access to frame buffer
        fg.access.request ? camera; frame
          SEQ
            IF
              access[camera][frame]
                SEQ
                  access[camera][frame] := FALSE
                  fg.access.reply ! TRUE
              TRUE
                fg.access.reply ! FALSE -->> release of frame buffer control from display
        display.access.clear ? camera; frame
          access[camera][frame] := TRUE
        -->> release of frame buffer control from frame grabber
        fg.access.clear ? camera; frame
          access[camera][frame] := TRUE
:
```

A.2. CONTROLLER BOARD - FIGURE 10

Bubble 1

```
#INCLUDE "hostio.inc"
PROC server(CHAN OF SP fs,ts,
            CHAN OF ANY key.request,key.reply,time.request,time.reply,
            read.line.request,read.line.reply,read.line.512.request,
            read.line.512.reply,read.request,read.reply,write.request,
            write.reply,fwrite.request,fwrite.reply,open.request,open.reply,
            test.exists.request,test.exists.reply,close.request,close.reply,
            write.string.request,write.string.reply,write.int.request,
            write.int.reply,write.nl.request,write.nl.reply,
            receive.packet.reply,fast.write.request,fast.write.reply,
            fast.read.request,fast.read.reply,header.write.request,
            header.write.reply,CHAN OF [6]BYTE send.packet.request)
  #USE "hostio.lib"
  #INCLUDE "ttgscon.inc"
  [12]BYTE name:
  [481*512]BYTE array:
  SEQ
    -->> Monitor SERVER <<--
    [12]BYTE name:
    [481*512]BYTE array:
    PROC fast.write([12]BYTE filename,[]BYTE buffer)
      INT num.bytes,send.bytes,start:
      [16]BYTE packet.out:
      [6]BYTE packet.in:
      BOOL error:
      INT16 length:
      SEQ
        packet.out :=[BYTE 207,' ',' ',' ',' ',' ',' ',' ',' ',' ',' ',' ',' ',' ',' ',' '
        SEQ i = 0 FOR 12
          packet.out[2+i] := filename[i]
        sp.send.packet(ts,packet.out,error)
        num.bytes := SIZE buffer
        start := 0
        WHILE (num.bytes <> 0)
          SEQ
            IF
```

```
          num.bytes < 25000
            send.bytes := num.bytes
          TRUE
            send.bytes := 25000
        ts ! INT16 send.bytes::[buffer FROM start FOR send.bytes]
        num.bytes := num.bytes - send.bytes
        start := start + send.bytes
      ts ! INT16 0::""
    sp.receive.packet(fs,length,packet.in,error)
:
PROC fast.read([[12]BYTE filename,[]BYTE buffer2)
  [65536]BYTE buffer:
  INT num.bytes,send.bytes,start:
  [16]BYTE packet.out:
  [6]BYTE packet.in:
  BOOL error,ok:
  INT16 length:
  SEQ
    packet.out :=[BYTE 206,' ',' ',' ',' ',' ',' ',' ',' ',' ',' ',' ']
    SEQ i = 0 FOR 12
      packet.out[2+i] := filename[i]
    sp.send.packet(ts,packet.out,error)
    start := 0
    ok := TRUE
    WHILE ok
      SEQ
        fs ? length::buffer
        [buffer2 FROM start FOR INT length] := [buffer FROM 0 FOR INT length
        start := start + (INT length)
        IF
          length = (INT16 0)
            ok := FALSE
          TRUE
            SKIP
    sp.receive.packet(fs,length,packet.in,error)
:
VAL max.alarm IS 3 :
VAL int.zero  IS (INT '0') :
BYTE mode,type:
INT any, alarm.number:
[512*481]BYTE io.buffer:
[81]BYTE line.buffer:
[512]BYTE filename:
INT32 streamid:
INT len,number:
BOOL error:
BOOL last.time:
INT  last.count:
[6]BYTE packet.in,packet.out:
SEQ
  last.time := FALSE
  last.count := 0
  WHILE TRUE
    ALT
      key.request ? any
        SEQ
          SEQ
            SEQ
              --query.to.alarm ! alarm.number           -- trigger to send a
              --alarm.from.query ? alarm.number
              --IF
              --  (alarm.number > 0) AND (alarm.number <= max.alarm)
              --    key.reply ! int.zero + alarm.number
              --  TRUE
              BYTE key,result:
              SEQ
                so.pollkey(fs,ts,key,result)
                IF
                  result = spr.ok
                    SEQ
                      IF
                        (INT key) = 0
                          SEQ
                            so.pollkey(fs,ts,key,result)
                            key := BYTE (((INT key) + 128) REM 256)
                        TRUE
                          SKIP
```

```
              so.write.int(fs,ts,(INT key),10)
              key.reply ! (INT key)
          TRUE
            INT16 length:
            SEQ
              packet.out := [BYTE 203,BYTE 0,BYTE 0,BYTE 0,BYTE : ·(
              sp.send.packet(ts,packet.out,error)
              sp.receive.packet(fs,length,packet.in,error)

IF
                packet.in[1] = (BYTE 0)
                  SEQ
                    IF
                      (any = 1) AND ((packet.in[2] = (BYTE 200))OR(p
                        IF
                          last.time
                            SEQ
                              last.count := last.count + 1
                              IF
                                last.count > 2
                                  SEQ
                                    last.time := FALSE
                                    key.reply ! 0
                                TRUE
                                  key.reply ! 0
                          TRUE
                            SEQ
                              last.time := TRUE
                              last.count := 0
                              key.reply ! INT packet.in[2]
                      TRUE
                        key.reply ! INT packet.in[2]
                TRUE
                  key.reply !  0
time.request ? any
  INT32 longtime,utctime:
  SEQ
    so.time(fs,ts,longtime,utctime)
    time.reply ! longtime ; longtime
read.line.request ? streamid
  SEQ
    so.read(fs,ts,streamid, len, line.buffer)
    read.line.reply ! [line.buffer FROM 0 FOR 80]
read.line.512.request ? streamid
  SEQ
    so.read(fs,ts,streamid, len, filename)
    read.line.512.reply ! [filename FROM 0 FOR 512]
read.request ? streamid
  SEQ
    so.read(fs,ts,streamid, len, io.buffer)
    read.reply ! io.buffer
write.request ? streamid; len::io.buffer
  INT length.written:
  VAL []BYTE output.buffer IS [io.buffer FROM 0 FOR len]:
  SEQ
    so.write(fs,ts,streamid,output.buffer,length.written)
    write.reply ! e.ok
fwrite.request ? streamid; len::io.buffer
  BYTE result:
  VAL []BYTE output.buffer IS [io.buffer FROM 0 FOR len]:
  SEQ
    so.fwrite.string.nl(fs,ts,streamid,output.buffer,result)
    fwrite.reply ! e.ok
open.request ? len::filename; type ; mode
  VAL []BYTE Filename IS [filename FROM 0 FOR len]:
  BYTE result:
  SEQ
    so.open(fs, ts,Filename , type, mode, streamid, result)
    open.reply ! streamid
    open.reply ! (INT result)
test.exists.request ? len::filename
  VAL []BYTE Filename IS [filename FROM 0 FOR len]:
  BYTE result:
  BOOL exists:
  SEQ
    so.test.exists(fs, ts,Filename , exists)
```

```
            IF
              exists
                test.exists.reply ! 0
              TRUE
                test.exists.reply ! 1
          close.request ? streamid
            BYTE result:
            SEQ
              so.close(fs,ts,streamid,result)
              close.reply ! e.ok
          write.string.request ? len::io.buffer
            VAL []BYTE String IS [io.buffer FROM 0 FOR len]:
            SEQ
              so.write.string(fs,ts,String)
              write.string.reply ! e.ok
          write.int.request ? number
            SEQ
              so.write.int(fs,ts,number,8)
              write.int.reply ! e.ok
          write.nl.request ? any
            SEQ
              so.write.nl(fs,ts)
              write.nl.reply ! 1
          send.packet.request ? packet.out
            INT16 length:
            SEQ
              sp.send.packet(ts, packet.out, error)
              sp.receive.packet(fs, length, packet.in, error)
              receive.packet.reply ! packet.in
          fast.write.request ? name;array
            SEQ
              PRI PAR
                fast.write(name,array)
                SKIP
              fast.write.reply ! e.ok
          fast.read.request ? name
            SEQ
              PRI PAR
                fast.read(name,array)
                SKIP
              fast.read.reply ! array
          header.write.request ? streamid;filename
            INT length.written:
            SEQ
              so.write(fs,ts,streamid,filename,length.written)
              header.write.reply ! 0
:
```

Bubble 2

```
PROC g.send (VAL INT command, VAL []INT params) -- send a command and receive re
  INT reply :
  SEQ
    host.to.ttg3 ! command
    SEQ i = 0 FOR SIZE params
      host.to.ttg3 ! INT32 params[i]
    ttg3.to.host ? reply
:

PROC g.send.fg (VAL INT command, VAL [128]INT params) -- send a command and rece
  INT reply :
  SEQ
    host.to.ttg3 ! command
    host.to.ttg3 ! params
    ttg3.to.host ? reply
:

PROC g.send.byte2 (VAL INT command,VAL INT frame, VAL []BYTE params)
  INT reply :
  SEQ
    host.to.ttg3 ! command
    host.to.ttg3 ! frame
    host.to.ttg3 ! params
    ttg3.to.host ? reply
```

```
:
PROC g.send1 (VAL INT command)
  -- send a command an recieve reply
  INT reply :
  SEQ
    host.to.ttg3 ! command
    ttg3.to.host ? reply
:

PROC g.send2 (VAL INT com1, VAL INT com2)
  -- send a two param command and recieve reply
  INT reply :
  SEQ
    host.to.ttg3 ! com1; INT32 com2
    ttg3.to.host ? reply
:
PROC g.send3 (VAL INT com1, VAL INT com2, VAL INT com3)
  INT reply :
  SEQ
    host.to.ttg3 ! com1; INT32 com2;INT32 com3
    ttg3.to.host ? reply
:

PROC g.send4 (VAL INT com1, VAL INT com2, VAL INT com3,VAL INT com4)
  INT reply :
  SEQ
    host.to.ttg3 ! com1; INT32 com2;INT32 com3;INT32 com4
    ttg3.to.host ? reply
:

PROC g.send5 (VAL INT com1, VAL INT com2, VAL INT com3,VAL INT com4,VAL INT com5
  INT reply :
  SEQ
    host.to.ttg3 ! com1;  com2; com3; com4; com5
    ttg3.to.host ? reply
:
PROC g.send6 (VAL INT com1, VAL INT com2, VAL INT com3,VAL INT com4,VAL INT com5
  INT reply :
  SEQ
    host.to.ttg3 ! com1;  com2; com3; com4; com5; com6
    ttg3.to.host ? reply
:

PROC g.send7 (VAL INT com1, VAL INT com2, VAL INT com3,VAL INT com4,VAL INT com5
  INT reply :
  SEQ
    host.to.ttg3 ! com1;  com2; com3; com4; com5; com6; com7
    ttg3.to.host ? reply
:

PROC write(VAL INT string.pos.x,VAL INT string.pos.y,VAL INT num.char,VAL []BYTE
  SEQ
    g.send(c.move,[string.pos.x,string.pos.y])
    g.send.byte2(c.write.string,num.char,string)
:

#INCLUDE "function.inc"
#INCLUDE "zone.inc"
SEQ
  -->> display controler <<--
  ---------------------- CONSTANTS ----------------------------------------
  VAL INT max.menu IS 4:             -- maximum number of menus defined
  VAL INT menu.lines IS 27:          -- maximum number of lines per menu
  VAL INT menu.lines.char IS 80:     -- maximum number of characters per line
  VAL INT max.alarm IS 4:            -- max.alarm maximum number of concurrent alar
                                     -- max.alarm is also present in server.occ
                                     -- max.alarm is also present in ttgs.occ
  VAL INT max.windows IS 4:          -- maximum number of windows for a display
  VAL INT max.displayable.alarms IS 2:
  [5][3][8] BYTE q.text:
  [5][55] BYTE q.title:
  [5]INT q.choices:
  INT active.question,active.choice,first.choice:
  ---------------------- DISPLAY VARIABLES ----------------------------
```

```
INT active.window:
-- active.window - the active window (quadrant) (0,1,2,3) on the screen
[max.windows]INT zoom.state:
-- zoom.state a reference to determine window status
INT zone.to.display:
-- zone.to.display - values from 0 to max.zones (a zone is two cameras)
[cameras.per.zone]INT frame.to.display:
-- frame.to.display an array maintaining the alarm frame for each camera in a
INT last.position:
-- last.position is used in update.display() (0,1)
INT last.side:
-- last.side will determine the active side of the active alarm window (0,1)
[max.windows]INT window.contents:
-- window.contents maintains which windows are full/not full (-1,0,1)
INT contrast.level:
-- contrast.level = working contrast level
VAL INT contrast.level.orig IS 13:
-- contrast.level.orig = original contrast level (for contrast restore)
VAL INT contrast.adjust      IS 20:
-- contrast.adjust contrast level adjustment factor
[max.zones]INT cause:
-- cause is an alarm cause number from the "cause.inc" include list VAL INT y.image.size IS 480:   -- !! duplicates of y.image.size in ttgs
VAL INT x.image.size IS 512:   -- !! duplicates of x.image.size in ttgs

---------------------- ALARM VARIABLES ---------------------------

INT active.alarm:
-- active.alarm - the currently selected alarm zone from the alarm buffer
[max.alarm]INT alarm.zone:
-- alarm.zone is an array zone numbers which correspond to an alarm
INT alarm.state:
-- alarm.state determines how many alarms have been generated 0,1,2..?
[max.alarm][cameras.per.zone]INT alarm.time:
-- alarm.time  this is the time of the alarm for each camera in the zone
-- it is a two dimensional array [maximum alarms][# cameras in a zone]
[max.alarm][cameras.per.zone]INT alarm.frac.time:
-- alarm.frac.time - maintains the fractions of a second for each alarm zone
[max.alarm][22]BYTE alarm.info: -- this buffer maintains a list of info for ---------------------- MISC CONTROL VARIABLES ---------------------
BOOL HOLD,QUESTION,MARK:
BOOL ONMENU,full.screen,retrieve,supervisor.mode:
-- HOLD - puts a HOLD on the changing of active windows i.e. when a menu is
--        - on the screen or marking an alarm
-- MARK - alows marking of an alarm (while mark is true, the graphics
--        - cursor is on the screen
-- full.screen
-- retrieve
-- supervisor.mode (will differentiate between sustem users based upon keyswit
-- QUESTION - wait for response from a QUESTION (true = wait) when true HOLD a
BOOL PENDING.DISPLAY:   --!! will be true if screen is not full, yet an alarm i
[24][9]INT saved.index:
-- saved.index
[18]INT lookup:
-- lookup
INT key.touched, key.supervisor:
-- key.touched and key.supervisor are ascii characters that are passed
-- from the server proc - these indicates an action to take
[481*512]BYTE data:
-- data
INT reply:
-- reply
INT loop,loop2:
-- loop and loop2 are loop counters (ie. indexing values)
[2]INT cursor:
-- cursor (the position of the cursor on the screen [0] is vertical
INT Operator.ID:
-- operator.id: not yet utilized, however this is stored with the image
--             when the image is stored to disk
INT32 streamid:
-- streamid
INT result,result2:
-- result  - an integer flag used for channel output (can carry any int howeve
-- result2 - an integer flag used for channel output
INT sequence.count:
--JDH sequence count is a frame counter for sequencing
```

```
-------------------- menu VARIABLES --------------------------------
[max.menu][menu.lines][menu.lines.char]BYTE menu.text:
-- menu.text - is an array of strins to display in the menu structure
[4]INT menu.max:
-- menu.max
[max.menu]INT menu.pos:
[max.menu]INT menu.loc:
INT window.pos:
-- menu.pos         -- used in menuing
-- window.pos
INT active.menu:
-- active.menu a binary switch to track if a menu is currently used (0=no)
INT menu.items:
-- returned by ttgs to indicate number of displayed menu items
---------------------- STORAGE VARIABLES ---------------------------
[160][512]BYTE FAT:
-- fat
INT num.FAT.entries:
-- num.FAT.entries
VAL [2]BYTE default.drive IS "E:" :
VAL [3][14]BYTE names IS ["e:picture1.img","e:picture2.img","e:picture3.img"]:
-- names JDH(looks like file names stored to drive e)
[2]BYTE drive:
[max.zones][cameras.per.zone]INT frames.stored:
-- ?JDHframes.stored
[max.windows][num.frames]INT saved.frames:
-- ?JDHsaved.frames PROC title.display()
  --JDH title display draws a banner line across the top of the secure
  --JDH mode screen
  SEQ
    g.send2( c.select.fg.colour,top.color)  -- selects foreground color
    g.send2( c.select.bg.colour,BLACK)      -- selects background color
    g.send2 (c.set.xwidth,2)                -- sets char. width 2 units (22 pi
    g.send2 (c.set.yheight,3)               -- sets char. height 3 units (33 p
    write(50,15,9,"Presearch")
    write(300,15,5,"Image")                   -- write strings in graphic char
    write(600,15,7,"Capture")
    write(900,15,6,"System")
    g.send2 (c.set.xwidth, 1)               -- sets char. width 1 unit (11 pix
    g.send2 (c.set.yheight,1)               -- sets char. width 2 units (22 pi
    write(1150,4,14,"Presearch Inc.")
    write(1150,30,12,"Fairfax, VA.")
:

PROC update.display()
  SEQ
    -- this procedure will update the display by getting the next
    -- camera image from the frame grabber IF  -- this process will rotate through the zones by incrementing the zone
     ·((zone.to.display+1) > (max.zones-1))
        zone.to.display:=0
      TRUE
        zone.to.display := zone.to.display + 1

SEQ loop = 0 FOR cameras.per.zone -- updates all frames from a zone
      SEQ
        frame.request ! zone[zone.to.display][loop]  -- requests a frame from z
        frame.ready ?  frame.to.display[loop]         -- returns an active frame ----------------------------------------------------------------------
---- CODE TO PLACE ACTIVE WINDOW IN ALARM MODE ----------------------
--IF
--    (((zone[zone.to.display][0]< 0) OR (frame.to.display[0] < 0)) OR HOLD)
--      SKIP  -- if no camera is present or no frame is returned or HOLD the
--    (alarm.state > 0) AND (NOT full.screen) -- if there is 1 or more alarm
--      INT active :
--      -- active is a variable which designates the current active window
--      SEQ
--        IF
--          alarm.state = 1 -- one alarm (sends zone with alarm to host.to.t
--            IF
--              zone.to.display = alarm.zone[1] -- sets the active zone to t
--                g.send7(c.display.frame, zone[zone.to.display], frame.to.d
--              TRUE
```

```
--              SKIP
--          alarm.state = 2 -- 2 concurrent alarms
--            SEQ
--              IF
--                zone.to.display = alarm.zone[1]
--                  IF
--                    alarm.zone[1] = alarm.zone[2]
--                      last.position := (last.position + 1) REM 2
--                    TRUE
--                      last.position := 0
--                zone.to.display = alarm.zone[2]
--                  last.position := 1
--                TRUE
--                  SKIP
--              IF
--                ((last.position = 0) AND (active.window = 0))
--                --JDH
--                --JDH(((last.position = 0) AND (active.window = 0)) OR
--                --JDH(( last.position = 1) AND (active.window = 2)))
--                  active := 0
--                TRUE
--                  active := 1
--              IF
--                --JDH alarm zone 1 or alarm zone 2 need to be displayed
--                ((zone.to.display = alarm.zone[1])  OR
--                (zone.to.display = alarm.zone[2]))
--                  g.send7( c.display.frame, zone[zone.to.display], frame.t
--                TRUE
--                  SKIP
--        TRUE
--          SKIP
-- TRUE
-----------------------------------------------------------------
INT last.y.position: -- last.y.position is a rotating counter (0,1)
                     -- to vary the position on the screen of the zone
                     -- to be displayed
SEQ
  last.y.position :=((zone.to.display)REM 2)   -- will maintain values bet
  g.send7z(c.display.frame, zone[zone.to.display], frame.to.display, last.
  -- c.dispqlay.frame will display the cameras for a given zone in secure
  -- side is passed as 0, for c.display.frame will put both cameras up
:

PROC Remove.menu(VAL INT active.window,VAL INT alarm.state)
  INT position,side:
  SEQ
    IF
      alarm.state>0
        SEQ
          position := remove.sign((active.window/2)-1)
          side := 1
      TRUE
        SEQ
          position :=0
          side := 1
    g.send4(c.unmenu,position,side,alarm.state)
:

PROC MENU(VAL INT alarm.state, VAL INT active.window,VAL INT active.menu)
  VAL [4][20]BYTE menu.label IS [ "   Cause for Alarm    ",
         " TVID System Menu    "," Cleared Buffer Menu",
         "Frame Grabber Config"]:
  INT position,side,max:
  INT length,secure:
  [10]BYTE temp.string:
  SEQ
    -- menu states:
    --    1 = MARK CAUSES
    --    2 = PLACES TO TRANSFER IMAGES
    --    3 = BUFFERED ALARM TABLE
    --    4 = SHOWS FRAME GRABBER - not used in final sys
    --!! put menu on right opposite to active window
    IF
      alarm.state>=1
        secure:=0
      TRUE
        secure:=1
```

```
    IF
      secure < 1
        position := remove.sign((active.window/2)-1)
      TRUE
        position := 0
    side := 1
    IF
      ((active.menu>=0) AND (active.menu<2))
        INT reply:
        SEQ
          length:=SIZE (menu.label[active.menu])
          host.to.ttg3 ! c.draw.menu;position;side;length::menu.label[active.m
          ttg3.to.host ? menu.items
          so.write.int(fs,ts,menu.items,3)
      TRUE
        SKIP
:

PROC pending.alarm([][]BYTE alarm.info,VAL INT alarm.state,
    VAL INT zone.to.display,VAL INT longtime,VAL []BYTE source)
  VAL INT alarm IS (alarm.state-1):
  INT len:
  [19]BYTE time:
  SEQ
    SEQ
      IF
        window.contents[(alarm/2)] >= 0  -- if the alarm is displayed, ... pen
          alarm.info[alarm][0]:='>'       -- > is the "on screen" de
        TRUE
          SKIP
    SEQ
      alarm.info[alarm][1]:=(BYTE (zone.to.display+48))
      so.time.to.ascii(INT32 longtime,FALSE,FALSE,time)
      [alarm.info[alarm] FROM 3 FOR 8]:=[time FROM 0 FOR 8]
    SEQ
      len:=SIZE(source)
      IF
        len > 11
          len :=11
        TRUE
          SKIP
      [alarm.info[alarm] FROM 12 FOR len]:= [sc...e FROM 0 FOR len]
:

PROC Question(VAL INT active.window,VAL INT direction,VAL INT choices,
              []BYTE title,[][]BYTE choice.text,VAL INT alarm.state)
  INT side,position,len:
  SEQ
    side:=remove.sign((active.window REM 2)-1)
    position:=remove.sign((active.window/2)-1)
    len:=SIZE(title)
    host.to.ttg3 ! c.draw.question.box;position
    host.to.ttg3 ! side;direction;choices;len::title;alarm.state;choice.text
    ttg3.to.host ? reply
:
PROC Remove.Question(VAL INT active.window,VAL INT alarm.state)
  INT side,position:
  SEQ
    side:=remove.sign((active.window REM 2)-1)
    position:=remove.sign((active.window/2)-1)
    host.to.ttg3 ! c.remove.question;position;side;alarm.state
    ttg3.to.host ? reply
:

PROC Horn.Control(VAL INT state)    -- controls alarm speaker on keyboard
  [6]BYTE packet:
  SEQ
    IF
      state = 1
        SEQ
          packet := [BYTE 205,BYTE 7,BYTE 0,BYTE 0,BYTE 0,BYTE 0]   -- sends
          send.packet.request ! packet                               -- which
          receive.packet.reply ? packet                              -- the ke
      state = 0
        SEQ
          packet := [BYTE 205,BYTE 8,BYTE 0,BYTE 0,BYTE 0,BYTE 0]   -- BYTE 8
          send.packet.request ! packet
          receive.packet.reply ? packet
```

```
          TRUE
             SKIP
:

[6]BYTE packet:
SEQ
  #INCLUDE "cause.inc"
  #INCLUDE "contrast.inc"
  #INCLUDE "frame.inc"
  #INCLUDE "question.inc"
  zoom.state := [0,0,0,0]
  lookup := lookup.default
  num.FAT.entries := 0
  contrast.level := contrast.level.orig
  active.window := -1
  active.question:= -1
  active.choice:=0
  menu.items:=0
  HOLD := FALSE
  ONMENU := FALSE
  MARK := FALSE
  QUESTION := FALSE
  PENDING.DISPLAY :=FALSE
  retrieve := FALSE
  full.screen := FALSE
  supervisor.mode := FALSE
  key.supervisor := 1
  menu.pos := [0,0,0,0]
  menu.loc := [0,0,0,0]
  window.pos := 0
  last.position := 0
  alarm.state := 0
  active.menu := -1
  loop := 0
  zone.to.display := -1
  --JDHcamera.to.display := -1 -- no longer dealing with camera
  send.packet.request ! [BYTE 204,BYTE 0,BYTE 0,BYTE 0,BYTE 0,BYTE 0]
  receive.packet.reply ? packet SEQ loop2=0 FOR max.zones
    SEQ loop=0 FOR cameras.per.zone          -- initialize all cells of
      frames.stored[loop2][loop] := 0      -- frames.stored array to 0
  SEQ loop2=0 FOR max.alarm
    alarm.info[loop2]:="                              "

title.display()                            -- draw header box on screen
  WHILE TRUE
    INT reply: .
    SEQ
      IF
        ONMENU
          key.request ! 1                    -- requests a character from
        TRUE                                 -- the server (menu mode)
          key.request ! 0                    -- (secure/active modes)
      --?JDHkey.reply ? key.supervisor       -- implement when keyboard is finish
      key.reply ? key.touched
      --IF
      -- key.supervisor = 1                  -- ASCII DEC 1 / key switch to super
      --    supervisor.mode:= TRUE
      -- TRUE                                -- ASCII DEC 0 / key switch to regul
      --    supervisor.mode:= FALSE
      IF
        -->> Display Update if no input <<--
        --JDH
        (((key.touched = 0) AND (alarm.state=0)) AND (NOT ONMENU))
          SEQ
            update.display()                 -- secure mode, (displays a single zon -->> Contrast control up and down <<--
        ((key.touched = 100) OR (key.touched = 120))  -- up contrast (delete b
          -- HOLD      = no effect
          -- QUESTION  = no effect
          -- ONMENU    = no effect
          -- mark      = no effect
          SEQ
```

```
              IF
                key.touched = 100           -- up contrast
                  contrast.level := contrast.level + 1
                key.touched = 120           -- contrast down
                  contrast.level := contrast.level - 1
                TRUE
                  SKIP
              contrast.level := (contrast.level+contrast.adjust) REM 20
              g.send2(c.select.contrast,contrast.level)

-->> Contrast Restore <<-- JDH
key.touched = 113  -- restore contrast to original values
  -- HOLD     = no effect
  -- QUESTION = no effect
window.pos := 0
last.position := 0
alarm.state := 0
active.menu := -1
loop := 0
zone.to.display := -1
--JDHcamera.to.display := -1 -- no longer dealing with camera
send.packet.request ! [BYTE 204,BYTE 0,BYTE 0,BYTE 0,BYTE 0,BYTE 0]
receive.packet.reply ? packet SEQ loop2=0 FOR max.zones
  SEQ loop=0 FOR cameras.per.zone           -- initialize all cells of
    frames.stored[loop2][loop] := 0         -- frames.stored array to 0
SEQ loop2=0 FOR max.alarm
  alarm.info[loop2]:=""                     "

title.display()                             -- draw header box on screen
WHILE TRUE
  INT reply:
  SEQ
    IF
      ONMENU
        key.request ! 1                     -- requests a character from
      TRUE                                  -- the server (menu mode)
        key.request ! 0                     -- (secure/active modes)
    --?JDHkey.reply ? key.supervisor        -- implement when keyboard is finish
    key.reply ? key.touched
    --IF
    --  key.supervisor = 1                  -- ASCII DEC 1 / key switch to super
    --    supervisor.mode:= TRUE
    --  TRUE                                -- ASCII DEC 0 / key switch to regul
    --    supervisor.mode:= FALSE
    IF
      -->> Display Update if no input <<--
      --JDH
      (((key.touched =  0) AND (alarm.state=0)) AND (NOT ONMENU))
        SEQ
          update.display()                  -- secure mode, (displays a single zon -->> Contrast control up and down <<--
      ((key.touched = 100) OR (key.touched = 120))  -- up contrast (delete b
        -- HOLD     = no effect
        -- QUESTION = no effect
        -- ONMENU   = no effect
        -- mark     = no effect
        SEQ
          IF
            key.touched = 100           -- up contrast
              contrast.level := contrast.level + 1
            key.touched = 120           -- contrast down
              contrast.level := contrast.level - 1
            TRUE
              SKIP
          contrast.level := (contrast.level+contrast.adjust) REM 20
          g.send2(c.select.contrast,contrast.level)

-->> Contrast Restore <<-- JDH
      key.touched = 113  -- restore contrast to original values
        -- HOLD     = no effect
        -- QUESTION = no effect
```

```
-- ONMENU    = no effect
-- MARK      = no effect
SEQ
  contrast.level := (contrast.level.orig+contrast.adjust) REM 20
  g.send2(c.select.contrast,contrast.level)

-->> Alarm control <<--
((key.touched >= (INT '1')) AND (key.touched <= (max.zones+48))) --!!
  [10]BYTE Source:
  [19]BYTE string:
  INT alarm.side:
  SEQ
    Horn.Control(1)                        -- turn keyboard alarm on
    alarm.state := alarm.state + 1 -- increment alarm state (new alarm
    IF
      ((key.touched >= (INT '1'))AND (key.touched <= (max.zones+48)))
        SEQ
          zone.to.display := key.touched - 49  -- zone to display
          Source := "Keyboard  "
      TRUE
        SKIP
    Horn.Control(0)                         -- turn off keyboard ala
    SEQ loop = 0 FOR cameras.per.zone       -- gets frames from fram
      SEQ
        frame.request ! zone[zone.to.display][loop]    -- ask for the
        frame.ready ? frame.to.display[loop]           -- get most rec
        frame.time.request ! zone[zone.to.display][loop]; frame.to.dis
        frame.time.reply ? alarm.time[alarm.state][loop]; alarm.frac.t
        g.send3( c.set.alarm.time,alarm.time[alarm.state][loop],alarm.
      -- end loop
    -- load screen buffers with curr/before/after images/info
    alarm.zone[alarm.state-1] := zone.to.display
    IF
      alarm.state=3
        STOP
      TRUE
        SKIP
    g.send4z(c.get.frame.ttgf,zone.to.display,frame.to.display,(alarm.
    IF
      (alarm.state<=max.displayable.alarms) AND (NOT ((HOLD OR QUESTIO
        -- identifies an alarm from keyboard if alarm.state<2 and no
        SEQ
          IF -- full screen zoom
            full.screen
              SEQ
                full.screen := FALSE
                g.send1(c.zoom.reset)        -- reset alarm window to remove
            TRUE                             -- full screen zoom
              SKIP
          IF
            alarm.state = 1                  -- new alarm (from secure mode)
              SEQ
                g.send2(c.clear.screen, BLACK)     -- clear the scree
                window.contents := [-1,-1,-1,-1]   -- clear window.co
                zoom.state := [0,0,0,0]            -- set all zoom st
            TRUE
              SKIP
          VAL sequence IS 0:                 -- display image c
          SEQ
            active.window := 0               -- set active wind -- ONMENU    = no effect
-- MARK      = no effect
SEQ
  contrast.level := (contrast.level.orig+contrast.adjust) REM 20
  g.send2(c.select.contrast,contrast.level)

-->> Alarm control <<--
((key.touched >= (INT '1')) AND (key.touched <= (max.zones+48))) --!!
  [10]BYTE Source:
  [19]BYTE string:
  INT alarm.side:
  SEQ
    Horn.Control(1)                        -- turn keyboard alarm on
    alarm.state := alarm.state + 1 -- increment alarm state (new alarm
    IF
      ((key.touched >= (INT '1'))AND (key.touched <= (max.zones+48)))
        SEQ
          zone.to.display := key.touched - 49  -- zone to display
          Source := "Keyboard  "
```

```
      TRUE
        SKIP
    Horn.Control(0)                                         -- turn off keyboard ala
    SEQ loop = 0 FOR cameras.per.zone                       -- gets frames from fram
      SEQ
        frame.request ! zone[zone.to.display][loop]         -- ask for the
        frame.ready ? frame.to.display[loop]                -- get most rec
        frame.time.request ! zone[zone.to.display][loop]; frame.to.dis
        frame.time.reply ? alarm.time[alarm.state][loop]; alarm.frac.t
        g.send3( c.set.alarm.time,alarm.time[alarm.state][loop],alarm.
        -- end loop
    -- load screen buffers with curr/before/after images/info
    alarm.zone[alarm.state-1] := zone.to.display
    IF
      alarm.state=3
        STOP
      TRUE
        SKIP
    g.send4z(c.get.frame.ttgf,zone.to.display,frame.to.display,(alarm.
    IF
      (alarm.state<=max.displayable.alarms) AND (NOT ((HOLD OR QUESTIO
        -- identifies an alarm from keyboard if alarm.state<2 and no
        SEQ
          IF -- full screen zoom
            full.screen
              SEQ
                full.screen := FALSE
                g.send1(c.zoom.reset)      -- reset alarm window to remove
            TRUE                           -- full screen zoom
              SKIP
          IF
            alarm.state = 1                -- new alarm (from secure mode)
              SEQ
                g.send2(c.clear.screen, BLACK)     -- clear the scree
                window.contents := [-1,-1,-1,-1]   -- clear window.co
                zoom.state := [0,0,0,0]            -- set all zoom s:
            TRUE
              SKIP
          VAL sequence IS 0:                       -- display image :
            SEQ
              active.window := 0                   -- set active w.-:
              active.alarm:= 0 -- alarm.state-1
              SEQ loop=(alarm.state-1) FOR cameras.per.zone   -- set up
                SEQ        -- JDH window contents will contain
                  window.contents[(loop+(alarm.state-1))] := (sequence+(
                  g.send6(c.copy.to.screen,window.contents[loop+(alarm.s
              g.send2(c.set.active,active.window)         -- sets color bord (((HOLD OR QUESTION) OR (ONMENU OR MARK)) OR (alarm.state>max.di
        -- this procedure will put incomming alarms in pending buffer,
        SEQ
          PENDING.DISPLAY := TRUE -- Pending menu already drawn (first
      TRUE
        SKIP
    alarm.side:=0
    PENDING.DISPLAY:=TRUE
    pending.alarm(alarm.info,alarm.state,zone.to.display,alarm.time[al
    IF
      PENDING.DISPLAY
        SEQ
          host.to.ttg3 ! c.add.pending.alarm;active.window;alarm.side;
          ttg3.to.host ? reply
      TRUE
        SKIP -->> Window Select w/ lockout depending on alarm state <<--
((((key.touched = (INT '!')) OR (key.touched = (INT '@'))) OR
  (((key.touched = (INT '#')) OR (key.touched = (INT '$'))) AND (alar
  (alarm.state > 0)) AND
 (NOT ((ONMENU OR QUESTION) OR (MARK)))
  -- QUESTION = stops execution
  -- ONMENU   = stops execution
  -- MARK     = stops execution
  INT position,side,old.active:
  SEQ
```

```
IF
  full.screen
    SEQ
      g.send1(c.zoom.reset)
      zoom.state:=[0,0,0,0]
      HOLD := FALSE
  TRUE
    SKIP
old.active:=active.window
IF
  key.touched = (INT '!') -- shift to upper left
    SEQ
      active.window:=0
      active.alarm:=0   --!! currently hard coded until we can
                        --!! page through all alarms in the pending
  key.touched = (INT '@') -- shift to upper right
    SEQ
      active.window:=1
      active.alarm:=0
  key.touched = (INT '#') -- shift to lower left
    SEQ
      active.window:=2
      active.alarm:=1
  key.touched = (INT '$') -- shift to lower right
    SEQ
      active.window:=3
      active.alarm:=1
  TRUE
    SKIP
position := active.window / 2
side := active.window REM 2
g.send2(c.set.active,active.window) -- set active/inactive windows
IF -- position has changed
  (((((active.window/2)=0) AND ((old.active/2)> 0)) OR
    (((active.window/2)>0) AND ((old.active/2)=0))) AND PENDING.DIS
    SEQ
      g.send6(c.move.alarm.buffer,alarm.state,(old.active/2),0,(ac
      g.send1(c.zoom.reset)
      zoom.state:=[0,0,0,0]
  TRUE
    SKIP -->> Reset contol to clear alarms <<--
(key.touched = (INT 'c')) --AND (NOT (((full.screen OR HOLD) OR (ONMEN
  SEQ
    IF
      ((alarm.state > 0) AND (NOT (full.screen)))
        SEQ
          --?JDHalarm.log()  -- written.to disk
          alarm.state := alarm.state - 1
      TRUE
        SKIP
    IF
      full.screen
        INT position,side:
        SEQ
          g.send1( c.zoom.reset)
          full.screen := FALSE
          position := active.window / 2
          side := active.window REM 2
          --?JDH wont work yet
          --g.send7(c.copy.to.screen,window.contents[active.window]/nu
          --          window.contents[active.window] REM num.frames,
          --          position,side,1,0)
      ((active.window >= 0) AND (active.window < max.windows))
        SEQ
          -- This means that there was more than one active alarm
          g.send1( c.zoom.reset)
          zoom.state := [0,0,0,0]
          IF
            ((alarm.state <2) AND (alarm.state <>0 ))  -- ?JDH set up
              SEQ                                      -- ?JDH small s
                SEQ loop=active.alarm FOR (alarm.state-active.alarm)
                  SEQ
                    SEQ loop2 = loop FOR (cameras.per.zone*num.frames)
                      g.send3(c.move.frames,loop2,loop2+(cameras.per.z
                    SEQ loop2 = loop FOR (cameras.per.zone)
```

```
                    SEQ
                        window.contents[loop2] := window.contents[loop
                        zoom.state[loop2] := zoom.state[loop2+cameras.
                    alarm.zone[loop] := alarm.zone[loop+1]
                    frames.stored[loop] :=frames.stored[loop+1]
                    cause[loop]:=cause[loop+1]
                    alarm.info[loop]:=alarm.info[loop+1]
                    active.alarm := 0   -- resets active window to firs
                    g.send6(c.copy.to.screen,window.contents[loop]   ,1
                    g.send6(c.copy.to.screen,window.contents[loop+1],1
                IF
                    (alarm.state<2)
                        SEQ
                            g.send5(c.blank.frame,1,0,BLACK,0) --?JDH will n
                            g.send5(c.blank.frame,1,1,BLACK,0) --?JDH
                            window.contents[2]:=-1
                            window.contents[3]:=-1
                            zoom.state[2]:=0
                            zoom.state[3]:=0
                    TRUE
                        SKIP
                    active.alarm := 0   -- resets active window to first al
                    active.window := 0
                    g.send2(c.set.active,active.window)
                (alarm.state = 0)
                    SEQ
                        window.contents := [-1,-1,-1,-1]   -- resets all screen
                        zoom.state := [0,0,0,0]
                        SEQ loop2=0 FOR max.zones           -- clears all buffer
                            SEQ loop=0 FOR cameras.per.zone
                                frames.stored[loop2][loop] := 0
                        SEQ loop=0 FOR max.zones            -- clears all causes
                            cause[loop] := -1
                        active.alarm :=-1
                        g.send2 (c.clear.screen, BLACK)
                        title.display()
                        active.window := -1
                        HOLD := FALSE
                        ONMENU := FALSE
                        MARK := FALSE
                TRUE
                    SKIP
        TRUE
            SKIP -->> Backward and Forward images (i.e. time step) <<--
--JDH added sequencing (key.touched-117 "u")
(((((key.touched = 199) OR (key.touched = 198)) OR (key.touched = 117)
    ((key.touched=(INT 'k')) OR (key.touched=(INT 'l')))) AND
    ((active.window > (-1)) AND (NOT ((MARK OR ONMENU) OR
    (QUESTION OR HOLD)))))
    INT position,side:
    SEQ
        g.send1(c.zoom.reset)
        full.screen := FALSE
        position := active.window / 2
        side := active.window REM 2
        IF
            key.touched=117   -- "SEQUENCE"
                VAL INT oldest.image IS (num.frames-1):
                INT offset,orig:
                SEQ
                    sequence.count:=0
                    orig:=window.contents[active.window]   -- maintain relative t
                    window.contents[active.window]:=((active.alarm*(cameras.per.
                    WHILE sequence.count < num.frames      -- loop to cycle image
                        SEQ
                            so.write.int(fs,ts,window.contents[active.window],3)
                            offset := window.contents[active.window]/num.frames
```

```
                window.contents[active.window]:=window.contents[active.w
                window.contents[active.window]:=window.contents[active.w
                IF
                    (window.contents[active.window] REM num.frames) < 0
                        window.contents[active.window] := window.contents[ac
                    TRUE
                        SKIP
                window.contents[active.window] := (window.contents[activ
                g.send6(c.update.screen,window.contents[active.window],p
                sequence.count:=sequence.count+1
            window.contents[active.window]:=orig
            g.send6(c.update.screen,window.contents[active.window],posit
            g.send4(c.set.gcursor,position,side,window.contents[active.w
    TRUE
        SEQ
            IF
                (key.touched = 198) OR (key.touched=(INT 'k'))  -- "<----"
                    SEQ
                        window.contents[active.window] := (window.contents[act
                        IF
                            (window.contents[active.window] REM num.frames) = 0
                                window.contents[active.window] := window.contents[
                            TRUE
                                SKIP
                (key.touched = 199) OR (key.touched=(INT 'l'))  -- "---->"
                    INT offset:
                    SEQ
                        offset := window.contents[active.window]/num.frames
                        window.contents[active.window] := (window.contents[act
                        window.contents[active.window] := (window.contents[act
                        IF
                            window.contents[active.window] < 0
                                window.contents[active.window] := window.contents[
                            TRUE
                                SKIP
                        window.contents[active.window] := window.contents[acti
                TRUE
                    SKIP
            g.send6(c.update.screen,window.contents[active.window],posit
            g.send4(c.set.gcursor,position,side,window.contents[active.w -->> Main.menu
((key.touched = (INT 'm')) AND (NOT ((full.screen OR MARK) OR (QUESTIO
    IF
        (NOT ONMENU) -- begin main
            SEQ
                active.menu:=1
                ONMENU:=TRUE
                menu.pos[active.menu]:=0
                menu.loc[active.menu]:=0
                MENU(alarm.state,active.window,active.menu)
        (((ONMENU) AND (active.menu=1)))
            INT position,side:
            SEQ          -- Cleared Alarm Buffer
                position := active.window  / 2
                side := active.window  REM 2
                Remove.menu(active.window,alarm.state)
                ONMENU :=FALSE
                HOLD   := FALSE
        TRUE
                    window.contents[active.window]:=window.contents[active.w
                    window.contents[active.window]:=window.contents[active.w
                    IF
                        (window.contents[active.window] REM num.frames) < 0
                            window.contents[active.window] := window.contents[ac
                        TRUE
                            SKIP
                    window.contents[active.window] := (window.contents[activ
                    g.send6(c.update.screen,window.contents[active.window],p
                    sequence.count:=sequence.count+1
                window.contents[active.window]:=orig
                g.send6(c.update.screen,window.contents[active.window],posit
                g.send4(c.set.gcursor,position,side,window.contents[active.w
        TRUE
            SEQ
```

```
              IF
                (key.touched = 198) OR (key.touched=(INT 'k'))  -- "<----"
                  SEQ
                    window.contents[active.window] := (window.contents[act
                    IF
                      (window.contents[active.window] REM num.frames) = 0
                        window.contents[active.window] := window.contents[
                      TRUE
                        SKIP
                (key.touched = 199) OR (key.touched=(INT 'l'))  -- "---->"
                  INT offset:
                  SEQ
                    offset := window.contents[active.window]/num.frames
                    window.contents[active.window] := (window.contents[act
                    window.contents[active.window] := (window.contents[act
                    IF
                      window.contents[active.window] < 0
                        window.contents[active.window] := window.contents[
                      TRUE
                        SKIP
                    window.contents[active.window] := window.contents[acti
              TRUE
                SKIP
            g.send6(c.update.screen,window.contents[active.window],posit
            g.send4(c.set.gcursor,position,side,window.contents[active.w -->> Main.menu
((key.touched = (INT 'm')) AND (NOT ((full.screen OR MARK) OR (QUESTIO
  IF
    (NOT ONMENU) -- begin main
      SEQ
        active.menu:=1
        ONMENU:=TRUE
        menu.pos[active.menu]:=0
        menu.loc[active.menu]:=0
        MENU(alarm.state,active.window,active.menu)
    (((ONMENU) AND (active.menu=1)))
      INT position,side:
      SEQ          -- Cleared Alarm Buffer
        position := active.window / 2
        side    := active.window  REM 2
        Remove.menu(active.window,alarm.state)
        ONMENU  :=FALSE
        HOLD    := FALSE
    TRUE
      SKIP -->> Cause / Cursor  "MARK"
--!! seperate out menu selections
((key.touched = (INT 'a')) AND ((alarm.state>0) AND (NOT full.screen))
  IF
    ((NOT ONMENU) AND (NOT MARK))-- begin cause menu
      SEQ
        active.menu:=0
        ONMENU:=TRUE
        MENU(alarm.state,active.window,active.menu)
        menu.pos[active.menu]:=0
        menu.loc[active.menu]:=0
    (((ONMENU) AND (active.menu=0)) AND (NOT MARK)) -- sets cause and
      INT position,side:
      SEQ          -- cause selection - terminates into mark mode
        position := active.window / 2
        side    := active.window  REM 2
        host.to.ttg3 ! c.set.cause; side; position;
                       window.contents[active.window];
                       1;79::menu.text[active.menu][menu.loc[active.me
        ttg3.to.host ? reply
        SEQ loop = 1 FOR (num.frames - 1)    -- sets cause for all othe
          INT window.equivalent,offset:
          SEQ
            offset := window.contents[active.window] / num.frames
            window.equivalent := ((window.contents[active.window] + lo
            host.to.ttg3 ! c.set.cause; side; position;
                           window.equivalent;0;
                           79::menu.text[active.menu][menu.loc[active.menu
            ttg3.to.host ? reply
```

```
            MARK:=TRUE
            HOLD:=TRUE
            cursor :=[0,0] --(centers marking arrow)
            g.send6(c.display.gcursor,position,side,cursor[0],cursor[1],wi
      MARK    --!! finish of mark mode
        SEQ
          --!! find position of g.cursor
          g.send5(c.remove.gcursor,(active.window/2),(active.window REM
          g.send4(c.set.gcursor,(active.window/2),(active.window REM 2),
          Remove.menu(active.window,alarm.state)
          active.menu := (-1)
          menu.pos[0]:=0
          menu.loc[0]:=0
          menu.items:=0
          ONMENU :=FALSE
          MARK   := FALSE
          HOLD   := FALSE
      TRUE
        SKIP ((key.touched >= 200) AND (key.touched <= 208)) -- "JOYSTICK"
  IF
    MARK    -->> Cursor control for Marking Arrow <<--
      INT position,side:
        SEQ  --!! cursor control changed to include diagonals
          position := (active.window/2)
          side := (active.window REM 2)
          --JDHg.send2( c.select.fg.colour,4)
          g.send5(c.remove.gcursor,position,side,cursor[0],cursor[1]
          IF -- down,up
            (((key.touched = 208) OR (key.touched = 204)) OR (key.touche
              cursor[0] := (cursor[0] + 1)
            (((key.touched = 200) OR (key.touched = 201)) OR (key.touche
              cursor[0] := (cursor[0] - 1)
            TRUE
              SKIP
          IF -- right, left
            (((key.touched = 205) OR (key.touched= 202)) OR (key.touched
              cursor[1] := (cursor[1] + 1)
            (((key.touched = 203) OR (key.touched = 201)) OR (key.touche
              cursor[1] := (cursor[1] - 1)
            TRUE
              SKIP
          g.send6(c.display.gcursor,position,side,cursor[0],cursor[1],wi
    QUESTION       --!!> SELECTION OF DISPLAYED OPTIONS <--
                   --!! only up,down,left and right are operational
      INT side,position:
      SEQ
        side:=remove.sign((active.window REM 2)-1)
        position:=remove.sign((active.window/2)-1)
        IF
          (((key.touched=205) OR ((key.touched=202) OR (key.touched=20
            SEQ    -- no limits
              active.choice:=active.choice+1
              host.to.ttg3 ! c.question.choice;position;side;0;q.choic
              host.to.ttg3 ! q.text[active.question]
              ttg3.to.host ? reply
          (((key.touched=203) OR ((key.touched=201) OR (key.touched=20
            SEQ    -- no limits
              active.choice:=active.choice-1
              host.to.ttg3 ! c.question.choice;position;side;0;q.choic
              host.to.ttg3 ! q.text[active.question]
              ttg3.to.host ? reply
          TRUE
            SKIP
    ONMENU  -->> menu selection control scroll up and down <<--    "JO
      INT position,side:
      SEQ
        position:=remove.sign((active.window/2)-1)
        side:=1  --?? hard coded for now
        IF
          key.touched = 200    -- UP
            SEQ
              IF
                menu.loc[active.menu]>0 -- if at first position in ar
                  SEQ
```

```
              IF
                menu.pos[active.menu]=0 --top of menu display
                  SEQ
                    host.to.ttg3 ! c.scroll.menu;1;position;side
                    host.to.ttg3 ! menu.items;menu.text[active.m
                    host.to.ttg3 ! menu.text[active.menu][(menu.
                    ttg3.to.host ? reply
                    so.write.int(fs,ts,menu.loc[active.menu],3)
                    so.write.int(fs,ts,menu.pos[active.menu],2)
                TRUE
                  SEQ
                    menu.pos[active.menu]:=menu.pos[active.menu]
                    host.to.ttg3 ! c.invert;position;side;menu.m
                    host.to.ttg3 ! ((menu.pos[active.menu])+1);m
                    ttg3.to.host ? reply
                menu.loc[active.menu]:=menu.loc[active.menu]-1
                so.write.int(fs,ts,menu.pos[active.menu],4)
                so.write.int(fs,ts,menu.loc[active.menu],2)
          TRUE
            SKIP
      key.touched = 208 --DOWN
        SEQ
          IF
            (menu.loc[active.menu]<((menu.max[active.menu])-1))
              SEQ
                IF
                  menu.pos[active.menu]=(menu.items-1)  -- bottom
                    SEQ
                      host.to.ttg3 ! c.scroll.menu;0;position;side
                      host.to.ttg3 ! menu.items;menu.text[active.m
                      host.to.ttg3 ! menu.text[active.menu][(menu.
                      ttg3.to.host ? reply
                      so.write.int(fs,ts,menu.loc[active.menu],3)
                      so.write.int(fs,ts,menu.pos[active.menu],2)
                  TRUE
                    SEQ
                      menu.pos[active.menu]:=menu.pos[active.menu]
                      host.to.ttg3 ! c.invert;position;side;menu.m
                      host.to.ttg3 ! ((menu.pos[active.menu])-1);m
                      ttg3.to.host ? reply
                menu.loc[active.menu]:=menu.loc[active.menu]+1
                so.write.int(fs,ts,menu.pos[active.menu],4)
                so.write.int(fs,ts,menu.loc[active.menu],2)
            TRUE
              SKIP
      key.touched = 205  -- Right (increase value)
        SEQ
          SKIP
      key.touched = 203  -- Left (decrease value)
        SEQ
          SKIP
    TRUE
      SKIP ((zoom.state[active.window]>0) AND (NOT (full.screen)))  -->>Pan a
  INT position,side:
  [2]INT pan:  --?? right now pan and scroll always returns to 0,0
  SEQ --!! added diagonals
    pan:=[0,0]
    position := active.window / 2
    side := active.window REM 2
    IF
      (((key.touched = 208) OR (key.touched = 204)) OR (key.touche
        pan[1] := (pan[1] - 1)
      (((key.touched = 200) OR (key.touched = 201)) OR (key.touche
        pan[1] := (pan[1] + 1)
      TRUE
        SKIP
    IF
      (((key.touched = 203) OR (key.touched= 201)) OR (key.touched
        pan[0] := (pan[0] - 1)
      (((key.touched = 205) OR (key.touched = 202)) OR (key.touche
        pan[0] := (pan[0] + 1)
```

```
              TRUE
                SKIP
            g.send6(c.pan.and.scroll.frame,pan[0],pan[1],side,position,win
      TRUE
        SKIP -->> Zoom Out <<--
( ((key.touched = 210) OR (key.touched = (INT '.'))) AND
  ((active.window > (-1)))) -- AND (NOT ((ONMENU OR QUESTION) OR (full
  INT position,side:
  SEQ
    position := active.window / 2
    side := active.window REM 2
    host.to.ttg3 ! c.zoom.out.frame; side;
            position;((window.contents[active.window]REM num.frames)+(
            window.contents;zoom.state[active.window]
    ttg3.to.host ? reply
    ttg3.to.host ? zoom.state[active.window]
    IF
      reply = e.full.screen
        SEQ
          full.screen := TRUE
          HOLD := TRUE
      TRUE
        SEQ
          SKIP -->> Zoom In <<--
(((key.touched = 209) OR (key.touched = (INT ','))) ) AND ((active.alar
  INT position,side:
  SEQ
    position := active.window / 2
    side := active.window REM 2
    host.to.ttg3 ! c.zoom.in.frame; side; position;((window.contents[a
    ttg3.to.host ? reply
    ttg3.to.host ? zoom.state[active.window]
    IF
      reply = e.full.screen
        SKIP
      TRUE
        SEQ
          full.screen := FALSE
          HOLD := FALSE -->> Enlarge Image <<--
((key.touched = (INT 'e'))) -- AND (NOT(ONMENU OR QUESTION)))
  SEQ
    IF
      full.screen  --!! restore screen
        SEQ
          g.send1(c.zoom.reset)
          full.screen := FALSE
          zoom.state[active.window]:=0
          HOLD := FALSE
      TRUE  --!! zoom to full screen
        INT frame,position,side:
        SEQ
          position := active.window / 2
          side := active.window REM 2
          frame := ((window.contents[active.window]REM num.frames)+( s
          so.write.int(fs,ts,window.contents[active.window],3)
          so.write.int(fs,ts,frame,2)
          g.send1(c.zoom.reset) --!! temporary until we can write enla
          host.to.ttg3 ! c.zoom.out.frame;side;position;frame;window.c
          ttg3.to.host ? reply
          ttg3.to.host ? zoom.state[active.window]
          IF
            reply = e.full.screen
              SEQ
                full.screen := TRUE
                zoom.state[active.window]:=(-1)
                HOLD := TRUE
            TRUE
              SKIP
(((key.touched=(INT 'p')) AND (alarm.state>0)) AND (NOT full.screen))-
```

```
          IF
            NOT QUESTION
              SEQ
                active.question:=1
                active.choice:=1
                Question(active.window,(active.choice-1),q.choices[active.ques
                QUESTION:=TRUE
            (QUESTION AND (active.question=1))
              SEQ
                IF
                  active.choice=1    -- print
                    SEQ
                    -- execute print here
                    active.choice=2    -- quit
                      SKIP
                  TRUE
                    SKIP
                Remove.Question(active.window,alarm.state)
                QUESTION:=FALSE
                active.question:=(-1)
                active.choice:=0
          TRUE
            SKIP
      (((key.touched=(INT 's')) AND (alarm.state>0)) AND (NOT full.screen))-
        IF
          NOT QUESTION
            SEQ
              active.question:=0
              active.choice:=1
              first.choice:= 0
              Question(active.window,(active.choice-1),q.choices[active.ques
              QUESTION:=TRUE
          (QUESTION AND (active.question=0))
            SEQ
              Remove.Question(active.window,alarm.state)
              IF
                active.choice=1
                  first.choice:=1
                TRUE
                  first.choice:=2
              active.question:=2
              active.choice:=1
              Question(active.window,(active.choice-1),q.choices[active.ques
          (QUESTION AND (active.question=2))
            SEQ
              Remove.Question(active.window,alarm.state)
              IF
                active.choice=1
                  drive:="C:"
                active.choice=2
                  drive:="D:"
                active.choice=3
                  drive:="A:"
                TRUE
                  SKIP
              active.question:=3
              active.choice:=1
              Question(active.window,(active.choice-1),q.choices[active.ques
          (QUESTION AND (active.question=3))
            SEQ
              IF
                active.choice=1 -- Save
                  SEQ
                    IF
                      first.choice=1
                        SEQ
                          -- SAVE SINGLE
                          SKIP
                      first.choice=2
                        SEQ
                          -- SAVE SEQUENCE
                          SKIP
                      TRUE
                        SKIP
                active.choice=2   -- Quit
                  SKIP
                TRUE
                  SKIP
```

```
                Remove.Question(active.window,alarm.state)
                QUESTION:=FALSE
                active.question:=(-1)
                active.choice:=0
                first.choice:=0
          TRUE
              SKIP
      ((key.touched=(INT 'z')) AND (alarm.state>0)) -- Quit
        IF
          (QUESTION AND
              (((active.question=3) AND (active.choice=2)) OR
              ((active.question=1) AND (active.choice=2))))
              SEQ
                Remove.Question(active.window,alarm.state)
                QUESTION:=FALSE
                active.choice:=0
                first.choice:=0
                active.question:=(-1)
          TRUE
              SKIP
      TRUE
        SKIP
```

Bubble 3

```
PROC video(CHAN OF ANY ttg3.to.host,host.to.ttg3,VAL INT l.freq,f.rate,pix.clck,
            xsize, ysize,CHAN OF ANY display.access.request,display.access.frame,
            display.access.clear,alarm.control,alarm.ok,CHAN OF BOOL display.acce INT control.word:
  BOOL dead :
  INT status.port:
  PLACE status.port AT #20000020:
  PORT OF INT control.port:
  PLACE control.port AT #2000003C:
  VAL g300.register.base IS #30000000 (INT):
  [#1BF]PORT OF INT registers:
  PLACE registers AT g300.register.base:
  VAL nil     IS #DEFACED :
  VAL modeOR  IS 0 :
  VAL modeXOR IS 1 :
  VAL modeSET IS 2 :

VAL INT mask.register      IS #140:

PROC reset.g300 ()

TIMER clock :
    INT time :
    SEQ
      -- Reset G3
      control.port ! (control.word \/ #00000001)
      -- wait 100 milliseconds
      clock ? time
      clock ? AFTER (time PLUS 1562)
      -- Deassert Reset
      control.port ! (control.word /\ #FFFFFFFE)
  :
  PROC resetVideoSystem ( VAL INT drawScreen, displayScreen, plotMode )
    VAL INT half.sync        IS #121:
    VAL INT back.porch       IS #122:
    VAL INT display          IS #123:
    VAL INT short.display    IS #124:
    VAL INT broad.pulse      IS #125:
    VAL INT v.sync           IS #126:
    VAL INT v.blank          IS #127:
    VAL INT v.display        IS #128:
    VAL INT line.time        IS #129:
    VAL INT line.start       IS #12A:
    VAL INT mem.init         IS #12B:
    VAL INT transfer.delay   IS #12C:
    VAL INT h.incrementer    IS #12D:
    VAL INT v.incrementer    IS #12E:
```

```
              VAL INT tb.incrementer     IS #12F:
              VAL INT byte.counter       IS #100:
              VAL INT colour.palette     IS #000:
              VAL INT boot.location      IS #1A0:
              VAL INT control.register   IS #160:
              INT mode:
              SEQ
                VAL prog.regs IS [half.sync,
                                  back.porch,
                                  display,
                                  short.display,
                                  broad.pulse,
                                  v.sync,
                                  v.blank,
                                  v.display,
                                  line.time,
                                  line.start,
                                  mem.init,
                                  transfer.delay,
                                  mask.register]:         --1024 res  --1280 res
                VAL prog.vals IS [21 (INT),   --half sync    for 85    17 for 107  21
                                  54 (INT),   --back porch             43          54
                                  320 (INT),  --display                256         320
                                  109 (INT),  --short display          87          109
                                  205 (INT),  --broad pulse            164         205
                                  6 (INT),    --v sync                 6           6
                                  56 (INT),   --v blank                56          56
                                  2048 (INT), --v display              2048        2048
                                  422 (INT),  --line time              338         422
                                  0 (INT),    --line start             0           0
                                  484 (INT),  --mem init (235)         484         484
                                  28 (INT),   --transfer delay         28          28
                                  255 (INT)]: --mask register          255         255
                SEQ
                  registers [boot.location] ! 21+32 --85MHZ (17+32) FOR 107 (21+32)
                  registers [control.register] ! #170000 --disable vtg
                  SEQ i = 0 FOR SIZE prog.regs
                    registers [prog.regs[i]] ! prog.vals[i]
                  registers [control.register] ! #170000 --ensure VTG disabled first
                  registers [control.register] ! #170001 --enable VTG in mode 1
                  mode := plotMode
          :
          #INCLUDE "ttgs.occ"
          SEQ
            control.word := 0
            control.port ! control.word
            reset.g300()
            resetVideoSystem ( 1, 1, modeSET )
            ttgs (host.to.ttg3, ttg3.to.host,alarm.control,alarm.ok,dead)
          :

#INCLUDE "ttgscon.inc"
#INCLUDE "frame.inc"
#INCLUDE "zone.inc"
#INCLUDE "function.inc"

PROC ttgs ( CHAN OF ANY host.to.ttg3, ttg3.to.host, BOOL dead )
  VAL INT char.line.spacing IS 2:
  VAL INT max.displayable.alarms IS 2:
  -- QUESTION CONSTANTS ----------------------------------------------------
  VAL INT y.question.offset IS 50:           -- offset of question window from t
  VAL INT x.question.offset IS 50:           -- offset of question window from l
  VAL INT question.foreground IS cyan:       -- color of foregrond graphics
  VAL INT question.background IS brt.purple:     -- color of background grap
  VAL INT question.shadow     IS drk.purple
  VAL INT x.question.window IS ((x.image.size-shadow.width)-x.question.offset):
  VAL INT y.question.window IS ((y.image.size-shadow.height)-y.question.offset):
  VAL INT x.question.spacing IS 15:
  VAL INT y.question.spacing IS 15:
  VAL INT max.x.choices      IS 5:
  VAL INT max.question.chars IS 8:
  VAL INT q.box.height  IS (2*text.height.1):
  VAL INT q.box.width   IS (text.width.1*(2+max.question.chars)):
  VAL INT question.width IS 9:    -- label offsets
  VAL INT question.height IS (text.height.1+10):  -- title/label offsets
  INT current.screen, displayed.screen, full.screen.frame,longtime,fractime :
```

```
VAL current.window IS 0 :
[4]BOOL secure.displayed:
BOOL full.screen :
[4]INT window.contents :
[7]INT windows :
[heap.size]BYTE window.heap :
INT heap.left :
[screens]INT save.cursor :
BYTE foreground.colour,background.colour :
INT command,cursor.pos,x.width,y.height,x.side,y.position,rotation :
INT line.frequency, frame.rate, pixel.clock :
BOOL interlace,going,zoom,cursor.exist :
VAL INT step IS 8:
[num.frames * (max.zones*cameras.per.zone)][y.image.size+1][x.image.size]BYTE
[3]INT bar.status:
INT step.size,temp,Current.frame,zoom.level,frame,direction:
[2][2]INT zoom.pos:
[y.screen][x.screen] BYTE screenRAM :    -- sorry, this will alias check
[y.image.size+1][x.image.size]BYTE Buffer:
[y.image.size+1][x.image.size]BYTE buffer2:
[y.image.size+1][x.image.size]BYTE buffer3:  --!! changed name of buffer3 to m
[y.alarm.window+shadow.height][x.alarm.window+shadow.width]BYTE buffer4:
INT menu.position:       -- flag used by copy.to.menu.buffer & copy.menu.buffer
PLACE screenRAM AT frame.one.base: -- (1024 x 1280) = 1.31MB- machine address
PLACE Buffer     AT buffer.base:   -- (512 x 481) = 61.6k
PLACE buffer2    AT buffer2.base:  -- (512 x 481) = 61.6k
PLACE buffer3    AT buffer3.base:  -- (512 x 481) = 61.6k
PLACE buffer4    AT buffer4.base:  -- (512 x 92) = 11.9k
screenRam IS screenRAM :  -- for hysterical reasons
buffer IS Buffer :  -- for hysterical reasons
screen IS screenRam:
INT visibleScreen, invisibleScreen :
VAL scrOffsets IS [ 0, #800] :

PROC setMask ( VAL INT mask )
  registers [mask.register] ! mask
:
PROC set.colour ( VAL INT colour, red, green, blue )
  SEQ
    registers [colour] ! (red \/ (green << 8)) \/ (blue << 16)
:

PROC init.G170 (VAL INT table)
  INT red, green, blue:
  SEQ
    setMask ( #FF )
    IF
      table = 0
        VAL scale IS [0, 18, 36, 54] :
        VAL bias IS 9 :
        SEQ
          set.colour (0, 0, 0, 0)        -- black
          SEQ i = 1 FOR 255
            INT ix :
            SEQ
              blue := scale[(i>>4)/\3]
              green := scale[(i>>2)/\3]
              red := scale[i/\3]
              IF
                i >= #C0
                  blue := blue + bias
                i >= #80
                  green := green + bias
                i >= #40
                  red := red + bias
                TRUE
                  SKIP
              set.colour ( i, red, green, blue )
      table = 1
        SEQ
          red := -1
          green := -1
          blue := -1
          SEQ i = 0 FOR 16
            SEQ
              red := red + 4
              green := green + 4
              blue := blue + 4
```

```
         set.colour (i, red, green, blue)
red := -1
green := 0
blue := 0
SEQ i = 16 FOR 16
   SEQ
      red := red + 4
      set.colour (i, red, green, blue)
red := 0
green := -1
blue := 0
SEQ i = 32 FOR 16
   SEQ
      green := green + 4
      set.colour (i, red, green, blue)
red := 0
green := 0
blue := -1
SEQ i = 48 FOR 16
   SEQ
      blue := blue + 4
      set.colour (i, red, green, blue)
red := -1
green := -1
blue := 0
SEQ i = 64 FOR 16
   SEQ
      red := red + 4
      green := green + 4
      set.colour (i, red, green, blue)
red := 0
green := -1
blue := -1
SEQ i = 80 FOR 16
   SEQ
      green := green + 4
      blue := blue + 4
      set.colour (i, red, green, blue)
red := -1
green := 0
blue := -1
SEQ i = 96 FOR 16
   SEQ
      red := red + 4
      blue := blue + 4
      set.colour (i, red, green, blue)
red := 63
green := -1
blue := 21
SEQ i = 112 FOR 16
   SEQ
      green := green + 4
      set.colour (i, red, green, blue)
      red := red - 4
red := 21
green := 63
blue := -1
SEQ i = 128 FOR 16
   SEQ
      blue := blue + 4
      set.colour (i, red, green, blue)
      green := green - 4
red := -1
green := 21
blue := 63
SEQ i = 144 FOR 16
   SEQ
      red := red + 4
      set.colour (i, red, green, blue)
      blue := blue - 4
red := 63
green := -1
blue := 42
SEQ i = 160 FOR 16
   SEQ
      green := green + 4
      set.colour (i, red, green, blue)
```

```
                    red := red - 4
            red := 42
            green := 63
            blue := -1
            SEQ i = 176 FOR 16
              SEQ
                blue := blue + 4
                set.colour (i, red, green, blue)
                green := green - 4
            red := -1
            green := 42
            blue := 63
            SEQ i = 192 FOR 16
              SEQ
                red := red + 4
                set.colour (i, red, green, blue)
                blue := blue - 4
            red := 63
            green := -1
            blue := 63
            SEQ i = 208 FOR 16
              SEQ
                green := green + 4
                set.colour (i, red, green, blue)
                red := red - 4
            red := 63
            green := 63
            blue := -1
            SEQ i = 224 FOR 16
              SEQ
                blue := blue + 4
                set.colour (i, red, green, blue)
                green := green - 4
            red := -1
            green := 63
            blue := 63
            SEQ i = 240 FOR 16
              SEQ
                red := red + 4
                set.colour (i, red, green, blue)
                blue := blue - 4
      table = 2
        SEQ
          SEQ i = 0 FOR 256
            set.colour ( i, i, i, i )
      table = 3
        INT c :
        SEQ
          c := 0
          SEQ b = 0 FOR 4
            SEQ g = 0 FOR 8
              SEQ r = 0 FOR 8
                SEQ
                  set.colour ( c, (r*63)/7, (g*63)/7, (b*63)/3 )
                  c := c + 1
      TRUE
        SKIP
:
PROC compute.fractal(VAL REAL32 base.r,base.i,span.r,span.i)
  [8]REAL32 vec:
         --PLACE vec IN WORKSPACE:
         ar IS vec[0]:
         ai IS vec[1]:
         const.r IS vec[2]:
         const.i IS vec[3]:
         delta.r IS vec[4]:
         delta.i IS vec[5]:
         arsqr IS vec[6]:
         aisqr IS vec[7]:
         INT row,col,color:
         BOOL go:
         BYTE key,result:
         SEQ
            delta.r := span.r/(REAL32 ROUND scr.x)
            delta.i := span.i/(REAL32 ROUND scr.y)
            const.i := base.i
            SEQ row = 0 FOR scr.y/2
```

```
            SEQ
              --so.pollkey(fs,ts,key,result)
              const.r := base.r
              SEQ col = 0 FOR scr.x
                SEQ
                  ar := 0.0 (REAL32)
                  ai := 0.0 (REAL32)
                  arsqr := 0.0 (REAL32)
                  aisqr := 0.0 (REAL32)
                  color := 255
                  go := TRUE
                  WHILE go
                    SEQ
                      ai := ((ar * ai) * 2.0 (REAL32)) + const.i
                      ar := (arsqr - aisqr) + const.r
                      arsqr := ar*ar
                      aisqr := ai*ai
                      IF
                        (arsqr+aisqr) > (4.0 (REAL32))
                          go := FALSE
                        TRUE
                          SEQ
                            color := color - 1
                            IF
                              color = 0
                                go := FALSE
                              TRUE
                                SKIP
                  screenRAM[row][col] := BYTE color
                  screenRAM[1023-row][col] := BYTE color
                  const.r := const.r + delta.r
              const.i := const.i + delta.i
:
PROC waitVblank ()
  INT any :
  SEQ
    SKIP
    --      EventReq ! any
    --      EventAck ? any
:
PROC bankSelect ( VAL INT displayBank )
  VAL INT top.of.screen    IS #180:
  SEQ
    visibleScreen    := displayBank
    invisibleScreen := visibleScreen >< 1
    registers [top.of.screen] ! scrOffsets [ visibleScreen]
:

[y.screen*x.screen] BYTE screen.map RETYPES screenRam :
[x.screen] BYTE onChip :
PLACE onChip IN WORKSPACE :
#INCLUDE "font1.inc"
#INCLUDE "font2.inc"
#INCLUDE "contrast.inc"
VAL first.char       IS    32 :    -- first ASCII char to store
VAL charheight       IS    16 :
VAL charwidth        IS    8 :
VAL [][charheight]BYTE default.charset RETYPES charset :
VAL [][charheight*2]BYTE second.charset  RETYPES charset2 :
VAL max.chars            IS SIZE default.charset :
VAL max.capchars IS ((INT 'Z') - first.char) + 1:
[max.capchars*charheight][charwidth]BYTE charset.1:
[max.capchars*(charheight*2)][charwidth]BYTE charset.2:

VAL moveAll     IS 0 :
VAL moveZero    IS 1 :
VAL moveNonZero IS 2 :

PROC store.char.in.array(VAL INT char, [][]BYTE char.array, VAL [][]BYTE chars
  VAL  mask IS 1 << (width - 1):
  INT bitmask, bit, char.ptr:
  SEQ
    char.ptr := (char - first.char) * height
    SEQ y = 0 FOR height
      SEQ
        bitmask := mask
        SEQ x = 0 FOR width
```

```
              SEQ
                bit := (INT charset[char][y]) /\ bitmask
                IF
                  bit = 0
                    char.array[char.ptr+y][x] := (BYTE 0)
                  TRUE
                    SEQ
                      char.array[char.ptr+y][x] := (BYTE 1)
                bitmask := bitmask >> 1
:
PROC BYTBLT ( [] BYTE source, dest,
              VAL INT sourceIx, destIx,
                      sourceStride, destStride,
                      length,        width,
                      op )
  sourceForGUY IS source [0] :
  destForGUY   IS dest   [0] :
  IF
    op = moveAll
      SEQ
        GUY
          LDL   sourceStride
          LDL   destStride
          LDL   length
          MOVE2DINIT
          LDL   sourceIx
          LDLP  sourceForGUY
          BSUB
          LDL   destIx
          LDLP  destForGUY
          BSUB
          LDL   width
          MOVE2DALL
    op = moveZero
      SEQ
        GUY
          LDL   sourceStride
          LDL   destStride
          LDL   length
          MOVE2DINIT
          LDL   sourceIx
          LDLP  sourceForGUY
          BSUB
          LDL   destIx
          LDLP  destForGUY
          BSUB
          LDL   width
          MOVE2DZERO
    op = moveNonZero
      SEQ
        GUY
          LDL   sourceStride
          LDL   destStride
          LDL   length
          MOVE2DINIT
          LDL   sourceIx
          LDLP  sourceForGUY
          BSUB
          LDL   destIx
          LDLP  destForGUY
          BSUB
          LDL   width
          MOVE2DNONZERO
:
PROC set.active.inactive.zone(VAL INT first.color, second.color,third.color,fo
  SEQ
    set.colour(first.color,   0, 100, 100)  -- blue
    set.colour(second.color,  0, 100, 100)  -- blue
    set.colour(third.color, 255, 255,   0)  -- bright yellow
    set.colour(fourth.color, 150, 150,  0)  -- dark yellow
:
PROC MOVE2D.inside([][]BYTE buffer.a, VAL INT side, VAL INT position,
                   [][]BYTE buffer.b, VAL INT x.position,
                   VAL INT y.position, VAL INT x.size, VAL INT y.size)
  SEQ
    MOVE2D(buffer.a, side, position, buffer.b, (x.position+border.width),
           (y.position+border.width), x.size, y.size)
```

```
PROC MOVE2D.strip(VAL [y.image.size+1][x.image.size]BYTE buffer.a, VAL INT sid
                  [][]BYTE buffer.b, VAL INT x.position,
                  VAL INT y.position, VAL INT x.size, VAL INT y.size)
  [y.image.size][x.image.size]BYTE passed.buffer :
  SEQ
    [passed.buffer FROM 0 FOR y.image.size] := [buffer.a FROM 1 FOR y.image.si
    MOVE2D.inside(passed.buffer, side, position, buffer.b, x.position,
         y.position, x.size, y.size)
:
PROC select.screen ( VAL INT screen.number )
   bankSelect ( screen.number )
:
PROC display.window ([]BYTE screen.m,
                     VAL []INT dimensions,
                     []BYTE window)     -- displays a window on the screen
  [y.screen][x.screen]BYTE screenc RETYPES screen.m :
  VAL pixels.line IS dimensions [ x.size] :
  VAL max.lines   IS dimensions [ y.size] :
  VAL screen.x    IS dimensions [x.start] :
  VAL screen.y    IS dimensions [y.start] :
  SEQ
    SEQ i = 0 FOR max.lines
      [screenc[screen.y + i] FROM screen.x FOR pixels.line] :=
        [window FROM (i*pixels.line) FOR pixels.line]
:
PROC faster.draw.char ([]BYTE screen.m, VAL INT char, [][]BYTE char.array, VAL
  VAL pixels.line IS dimensions[x.size] :
  VAL caps.difference IS (INT 'a') - (INT 'A'):
  INT start.x, start.y, char.ptr, width, height :
  [32][8]BYTE hold.array:
  SEQ
    start.y := cursor.pos / pixels.line
    start.x := cursor.pos \ pixels.line
    width   := charwidth * x.width
    height  := charheight * y.height
    IF
      (char >= (INT 'a'))
        char.ptr := ((char - caps.difference) - first.char) * height
      TRUE
        char.ptr := (char - first.char) * height
    IF
      ((char.ptr >= 0)  AND (char.ptr <= (max.capchars*height)))
        SEQ
          MOVE2D(char.array,0,char.ptr,hold.array,0,0,width,height)
          SEQ y = 0 FOR height
            SEQ x = 0 FOR width
              IF
                hold.array[y][x] = (BYTE 1)
                  hold.array[y][x] := foreground.colour
                TRUE
                  hold.array[y][x] := background.colour
          MOVE2D(hold.array,0,0,buffer.a,start.x,start.y,width,height)
          cursor.pos := cursor.pos + width
      TRUE
        SKIP
:
PROC slowdraw.char ([]BYTE screen.m, VAL INT char, VAL [][]BYTE charset,
                    VAL INT charheight, charwidth, x.mag, y.mag,
                    VAL []INT dimensions, BOOL ok, [][]BYTE buffer.a)
  VAL mask IS 1 << (charwidth - 1) :
  VAL pixels.line IS dimensions[x.size] :
  VAL max.lines IS dimensions[y.size] :
  VAL caps.difference IS (INT 'a') - (INT 'A'):
  [96][48]BYTE newchar :
  INT start.x, start.y, width, height, char.ptr, x.ptr, y.ptr:
  SEQ
    start.y := cursor.pos / pixels.line
    start.x := cursor.pos \ pixels.line
    width   := charwidth * x.mag
    height  := charheight * y.mag
    IF
      (char >= (INT 'a'))
        char.ptr := ((char - caps.difference) - first.char) * charheight
      TRUE
        char.ptr := (char - first.char) * charheight
```

```
        IF
          (width > pixels.line) OR (height > max.lines)
            ok := FALSE
          ((start.x + width) > pixels.line) OR ((start.y + height) > max.lines)
            SKIP
          ((char.ptr >= 0) AND (char.ptr <= (max.capchars*charheight)))
            VAL base.char IS [charset FROM char.ptr FOR charheight]:
            SEQ
              SEQ y = 0 FOR charheight
                SEQ
                  y.ptr := y * y.mag
                  SEQ x = 0 FOR charwidth
                    SEQ
                      x.ptr := x * x.mag
                      SEQ z = 0 FOR x.mag
                        --newchar[y.ptr][x.ptr+z] := base.char[y][x]
                        IF
                          base.char[y][x] = (BYTE 1)
                            newchar[y.ptr][x.ptr+z] := foreground.colour
                          TRUE
                            newchar[y.ptr][x.ptr+z] := background.colour
              SEQ y = 0 FOR charheight
                SEQ
                  y.ptr := y * y.mag
                  SEQ i = 1 FOR (y.mag - 1)
                    [newchar[y.ptr+i] FROM 0 FOR width] := [newchar[y.ptr] FROM 0
              MOVE2D(newchar,0,0,buffer.a,start.x,start.y,width,height)
              cursor.pos := cursor.pos + width
          TRUE
            SKIP
:
PROC write.string ([]BYTE screen.m,
                   VAL []BYTE string, []BYTE array,
                   VAL []INT dimensions, BOOL ok, [][]BYTE buffer.a)      -- dec
  SEQ
    IF
      (x.width = 1) AND (y.height = 1)
        SEQ i = 0 FOR SIZE string
          faster.draw.char (screen.m, INT string[i], charset.1, dimensions, bu
      (x.width = 1) AND (y.height = 2)
        SEQ i = 0 FOR SIZE string
          faster.draw.char (screen.m, INT string[i], charset.2, dimensions, bu
      (y.height = (x.width * 2))
        SEQ i = 0 FOR SIZE string
          slowdraw.char(screen.m, INT string[i], charset.2, 32, 8, x.width,
                        y.height/2, dimensions, ok, buffer.a)
      TRUE
        SEQ i = 0 FOR SIZE string
          slowdraw.char(screen.m, INT string[i], charset.1, 16, 8, x.width,
                        y.height, dimensions, ok, buffer.a)
:
PROC write(VAL []INT dimensions,VAL INT string.pos.x,VAL INT string.pos.y,VAL
  VAL pixels.line IS dimensions[x.size] :
  BOOL ok:
  SCREEN.MAP IS screen.map:
  SEQ
    ok := TRUE
    cursor.pos := (string.pos.y * pixels.line) + string.pos.x
    write.string (SCREEN.MAP, [string FROM 0 FOR num.char], SCREEN.MAP,
                  dimensions, ok, screen)
:
PROC write.buffer(VAL []INT dimensions,[][]BYTE buffer.a,VAL INT string.pos.x,
  VAL pixels.line IS dimensions[x.size] :
  BOOL ok:
  SCREEN.MAP IS screen.map:
  SEQ
    ok := TRUE
    cursor.pos := (string.pos.y * pixels.line) + string.pos.x
    write.string (screen.map, [string FROM 0 FOR num.char],screen.map,
                  dimensions, ok, buffer.a)
:
PROC Select.Box(VAL INT position, VAL INT height.offset,VAL INT y.offset, VAL
                VAL INT side, VAL INT width.offset,VAL INT x.offset, VAL INT w
                VAL INT foreground, VAL INT background, VAL INT menu.pos, []BY
  BYTE old.foreground,old.background:
  INT menu.width,y.select.offset:
```

```
    SEQ
      x.width:=1
      y.height:=1
      old.foreground:=foreground.colour
      old.background:=background.colour
      foreground.colour:= (BYTE foreground)
      background.colour:= (BYTE background)
      menu.width:= ((width-((2*menu.border.size)-(2*x.menu.border)))/text.width.
      SEQ
        INT length:
        SEQ
          length:=SIZE(Text)
          IF
            length<menu.width
              menu.width:=length
            TRUE
              SKIP
        y.select.offset:=(menu.pos*text.height.1)
        write(dimensions,((((side*width.offset)+x.offset)+x.menu.border)+(menu.b
              (((((position*height.offset)+y.offset)+(y.select.offset+y.menu.bo
              menu.width,Text)
      foreground.colour:=old.foreground
      background.colour:=old.background
:
PROC clear.screen (VAL INT screen.number, colour)
  -- optimised to clear screen quickly
  []INT screen RETYPES screen.map :
  INT n :
  [1280]BYTE background :
  SEQ
    SEQ loop1 = 0 FOR 1280
      background[loop1] := (BYTE colour)
    SEQ loop1 = 0 FOR 1024
      screenRam[loop1] := background
:
PROC clip.line (VAL INT x1, y1, x2, y2, INT result, VAL []INT dimensions)
  -- decides whether a line is totally on or off screen/window
  VAL code.centre IS #00 :       -- 0000
  VAL code.left   IS #01 :       -- 0001
  VAL code.right  IS #02 :       -- 0010
  VAL code.bottom IS #04 :       -- 0100
  VAL code.top    IS #08 :       -- 1000
  INT code1, code2 :
  PROC check (VAL INT x, y, INT code)
    VAL x.max IS dimensions[x.size] :
    VAL y.max IS dimensions[y.size] :
    SEQ
      IF
        (x >= 0) AND (x < x.max)
          code := code.centre
        x < 0
          code := code.left
        TRUE --x > x.max
          code := code.right
      IF
        (y >= 0) AND (y < y.max)
          SKIP
        y < 0
          code := code \/ code.top
        TRUE --y > y.max
          code := code \/ code.bottom
  :
  SEQ
    check (x1, y1, code1)
    check (x2, y2, code2)
    IF
      (code1 \/ code2) = 0
        result := in.range
      (code1 /\ code2) <> 0
        result := not.inrange
      TRUE
        result := part.inrange
:
PROC polygon.fill (VAL INT seed.x, seed.y, []BYTE array, VAL []INT dimensions)
  -- seed polygon fill algorithm that will fill any arbitary polygon
  VAL pixels.line IS dimensions[x.size] :
```

```
VAL x.limit IS pixels.line - 1 :
VAL max.lines IS dimensions[y.size] :
VAL stack.size IS 100 :
[stack.size][2]INT  stack :
INT sp :
PROC push (VAL INT a, b)
  IF
    sp < stack.size
      SEQ
        stack[sp][0] := a
        stack[sp][1] := b
        sp := sp + 1
    TRUE
      SKIP
:
PROC pop (INT a, b)
  SEQ
    sp := sp - 1
    a := stack[sp][0]
    b := stack[sp][1]
:
BYTE background.colour :
SEQ
  background.colour := array[(seed.y * pixels.line) + seed.x]
  IF
    (foreground.colour = background.colour) OR
        (seed.x >= pixels.line) OR (seed.x < 0) OR
                (seed.y < 0) OR (seed.y >= max.lines)
      SKIP
    TRUE
      INT x, y :
      INT save.x, x.right, line, length :
      [x.screen]BYTE col.array :
      SEQ
        SEQ i = 0 FOR pixels.line
          col.array[i] := foreground.colour
        sp := 0
        push (seed.x, seed.y)
        WHILE sp > 0
          SEQ
            pop (x, y)
            save.x := x
            line := y*pixels.line
            WHILE (array[line + x] = background.colour) AND (x < x.limit)
              x := x + 1
            IF
              array[line + x] <> background.colour
                x.right := x - 1
              TRUE
                x.right := x
            x := save.x
            WHILE (array[line + x] = background.colour) AND (x > 0)
              x := x - 1
            IF
              array[line + x] <> background.colour
                x := x + 1
              TRUE
                SKIP
            save.x := x
            length := (x.right - save.x) + 1
            IF
              length > 0
                [array FROM (line+save.x) FOR length] := [col.array FROM 0 F
              TRUE
                SKIP
            y := y + 1
            IF
              y < max.lines
                SEQ
                  line := line + pixels.line
                  WHILE (array[line + x] <> background.colour) AND (x < x.ri
                    x := x + 1
                  IF
                    array[line + x] = background.colour
                      push (x, y)
                    TRUE
                      SKIP
                  WHILE x < x.right
```

```
                            SEQ
                              x := x + 1
                              WHILE (array[line + x] = background.colour) AND (x < x
                                x := x + 1
                              WHILE (array[line + x] <> background.colour) AND (x <
                                x := x + 1
                              IF
                                x < x.right
                                  push (x, y)
                                TRUE
                                  SKIP
                 TRUE
                   SKIP
              y := y - 2
              x := save.x
              IF
                y >= 0
                  SEQ
                    line := line - (pixels.line << 1)
                    WHILE (array[line + x] <> background.colour) AND (x < x.ri
                      x := x + 1
                    IF
                      array[line + x] = background.colour
                        push (x, y)
                      TRUE
                        SKIP
                    WHILE x < x.right
                      SEQ
                        x := x + 1
                        WHILE (array[line + x] = background.colour) AND (x < x
                          x := x + 1
                        WHILE (array[line + x] <> background.colour) AND (x <
                          x := x + 1
                        IF
                          x < x.right
                            push (x, y)
                          TRUE
                            SKIP
                TRUE
                  SKIP
:
PROC faster.draw.line (VAL INT x1, y1, x2, y2, [][]BYTE array)
  -- draws horizontal and vertical lines only
  -- points are in increasing values of x
  INT dx, dy :
  SEQ
    IF
      x1 < x2        -- draw horizontal line
        SEQ
          dx := x2 - x1                    -- always zero or positive
          SEQ x = x1 FOR dx + (x.width - 1)
            SEQ y = y1 FOR y.height
              screen[y][x] := foreground.colour
      y1 < y2        -- draw vertical line
        SEQ
          dy := y2 - y1
          SEQ y = y1 FOR dy
            SEQ x = x1 FOR x.width
              screen[y][x] := foreground.colour
      y2 < y1
        SEQ
          dy := y1 - y2
          SEQ y = y2 FOR dy
            SEQ x = x1 FOR x.width
              screen[y][x] := foreground.colour
      TRUE
        SKIP
:
PROC draw.polygon (VAL [][2]INT points, [][]BYTE array, VAL []INT dimensions)
  -- calls draw line to draw the sides of the polygon
  --VAL pixels.line IS dimensions[x.size] :
  INT result :
  INT x1, x2, y1, y2, x, y :
  VAL sides IS SIZE points :
  VAL last.p IS points[sides-1] :
  SEQ
    x := last.p[0]
```

```
              y := last.p[1]
              SEQ i = 0 FOR sides
                VAL point IS points[i] :
                SEQ
                  x1 := x
                  y1 := y
                  x2 := point[0]
                  y2 := point[1]
                  IF
                    x1 > x2
                      SEQ
                        x1 := x2
                        y1 := y2
                        x2 := x
                        y2 := y
                        x := x1
                        y := y1
                    TRUE
                      SEQ
                        x := x2
                        y := y2
                  clip.line (x1, y1, x2, y2, result, dimensions)
                  IF
                    result = in.range
                      --(result = in.range) AND (x.width = 1) AND (y.height = 1)
                      --fast.draw.line (x1, y1, x2, y2, array, pixels.line)
                      faster.draw.line(x1, y1, x2, y2, array)
                      --(result = part.inrange) OR (result = in.range)
                      --  draw.line (x1, y1, x2, y2, array, dimensions)
                    TRUE
                      SKIP
:
PROC Blank.box (([][]BYTE buffer.a, VAL INT y.start, VAL INT x.start, VAL INT w
  --!! new procedure --  --?? no checking for buffer overlap (error checking)
  [x.screen]BYTE dummy:
  SEQ
    IF
      shadow>0
        SEQ
          SEQ loop = 0 FOR width
            dummy[loop] := (BYTE shadow)
          SEQ loop = 0 FOR height
            [buffer.a[loop+(y.start+shadow.height)] FROM (x.start+shadow.width
      TRUE
        SKIP
    SEQ loop = 0 FOR width
      dummy[loop] := (BYTE blanking.color)
    SEQ loop = 0 FOR height
      [buffer.a[loop+y.start] FROM x.start FOR width] := [dummy FROM 0 FOR wid
:

PROC Draw.box([][]BYTE buffer.a,VAL INT x.start,VAL INT y.start, VAL INT width
  SEQ
    draw.polygon([[x.start,y.start],[x.start+width,y.start],[x.start+width,y.s
:

PROC Text.Box.Secure(VAL []INT dimensions, VAL INT position, VAL INT side,
                    VAL [x.image.size]BYTE header.byte, VAL INT active, VAL INT bar.
  VAL [128]INT header.int RETYPES header.byte:
  VAL WHITE IS BYTE 255:
  SCREEN.MAP IS screen.map:
  [126]BYTE blank:
  INT y.coord,x.coord:
  SEQ
    x.coord:=((side*x.secure.offset)+520)
    y.coord:=((position*y.secure.offset)+header.block.height)
    x.width := 3
    y.height := 3
    foreground.colour := (BYTE bottom.color)
    background.colour := (BYTE BLACK)
    Draw.box(screen,(side*x.secure.offset),y.coord,x.image.size-3,y.image.size
    Draw.box(screen,((side*x.secure.offset)+x.image.size),y.coord,123,y.image.
    --drawing.mode := 0
    x.width := 1
    y.height := 1
    foreground.colour := WHITE
    write(dimensions,x.coord    , 5 + y.coord, 5,"ZONE:")
```

```
     write(dimensions,x.coord +80,  5 + y.coord, 2,[' ',BYTE (camera.num[(heade
     write(dimensions,x.coord     , 30 + y.coord,14,
        zone.name[camera.num[(header.int[hi.camera.number])][0]])
     write(dimensions,x.coord    ,  73 + y.coord, 7,"CAMERA:")
     write(dimensions,x.coord +80, 73 + y.coord, 2,[' ',BYTE (header.int[hi.cam
     write(dimensions,x.coord    ,118 + y.coord,11,"Image time:")
     write(dimensions,x.coord +10,150 + y.coord, 8,[header.byte FROM  hb.time.d
     IF
       (header.int[hi.time.frac] < 100)AND(header.int[hi.time.frac] >= 0)
         SEQ
           write(dimensions,(10 + 64 ) + x.coord, 150 + y.coord,1,".")
           write(dimensions,(10 + 72 ) + x.coord, 150 + y.coord,1,[BYTE((header
           write(dimensions,(10 + 80 ) + x.coord, 150 + y.coord,1,[BYTE((header
       TRUE
         SKIP
     write(dimensions,x.coord +10, 182 + y.coord,10,[header.byte FROM  hb.time.
:

PROC Update.Secure.Box(VAL []INT dimensions, VAL INT position, VAL INT side,
              VAL [x.image.size]BYTE header.byte)
  VAL [128]INT header.int RETYPES header.byte:
  VAL WHITE IS BYTE 255:
  INT x.coord,y.coord:
  SEQ
    foreground.colour := WHITE
    background.colour :=   (BYTE BLACK)
    x.coord:=((side*x.secure.offset)+520)
    y.coord:=((position*y.secure.offset)+header.block.height)
    x.width := 1
    y.height := 1
    write(dimensions,x.coord+10, y.coord +150,8,[header.byte FROM  hb.time.dat
    IF
      (header.int[hi.time.frac] < 100)AND(header.int[hi.time.frac] >= 0)
        SEQ
          write(dimensions,(10+64) + x.coord, y.coord +150,1,".")
          write(dimensions,(10+72) + x.coord, y.coord +150,1,[BYTE((header.int
          write(dimensions,(10+80) + x.coord, y.coord +150,1,[BYTE((header.int
      TRUE
        SKIP
    write(dimensions,x.coord+10, 182 + y.coord,10,[header.byte FROM  hb.time.d
:

PROC Bar.Graph(VAL []INT dimensions,VAL INT active,VAL INT position,
              VAL INT side, VAL BYTE box.color,VAL INT action )
  SCREEN.MAP IS screen.map:
  VAL bar.len IS num.frames * bar.graph.width:
  --VAL [num.frames][3]BYTE Labels IS ["- 5","- 4","- 3","- 2","- 1"," 0 ","+
  [num.frames][3]BYTE Labels:
  VAL WHITE IS BYTE 255:
  [bar.len]BYTE blank.array:
  INT y.coord,y.center :
  INT x.coord,x.center :
  SEQ
    SEQ
      Labels[(alarm.frame-1)]:=" 0 "
      SEQ loop = 1 FOR frames.after
        SEQ
          [Labels[(loop+(frames.before))] FROM 0 FOR 2] := "+ "
          Labels[(loop+(frames.before))][2] := (BYTE (loop+48))
      SEQ loop = 0 FOR frames.before
        SEQ
          [Labels[loop] FROM 0 FOR 2]:= "- "
          Labels[loop][2]:=(BYTE ((num.frames-((frames.after+loop)+1))+48))
    x.width := 1
    y.height := 1
    x.coord := ((side*x.alarm.offset)+ x.bar.graph.offset)
    y.coord := (((position*y.alarm.offset)+y.bar.graph.offset)+2)
    SEQ loop = 0 FOR bar.len
      blank.array[loop] := (BYTE BLACK)
    SEQ loop = (y.coord+1) FOR (bar.graph.height-1)   -- blanks out the scree
      [screen[loop] FROM x.coord FOR bar.len] := [blank.array FROM 0 FOR bar.
    foreground.colour := box.color
    x.center:=((bar.graph.width/8)*7)
    y.center:=(bar.graph.height/5)
    SEQ loop = 0 FOR num.frames
```

```
    SEQ
      Draw.box(screen,(x.coord+(bar.graph.width*loop)),y.coord,bar.graph.w:1
        write(dimensions,(x.coord+((bar.graph.width*(loop+1)) - x.center)).
    write(dimensions,(x.coord+bar.text),(y.coord+y.center), 12,"Freeze Frame"
    polygon.fill (x.coord+((bar.graph.width*active)-(bar.graph.width/2)),(y :>
    background.colour := box.color
    foreground.colour:= (BYTE BLACK)
    write(dimensions,(x.coord+((bar.graph.width*active) - x.center)),(y.cocr:
    foreground.colour := box.color
    background.colour := (BYTE BLACK)
:
PROC Update.Text.Box(VAL []INT dimensions,VAL [x.image.size]BYTE header.byte,
                     VAL INT active,VAL INT position, VAL INT side, VAL INT zo
  VAL [128]INT header.int RETYPES header.byte:
  VAL pixels.line IS dimensions[x.size] :
  VAL WHITE IS BYTE 255:
  SCREEN.MAP IS screen.map:
  [126]BYTE blank:
  BYTE hold.colour:
  INT x.coord,y.coord:
  SEQ
    x.coord:=((x.image.size+1)+(side*(x.info.box+border.line)))
    y.coord:=(position*y.alarm.offset)
    foreground.colour := WHITE
    background.colour :=  (BYTE BLACK)
    x.width := 1
    y.height := 1
    write(dimensions, 20 + x.coord, 266 + y.coord,8,[header.byte FROM  hb.time
    IF
      (header.int[hi.time.frac] < 100)AND(header.int[hi.time.frac] >= 0)
        SEQ
          write(dimensions,(20 + 64 ) + x.coord, 266 + y.coord,1,".")
          write(dimensions,(20 + 72 ) + x.coord, 266 + y.coord,1,[BYTE((header
          write(dimensions,(20 + 80 ) + x.coord, 266 + y.coord,1,[BYTE((header
      TRUE
        SKIP
    write(dimensions,x.coord + 10, 298 + y.coord, 9,"ZOOM:    X")
    INT zoom:
    SEQ
      IF
        zoom.level=0
          zoom:= 1
        zoom.level=1
          zoom:= 2
        zoom.level=2
          zoom:= 4
        zoom.level=3
          zoom:= 8
        TRUE
          zoom:=1
      write(dimensions,x.coord+ 18, 298 + y.coord,10,[header.byte FROM  hb.ti
      write(dimensions,x.coord + 61, 330 + y.coord, 1,[(BYTE(zoom+48))])
    x.width := 3
    y.height := 4
    write(dimensions,x.coord + 6, 410 + y.coord,4,[header.byte FROM  hb.secs.r
    IF
      (position=0)
        IF
          side=0
            foreground.colour := (BYTE top.color)
          TRUE
            foreground.colour := (BYTE top.color.in)
      TRUE
        IF
          side=0
            foreground.colour:=(BYTE bottom.color)
          TRUE
            foreground.colour := (BYTE bot.color.in)
    hold.colour := foreground.colour
    background.colour :=  (BYTE BLACK)
    Bar.Graph(dimensions,header.int[hi.bar.num],position,side,hold.colour,acti
```

```
PROC Draw.Zone.Box(VAL INT position,VAL INT active,VAL []INT dimensions)
  BYTE hold.colour:
  SCREEN.MAP IS screen.map:
  SEQ
    IF
      active=1
        foreground.colour := (BYTE red)
      TRUE
        foreground.colour := (BYTE BLACK)
    hold.colour := foreground.colour
    background.colour := (BYTE BLACK)
    x.width := border.line
    y.height := border.line
    Draw.box(screen,0,(position*y.half.screen),(x.screen-border.line),(y.half.
:
PROC Text.Box.Zone.Alarm(VAL []INT dimensions, VAL [x.image.size]BYTE header.b
                        VAL INT position, VAL INT side)
  VAL [128]INT header.int RETYPES header.byte:
  VAL WHITE IS BYTE 255:
  SCREEN.MAP IS screen.map:
  [126]BYTE blank:
  VAL [128]INT header.int RETYPES header.byte:
  INT x.coord,y.coord:
  IF
    side= 0
      SEQ
        x.coord:=x.image.size+border.line
        y.coord:=(position*y.alarm.offset)
        foreground.colour := WHITE
        x.width :=2
        y.height :=3
        write(dimensions,x.coord + 8,35 + y.coord,14,
              zone.name[(camera.num[(header.int[hi.camera.number])][0])])
        x.width := 1
        y.height := 1
        write(dimensions,x.coord + 8,  10 + y.coord, 6,"Zone :")
        write(dimensions,x.coord+ 86,  10 + y.coord, 2,[' ',BYTE (camera.num[(
        write(dimensions,x.coord + 8,  80 + y.coord, 7,"Cause :")
        write(dimensions,x.coord + 8, 112 + y.coord,28,[header.byte FROM  hb.c
    TRUE
      SKIP
:
PROC Text.Box.Zone.Alarm.Zoom(VAL []INT dimensions, VAL [x.image.size]BYTE hea
                             VAL INT position, VAL INT side)
  VAL [128]INT header.int RETYPES header.byte:
  VAL WHITE IS BYTE 255:
  SCREEN.MAP IS screen.map:
  [126]BYTE blank:
  VAL [128]INT header.int RETYPES header.byte:
  INT x.coord,y.coord:
  SEQ
    x.coord:=(2*(x.image.size+(2*border.line)))
    y.coord:=0      --!!(position*y.alarm.offset)
    foreground.colour := WHITE
    x.width :=2
    y.height :=3
    write(dimensions,x.coord + 8,35 + y.coord,14,
          zone.name[(camera.num[(header.int[hi.camera.number])][0])])
    x.width := 1
    y.height := 1
    write(dimensions,x.coord + 8,  10 + y.coord, 6,"Zone :")
    write(dimensions,x.coord+ 86,  10 + y.coord, 2,[' ',BYTE (camera.num[(head
    write(dimensions,x.coord + 8,  80 + y.coord, 7,"Cause :")
    write(dimensions,x.coord + 8, 112 + y.coord,28,[header.byte FROM  hb.cause
:
PROC Text.Box.Alarm(VAL []INT dimensions, VAL [x.image.size]BYTE header.byte,
                   VAL INT active, VAL INT position, VAL INT side)
  VAL [128]INT header.int RETYPES header.byte:
  VAL pixels.line IS dimensions[x.size] :
  VAL WHITE IS BYTE 255:
  BYTE hold.colour:
  SCREEN.MAP IS screen.map:
  [126]BYTE blank:
  VAL pixels.line IS dimensions[x.size] :
  INT x.coord,y.coord:
```

```
SEQ
  secure.displayed := [FALSE,FALSE,FALSE,FALSE]
  IF
    (position=0)
      IF
        side=0
          foreground.colour := (BYTE top.color)
        TRUE
          foreground.colour := (BYTE top.color.in)
    TRUE
      IF
        side=0
          foreground.colour:=(BYTE bottom.color)
        TRUE
          foreground.colour := (BYTE bot.color.in)
  hold.colour := foreground.colour
  background.colour := (BYTE BLACK)
  x.coord:=((x.image.size+border.line)+(side*(x.info.box+border.line)))
  y.coord:=(position*y.alarm.offset)
  -- draw outer box
  x.width := border.line
  y.height := border.line
  Draw.box(screen,(side*x.alarm.offset),(y.coord+border.line),(x.image.size+
  -- draw image boxes
  Draw.box(screen,(side*x.alarm.offset),(y.coord+border.line),(x.image.size+
  -- draw frame boxes
  Draw.box(screen,(x.coord),(y.coord+192),x.info.box,292+bar.graph.height,di
  foreground.colour := WHITE
  x.width  := 1
  y.height := 1
  SEQ
    write(dimensions,x.coord + 10, 202 + y.coord, 8,"CAMERA :")
    write(dimensions,x.coord + 88, 202 + y.coord, 2,[' ',BYTE (header.int[hi
    write(dimensions,x.coord + 10, 234 + y.coord,11,"Image time:")
    write(dimensions,x.coord + 18, 266 + y.coord, 8,[header.byte FROM  hb.ti
    write(dimensions,x.coord+ 18, 298 + y.coord,10,[header.byte FROM  hb.ti
    write(dimensions,x.coord + 10, 330 + y.coord, 9,"ZOOM:    X")
    write(dimensions,x.coord + 61, 330 + y.coord, 1,"1")
    write(dimensions,x.coord +  8, 362 + y.coord,14,"Sec*'s Relative")
    write(dimensions,x.coord +  8, 377 + y.coord,10,"to alarm :")
    IF
      (header.int[hi.time.frac] < 100)AND(header.int[hi.time.frac] >= 0)
        SEQ
          write(dimensions,((20 + 64 ) + x.coord), 266 + y.coord,1,".")
          write(dimensions,((20 + 72 ) + x.coord), 266 + y.coord,1,[BYTE((he
          write(dimensions,((20 + 80 ) + x.coord), 266 + y.coord,1,[BYTE((he
      TRUE
        SKIP
    x.width := 3
    y.height := 4
    write(dimensions,x.coord + 6, 410 + y.coord,4,[header.byte FROM  hb.secs
  Bar.Graph(dimensions,header.int[hi.bar.num],position,side,hold.colour,acti
  --JDHUpdate.Text.Box(dimensions, y.position, x.position+640, header.byte,
:

PROC Text.Box.Alarm.Zoom(VAL []INT dimensions,
         VAL [x.image.size]BYTE header.byte, VAL INT position, VAL INT side)
  VAL [128]INT header.int RETYPES header.byte:
  INT x.coord,y.coord:
  SEQ
    foreground.colour := (BYTE top.color)
    background.colour := (BYTE BLACK)
    x.coord:=(2*x.image.size)
    y.coord:=(y.half.screen)
    --draw outer box
    x.width := (2*border.line)
    y.height :=(2*border.line)
    --Draw.box((side*x.alarm.offset),(y.coord+2),(x.image.size+2),((y.image.si
    -- draw image boxes
    Draw.box(screen,0,(header.block.height-(3*border.line)),(x.coord+(2*border
    -- draw frame boxes
    Draw.box(screen,(x.coord+(2*border.line)),y.coord,x.info.box,(y.coord-(2*b
    foreground.colour := (BYTE 255)    -- white
    x.width  := 1
    y.height := 1
```

```
SEQ
  write(dimensions,x.coord + 18, 10 + y.coord, 8,"CAMERA :")
  write(dimensions,x.coord + 96, 10 + y.coord, 2,[' ',BYTE (header.int[hi.
  write(dimensions,x.coord + 18, 234 + y.coord,11,"Image time:")
  write(dimensions,x.coord + 26, 266 + y.coord, 8,[header.byte FROM  hb.ti
  write(dimensions,x.coord + 16, 345 + y.coord,14,"Sec*'s Relative")
  write(dimensions,x.coord + 16, 377 + y.coord,10,"to alarm :")
  IF
    (header.int[hi.time.frac] < 100)AND(header.int[hi.time.frac] >= 0)
      SEQ
        write(dimensions,((28 + 64 ) + x.coord), 266 + y.coord,1,".")
        write(dimensions,((28 + 72 ) + x.coord), 266 + y.coord,1,[BYTE((he
        write(dimensions,((28 + 80 ) + x.coord), 266 + y.coord,1,[BYTE((he
    TRUE
      SKIP
  x.width := 3
  y.height := 4
  write(dimensions,x.coord + 11, 410 + y.coord,4,[header.byte FROM  hb.se:
--Bar.Graph(dimensions,header.int[hi.bar.num],position,side,hold.colour,a:
--x.width := 5
--y.height := 5
--foreground.colour :=   (BYTE top.color)
--draw.polygon([[0,64],[1270,64],[1270,1018],[0,1018]],
--              screenRAM,dimensions)
:

PROC Write.Menu(VAL INT position, VAL INT height.offset,VAL INT y.offset,
                VAL INT side, VAL INT width.offset,VAL INT x.offset, VAL
                VAL INT foreground, VAL INT background,
                VAL INT items, VAL [][]BYTE Text,VAL INT write.first,
                VAL []INT dimensions)
  BYTE old.foreground,old.background:
  INT menu.height,menu.width,leftover:
  SEQ
    x.width:=1
    y.height:=1
    old.foreground:=foreground.colour
    old.background:=background.colour
    menu.width:= ((width-((2*menu.border.size)-(2*x.menu.border)))/text.width.
    menu.height:=((height-(((3*menu.border.size)+(2*y.menu.border))+text.heigh
    IF
      items<=menu.height
        SEQ
          menu.height:=items
          leftover:=0
      TRUE
        leftover:=(items-menu.height)
    SEQ loop=0 FOR menu.height
      INT length:
      SEQ
        length:=SIZE(Text[loop])
        IF
          length<menu.width
            menu.width:=length
          TRUE
            SKIP
        IF
          ((write.first=1) AND (loop=0))
            SEQ
              foreground.colour:=(BYTE background)
              background.colour:=(BYTE foreground)
          TRUE
            SEQ
              foreground.colour:= (BYTE foreground)
              background.colour:= (BYTE background)
        write(dimensions,((((side*width.offset)+x.offset)+x.menu.border)+(menu
                ((((position*height.offset)+y.offset)+y.menu.border)+(menu.borde
                menu.width,Text[loop])
--IF
--   leftover>0
--     SEQ
--       foreground.colour:=(BYTE background)
--       background.colour:=(BYTE foreground)
--       SEQ loop = 0 FOR leftover
--         INT length:
--         SEQ
--           length:=SIZE(Text[menu.height+loop])
```

```
--        IF
--          length<menu.width
--            menu.width:=length
--          TRUE
--            SKIP
--          write.buffer(dimensions,buffer2,x.text.offset,(loop*text.he:::
-- TRUE
--   SKIP
  foreground.colour:=old.foreground
  background.colour:=old.background
:
PROC Draw.Menu(VAL INT position, VAL INT height.offset,VAL INT y.offset, VAL I
               VAL INT side, VAL INT width.offset,VAL INT x.offset, VAL INT
               VAL INT foreground, VAL INT background,
               VAL INT shadow,VAL []BYTE Title,VAL []INT dimensions)
  --!! currently no error checking on size of window
  INT length:
  BYTE old.foreground,old.background:
  SEQ
    old.foreground:=foreground.colour
    old.background:=background.colour
    Blank.box(screen,((position*height.offset)+y.offset),((side*width.offset)+
    foreground.colour:=(BYTE foreground)
    background.colour:=(BYTE background)
    x.width:=menu.border.size
    y.height:=menu.border.size
    Draw.box(screen,(((side*width.offset)+x.offset)+x.menu.border),(((position
    faster.draw.line(((((side*width.offset)+x.offset)+(2*x.menu.border)),(((pos
    x.width := 1
    y.height := 1
    length:=SIZE Title
    write(dimensions,(((side*width.offset)+x.offset)+((2*x.menu.border)+(menu.
    foreground.colour:=old.foreground
    background.colour:=old.background
:

VAL cursorEdge IS 16 :
VAL defltCursor  IS [ "x.                    ",
                      "xxx                   ",
                      "xxxxx                 ",
                      " xxxxxx               ",
                      " xxxxxxx              ",
                      "  xxxxxxxxx           ",
                      "  xxxxxxxxxx          ",
                      "   xxxxxxxxxxx        ",
                      "   xxxxxxxxxxxx",
                      "    xxxxxxxxxxx",
                      "    xxxxxxxx          ",
                      "    xx  xxxxx         ",
                      "         xxxxx        ",
                      "          xxxxx",
                      "           xxxx",
                      "            xxx"  ] :
VAL markedCursor IS [ "           xx         ",
                      "           xx         ",
                      "           xx         ",
                      "           xx         ",
                      "           xx         ",
                      "           xx         ",
                      "                      ",
                      "xxxxxx  .  xxxxxx",
                      "xxxxxx     xxxxx",
                      "                      ",
                      "           xx         ",
                      "           xx         ",
                      "           xx         ",
                      "           xx         ",
                      "           xx         ",
                      "           xx         "  ] :
```

```
[cursorEdge][cursorEdge] BYTE cursor, cursorSave,savedcursor :
--!![2] INT cursorSavePosn :
PROC saveCursor ( [][] BYTE screen, VAL INT x, y )
  [] BYTE flatScreen RETYPES screen :
  [] BYTE flatCursor RETYPES cursorSave :
  BYTBLT ( flatScreen, flatCursor,
           x + ((SIZE screen[0]) TIMES y), 0,
           SIZE screen [0], cursorEdge,
           cursorEdge, cursorEdge, moveAll )
:
PROC restoreUnderCursor ( [][] BYTE screen, VAL INT x, y )
  --!! changed non variable parameters
  SEQ
    [] BYTE flatScreen RETYPES screen :
    [] BYTE flatCursor RETYPES cursorSave :
    BYTBLT ( flatCursor, flatScreen,
             0, x + ((x.screen) TIMES y),
             cursorEdge, x.screen,
             cursorEdge, cursorEdge, moveAll )
:
PROC drawCursor ( [][] BYTE screen, [][] BYTE cursor, VAL INT x, y )
  SEQ
    [] BYTE flatScreen RETYPES screen :
    [] BYTE flatCursor RETYPES cursor :
    BYTBLT ( flatCursor, flatScreen,
             0, x + (x.screen TIMES y),
             cursorEdge, x.screen,
             cursorEdge, cursorEdge, moveNonZero )
:

PROC ZOOM.strip(VAL []INT dimensions, VAL INT frame, VAL INT x.pos,
                VAL INT y.pos, VAL INT x.strip, VAL INT y.strip,
                VAL INT scale, VAL INT y.put, VAL INT x.put, VAL INT side,
                VAL INT position,VAL INT ON.SCREEN)
  INT x.ref,y.ref,x.position,y.position:
  BYTE pixel:
  SEQ
    SEQ l1 = 0 FOR y.strip
      SEQ
        y.ref := y.put + (l1 << scale)
        SEQ l2 = 0 FOR x.strip
          SEQ
            pixel := frames[frame][l1+y.pos][l2+x.pos]
            x.ref := x.put + (l2 << scale)
            SEQ l4 = x.ref FOR (1 << scale)
              buffer[y.ref][l4] := pixel
            SEQ l3 = (y.ref+1) FOR (1 << scale)-1
              [buffer[l3] FROM x.put FOR (x.strip << scale)] := [buffer[y.ref] FRO
    y.position := (position * y.alarm.offset)
    x.position := (side * x.alarm.offset)
    IF
      ON.SCREEN = 1
        SEQ
          MOVE2D.strip(buffer,0,0,screen,x.position,y.position,x.image.size,y.
      TRUE
        SKIP
    cursor.exist := FALSE
:
PROC ZOOM.to.full.screen(VAL INT frame,VAL INT position, VAL INT side,
                         VAL INT source,VAL []INT dimensions)
  VAL header.byte IS frames[frame][0]:
  VAL [128]INT header.int RETYPES header.byte:
  INT x.ref,y.ref,x.position,y.position :
  BYTE pixel,old.foreground:
  SEQ
    IF
      source = 0 -- !!from screen (zoom.out)
        SEQ
          MOVE2D(buffer4,0,0,screen,640,512,x.alarm.window+shadow.width,y.alar
          x.width:=1
          y.height:=1
          write(dimensions,768,0,26,"abcdefghijklmnopqrstuvwxyz")
          MOVE2D(screen,(x.pending.offset),(((remove.sign(position-1))*y.alarm
          MOVE2D(screen,((side*x.alarm.offset)+border.width),((position*y.alar
      source = 2 -- from frame buffer
        MOVE2D(frames[frame],0,0,buffer2,0,0,x.image.size,y.image.size)
```

```
      TRUE
        MOVE2D(buffer,0,0,buffer2,0,0,x.image.size,y.image.size)
    clear.screen(0,BLACK)
    --!!?? changed from 0 to 1
    SEQ 12 = 1 FOR 220
      SEQ
        y.ref := ((12 << 1)+(header.block.height-(2*border.width)))
        --SEQ 11 = 0 FOR 516
        SEQ 11 = 0 FOR x.image.size
          pixel IS buffer2[12][11]:
          SEQ
            x.ref := ((11 << 1)+(2*border.width))
            screen[y.ref][x.ref] := pixel
            screen[y.ref][x.ref+1] := pixel
        screen[y.ref+1] := screen[y.ref]
    SEQ 12 = 220 FOR (y.image.size-220)
      SEQ
        y.ref := ((12 << 1)+(header.block.height-(2*border.width)))
        --SEQ 11 = 0 FOR 639
        SEQ 11 = 0 FOR x.image.size
          pixel IS buffer2[12][11]:
          SEQ
            x.ref := ((11 << 1)+(2*border.width))
            screen[y.ref][x.ref] := pixel
            screen[y.ref][x.ref+1] := pixel
        screen[y.ref+1] := screen[y.ref]

-- draw data in upper box
    old.foreground := foreground.colour
    foreground.colour := BYTE top.color
    Text.Box.Zone.Alarm.Zoom(dimensions,header.byte,position,side)
    Text.Box.Alarm.Zoom(dimensions,header.byte,position,side)
    foreground.colour := old.foreground
:
PROC ZOOM.in.full.screen()
  INT x.ref,y.ref:
  BYTE pixel:
  SEQ
    MOVE2D(buffer,0,0,buffer2,0,0,x.image.size,y.image.size)
    --SEQ 12 = 2 FOR 476
    SEQ 12 = 2 FOR (y.image.size-2)
      SEQ
        y.ref := ((12 << 1)+(header.block.height-(2*border.width)))
        SEQ 11 = 2 FOR (x.image.size-2)
          pixel IS buffer2[12][11]:
          SEQ
            x.ref := ((11 << 1)+(2*border.width))
            screen[y.ref][x.ref] := pixel
            screen[y.ref][x.ref+1] := pixel
        screen[y.ref+1] := screen[y.ref]
:
PROC unfull.screen(VAL []INT dimensions, VAL []INT window.contents)
  INT active,side,position,alarm.position,alarm.side:
  INT loop,loop2:
  SEQ
    clear.screen(0,BLACK)
    SEQ loop = 0 FOR max.windows
      SEQ
        IF
          window.contents[loop] = (-1)
            SKIP
          TRUE
            SEQ
              side:=(loop REM 2)
              position:=(loop/2)
              IF
                window.contents[loop] = full.screen.frame
                  active := 1
                TRUE
                  active := 0
              s0 IS frames[window.contents[loop]]:
              SEQ
                MOVE2D.strip(s0,0,0,screen,(side*x.alarm.offset),(position*y.a
                Text.Box.Zone.Alarm(dimensions,s0[0],position,side)
                Text.Box.Alarm(dimensions,s0[0],active,position,side)
                IF
                  active = 1
```

```
                    SEQ
                      alarm.position:=remove.sign(position-1)
                      alarm.side:=0 --!! currently pending alarm only on left
                  TRUE
                    SKIP
            --!! restore pending alarm buffer
            MOVE2D(screen,((alarm.side*x.alarm.offset)+x.pending.offset),((alarm.posit
            MOVE2D(buffer4,0,0,screen,((alarm.side*x.alarm.offset)+x.pending.offset),(
            MOVE2D(buffer2,0,0,buffer4,0,0,(x.alarm.window+shadow.width),(y.alarm.wind
            full.screen := FALSE
:
PROC Check.full(VAL BOOL full.screen,VAL []INT dimensions,VAL []INT window.con
  IF
    full.screen
      unfull.screen(dimensions,window.contents)
    TRUE
      SKIP
:
PROC setupCursor ( [cursorEdge][cursorEdge] BYTE cursor,
                   VAL [cursorEdge][cursorEdge] BYTE icon,
                   VAL BYTE black, edge, interior,
                   VAL BYTE edgeColour, interiorColour )
  SEQ
    SEQ i = 0 FOR cursorEdge
      row      IS cursor [i] :
      VAL irow IS icon [i] :
      SEQ j = 0 FOR cursorEdge
        BYTE b :
        SEQ
          b := irow [j]
          IF
            b = black
              row [j] := BYTE 0
            b = edge
              row [j] := edgeColour
            b = interior
              row [j] := interiorColour
            TRUE
              SKIP
:
PROC Send.Frame.Ttgf (VAL INT camera.to.display,VAL INT frame.number,VAL INT a
  BOOL ok:
  VAL rel.secs IS [[-2,1], [-2,0], [-1,1], [-1,0], [0,-1], [0,0], [0,1], [1,0]
  VAL rel.secs.factor IS 8:
  SEQ
    ok := FALSE
    WHILE (NOT ok)
      SEQ
        display.access.request ! camera.to.display; frame.number
        display.access.reply ? ok
    buffer IS frames[(((alarm*(cameras.per.zone*num.frames))+sequence)+((camer
    [481][128]INT buffer.int RETYPES buffer :
    SEQ
      display.access.frame ? buffer
      display.access.clear ! camera.to.display; frame.number
      buffer.int[0][hi.frame.number] := sequence
      buffer.int[0][hi.bar.num] := bar.num
      INT diff100s, whole.secs, half.secs:
      [x.image.size]BYTE header.byte RETYPES buffer.int[0]:
      SEQ
        diff100s := ((buffer.int[0][hi.time]-longtime)*100)+
                    (buffer.int[0][hi.time.frac]-fractime)
        whole.secs := rel.secs[((bar.num*rel.secs.factor)/num.frames)-1][0]
        half.secs := rel.secs[((bar.num*rel.secs.factor)/num.frames)-1][1]
        IF
          (whole.secs <0) OR (half.secs <0)
            SEQ
              header.byte[hb.secs.rel]:='-'
              IF
                whole.secs < 0
                  whole.secs := whole.secs * (-1)
                TRUE
                  SKIP
              IF
                half.secs < 0
                  half.secs := half.secs * (-1)
```

```
                  TRUE
                    SKIP
              (whole.secs = 0) AND (half.secs = 0)
                header.byte[hb.secs.rel] := ' '
              TRUE
                header.byte[hb.secs.rel] := '+'
          IF
            (whole.secs > (-9)) AND (whole.secs < 9)
              header.byte[hb.secs.rel+1] := BYTE(whole.secs+48)
            TRUE
              SKIP
          header.byte[hb.secs.rel+2] := '.'
          IF
            (half.secs = 0) OR (half.secs = 1)
              header.byte[hb.secs.rel+3] := BYTE((half.secs*5)+48)
            TRUE
              SKIP
:
-- if it doesn't work, put procs back here SEQ
  full.screen := full.screen
  full.screen.frame := -1
  --DACbits := 6   -- initVTG ()   -- sets up DACbits !
  init.G170 (0)                    -- initialise G170 to default table 0
  foreground.colour := 255 (BYTE)  -- white
  background.colour :=   0 (BYTE)  -- black
  line.frequency := l.freq
  frame.rate     := f.rate
  pixel.clock    := pix.clck
  interlace      := FALSE
  save.cursor[1] := 0              -- initial cursor position
  clear.screen (1, 0)              -- clear screen 1 to black
  current.screen := 0              -- select screen 0 for drawing
  displayed.screen := 0            -- select screen 0 for display
  select.screen (current.screen)   -- tell hardware to display screen 0
  clear.screen (current.screen, 0) -- black
  save.cursor[current.screen] := 0 -- initial cursor position
  SEQ char.int = first.char FOR max.capchars
    SEQ
      store.char.in.array(char.int, charset.1, default.charset, 16, 8)
      store.char.in.array(char.int, charset.2, second.charset, 32, 8)
  secure.displayed := [FALSE,FALSE,FALSE,FALSE]
  heap.left := SIZE window.heap
  windows[heap.pos] := 0
  windows[x.size] := x.screen
  windows[y.size] := y.screen
  windows[x.start] := 0
  windows[y.start] := 0
  windows[total.size] := x.screen * y.screen
  windows[curs.pos] := 0
  cursor.pos := 0
  x.width := 1
  y.height := 1
  setupCursor ( cursor, defltCursor, ' ','.','x', BYTE 9, BYTE 9 )
  setupCursor ( savedcursor, markedCursor, ' ','.','x',BYTE 9, BYTE 9)
  --!!cursorSavePosn := [ -1, -1 ]
  going := TRUE
  zoom.level := 0
  zoom := FALSE
  WHILE going
    INT pixels.line,max.lines,start,curpos,size:
    SEQ
      dimensions     IS windows :
      SEQ
        pixels.line := dimensions[x.size]
        max.lines   := dimensions[y.size]
        start       := dimensions[heap.pos]
        curpos      := dimensions[curs.pos]
        size        := dimensions[total.size]
  host.to.ttg3 ? command
  window IS [window.heap FROM start FOR 5] :
  CASE command
    c.draw.line
      INT x1, y1, x2, y2 :
      INT result :
```

```
SEQ
  host.to.ttg3 ? x1; y1; x2; y2
  IF
    x1 > x2
      INT x, y :
      SEQ
        x := x1
        y := y1
        x1 := x2
        y1 := y2
        x2 := x
        y2 := y
    TRUE
      SKIP
  clip.line (x1, y1, x2, y2, result, dimensions)
  IF
    (result = in.range) AND (x.width = 1) AND (y.height = 1)
      SEQ
        ttg3.to.host ! e.ok
        faster.draw.line(x1, y1, x2, y2, screen)
    TRUE
      ttg3.to.host ! e.out.of.drawing.range
c.move.alarm.buffer
  INT alarm.count, bottom, new.position:
  INT new.side, old.position, old.side:
  SEQ    --!! bring in position and side
    host.to.ttg3 ? alarm.count
    host.to.ttg3 ? new.position
    host.to.ttg3 ? new.side
    host.to.ttg3 ? old.position
    host.to.ttg3 ? old.side
    IF
      alarm.count >= 1
        INT height:
        SEQ
          height := ((alarm.count*text.height.1)+(((2*y.menu.border)
          IF
            height>y.alarm.window
              height:=y.alarm.window
            TRUE
              SKIP
          SEQ
            MOVE2D(screen,((old.side*x.alarm.offset)+x.pending.offse
                  ((old.position*y.alarm.offset)+y.pending.offset),b
            MOVE2D(buffer4,0,0,screen,((old.side*x.alarm.offset)+x.p
                  ((old.position*y.alarm.offset)+y.pending.offset),(
            MOVE2D(screen,((new.side*x.alarm.offset)+x.pending.offse
                  ((new.position*y.alarm.offset)+y.pending.offset),b
            MOVE2D(buffer,0,0,screen,((new.side*x.alarm.offset)+x.pe
                  ((new.position*y.alarm.offset)+y.pending.offset),(
      TRUE
        SKIP
    ttg3.to.host ! e.ok
c.draw.rectangle
  INT x1, y1, x2, y2, x.len, y.len :
  SEQ
    host.to.ttg3 ? x1; y1; x.len; y.len
    ttg3.to.host ! e.ok
    x2 := (x1 + x.len) - 1
    y2 := (y1 + y.len) - 1
    draw.polygon ([[x1,y1],[x1,y2],[x2,y2],[x2,y1]],screen, dimer
c.draw.polygon
  INT sides :
  [max.sides][2]INT points :
  SEQ
    host.to.ttg3 ? sides
    IF
      sides > max.sides
        INT junk :
        SEQ
          SEQ i = 0 FOR max.sides
            host.to.ttg3 ? points[i][0]; points[i][1]
          SEQ i = 0 FOR (sides - max.sides)
            host.to.ttg3 ? junk; junk
          sides := max.sides
```

```
          TRUE
            SEQ i = 0 FOR sides
              host.to.ttg3 ? points[i][0]; points[i][1]
          ttg3.to.host ! e.ok
          draw.polygon ([points FROM 0 FOR sides], screen, dimensions)
c.set.xwidth
  INT width :
  SEQ
    host.to.ttg3 ? width      -- input new pixel width
    IF
      (width > 0) AND (width <= x.screen)
        SEQ
          ttg3.to.host ! e.ok
          x.width := width
      TRUE
        ttg3.to.host ! e.out.of.drawing.range c.set.yheight
  INT height :
  SEQ
    host.to.ttg3 ? height     -- input new pixel height
    IF
      (height > 0) AND (height <= y.screen)
        SEQ
          ttg3.to.host ! e.ok
          y.height := height
      TRUE
        ttg3.to.host ! e.out.of.drawing.range
c.clear.screen
  -- clears currently selected screen to specified colour
  INT colour :
  SEQ
    host.to.ttg3 ? colour              -- colour to clear screen
    IF
      (colour >= 0) AND (colour < 256)
        SEQ
          ttg3.to.host ! e.ok
          clear.screen (current.screen, colour)
      TRUE
        ttg3.to.host ! e.invalid.colour
c.select.screen
  -- selects a new screen for subsequent drawing
  INT screen.number :
  SEQ
    host.to.ttg3 ? screen.number
    IF
      (screen.number = 0) OR (screen.number = 1)
        SEQ
          ttg3.to.host ! e.ok
      TRUE
        ttg3.to.host ! e.invalid.screen
c.display.screen
  -- display specified screen
  INT screen.number :
  SEQ
    host.to.ttg3 ? screen.number
    IF
      (screen.number = 0) OR (screen.number = 1)
        SEQ
          ttg3.to.host ! e.ok
          select.screen (screen.number)
          displayed.screen := screen.number
      TRUE
        ttg3.to.host ! e.invalid.screen
c.flip.screen
  SEQ
    save.cursor[current.screen] := cursor.pos
    current.screen  := displayed.screen
    displayed.screen := 1 - displayed.screen
    ttg3.to.host ! displayed.screen
    select.screen (displayed.screen)
    cursor.pos := save.cursor[current.screen]
    --displayed.window := 0
c.write.string
  -- writes string on screen at current cursor position
  INT string.length :
  [max.string.size]BYTE string :
```

```
            SEQ
              host.to.ttg3 ? string.length
              IF
                string.length < max.string.size
                  BOOL ok :
                  SEQ
                    ok := TRUE
                    host.to.ttg3 ? [string FROM 0 FOR string.length]
                    screen IS screen.map:
                    SEQ
                      write.string (screen.map,
                             [string FROM 0 FOR string.length],
                             screen.map,
                             dimensions, ok, screenRAM)
                    IF
                      ok
                        ttg3.to.host ! e.ok
                      TRUE
                        ttg3.to.host ! e.out.of.drawing.range
                TRUE
                  SEQ
                    host.to.ttg3 ? [screen.map FROM 0 FOR string.length]
                    ttg3.to.host ! e.string.length.exceeded
          c.move
            -- move to absolute position on screen
            INT x, y :
            BOOL ok :
            SEQ
              host.to.ttg3 ? x; y      -- new cursor position
              IF
                (x >= 0) AND (x < pixels.line) AND (y >= 0) AND (y < max.lines
                  SEQ
                    ttg3.to.host ! e.ok
                    cursor.pos := (y * pixels.line) + x
                TRUE
                  ttg3.to.host ! e.out.of.drawing.range
          c.select.fg.colour
            -- select colour for drawing graphics and writing text
            INT colour :
            SEQ
              host.to.ttg3 ? colour             -- new foreground colour
              IF
                (colour >= 0) AND (colour < size.colour.table)
                  SEQ
                    ttg3.to.host ! e.ok
                    foreground.colour := BYTE colour
                TRUE
                  ttg3.to.host ! e.invalid.colour
          c.select.bg.colour
            -- select new colour for text background
            INT colour :
            SEQ
              host.to.ttg3 ? colour
              IF
                (colour >= 0) AND (colour < size.colour.table)
                  SEQ
                    ttg3.to.host ! e.ok
                    background.colour := BYTE colour
                TRUE
                  ttg3.to.host ! e.invalid.colour
          c.set.colour
            -- set new colour in table
            INT table.entry, red, green, blue :
            SEQ
              host.to.ttg3 ? table.entry; red; green; blue
              IF
                (table.entry >= 0) AND (table.entry < size.colour.table)
                  SEQ
                    ttg3.to.host ! e.ok
                    set.colour (table.entry, (red /\ #FF) , -->> 2,
                                             (green /\ #FF) , -->> 2,
                                             (blue /\ #FF) ) -->> 2)
                TRUE
                  ttg3.to.host ! e.invalid.colour
          c.select.contrast
            INT contrast.level:
```

```
SEQ
  host.to.ttg3 ? contrast.level
  IF
    (contrast.level >= 0) AND (contrast.level <= 20)
      SEQ
        SEQ loopvar = 10 FOR 245
          VAL temp IS contrast.map[contrast.level][loopvar] :
          SEQ
            set.colour (loopvar, (temp /\ #FF),
                                 (temp /\ #FF),
                                 (temp /\ #FF))
        ttg3.to.host ! e.ok
    TRUE
      ttg3.to.host ! e.invalid.colour
c.select.colour.table
  -- select one of the colour tables
  -- any user set up colours will be lost
  INT table :
  SEQ
    host.to.ttg3 ? table
    IF
      (table >= 0) AND (table < max.tables)
        SEQ
          ttg3.to.host ! e.ok
          init.G170 (table)
      TRUE
        ttg3.to.host ! e.invalid.colour.table
c.write.file.to.screen
  SEQ
    s0 IS screenRam [0] :
    SEQ
      host.to.ttg3 ? s0
      ttg3.to.host ! e.ok
c.pan.and.scroll.frame
  [2]INT direction:
  INT side,position:
  SEQ
    host.to.ttg3 ? direction[0];direction[1];position;side;Current.f
    step.size := step<<zoom.level
    VAL Step IS step.size :
    VAL width IS x.image.size >> zoom.level :
    VAL height IS y.image.size >> zoom.level :
    SEQ
      IF
        zoom
          SEQ
            IF
              direction[0] = 1
                SEQ
                  IF
                    (zoom.pos[1][1] + step) < y.image.size
                      SEQ
                        MOVE2D(screen,(side*x.alarm.offset)+border.w
                        ZOOM.strip(dimensions,Current.frame,zoom.pos
                        zoom.pos[0][1] := zoom.pos[0][1] + step
                        zoom.pos[1][1] := zoom.pos[1][1] + step
                    TRUE
                      SKIP
              direction[0] = (-1)
                SEQ
                  IF
                    (zoom.pos[0][1] - step) > 0
                      SEQ
                        MOVE2D(screen,(side*x.alarm.offset)+border.w
                        ZOOM.strip(dimensions,Current.frame,zoom.pos
                        zoom.pos[0][1] := zoom.pos[0][1] - step
                        zoom.pos[1][1] := zoom.pos[1][1] - step
                    TRUE
                      SKIP
              TRUE
                SKIP
            IF
              direction[1] = (-1)
                SEQ
                  IF
                    (zoom.pos[0][0] - step) > 0
                      SEQ
                        MOVE2D(screen,(side*x.alarm.offset)+border.w
```

```
                        ZOOM.strip(dimensions,Current.frame,zoom.pos
                        zoom.pos[0][0] := zoom.pos[0][0] - step
                        zoom.pos[1][0] := zoom.pos[1][0] - step
                      TRUE
                        SKIP
                  direction[1] = 1
                    SEQ
                      IF
                        (zoom.pos[1][0] + step) < x.image.size
                          SEQ
                            MOVE2D(screen,(side*x.alarm.offset)+(Step+bo
                            ZOOM.strip(dimensions,Current.frame,zoom.pos
                            zoom.pos[0][0] := zoom.pos[0][0] + step
                            zoom.pos[1][0] := zoom.pos[1][0] + step
                        TRUE
                          SKIP
                TRUE
                  SKIP
          TRUE
            SKIP
      ttg3.to.host ! e.ok
c.set.alarm.time
  SEQ
    host.to.ttg3 ? longtime; fractime
    ttg3.to.host ! e.ok
c.send.frame
  SEQ
    host.to.ttg3 ? frame
    s0 IS frames[frame] :
    SEQ
      host.to.ttg3 ? s0
      ttg3.to.host ! e.ok
c.get.frame
  SEQ
    host.to.ttg3 ? frame
    s0 IS frames[frame]:
    SEQ
      ttg3.to.host ! s0
c.get.frame.ttgf
  INT zone.to.display,alarm,loop,loop2:
  [cameras.per.zone]INT frame.to.display:
  SEQ
    host.to.ttg3 ? zone.to.display;frame.to.display;alarm
    VAL INT sequence IS 0:
    SEQ loop=0 FOR cameras.per.zone
      SEQ
        Send.Frame.Ttgf(zone[zone.to.display][loop],frame.to.display
        SEQ loop2 = 0 FOR frames.before
          Send.Frame.Ttgf(zone[zone.to.display][loop],
              (((frame.to.display[loop]+num.frames)+(frames.after+(
              alarm,(frames.before-loop2),(loop2+1),loop)
        SEQ loop2 = 0 FOR frames.after
          Send.Frame.Ttgf(zone[zone.to.display][loop],
              ((frame.to.display[loop]+(loop2+1))REM num.frames),
              alarm,(alarm.frame+(frames.after-(loop2+1))),
              (alarm.frame+(1+loop2)),loop)
    ttg3.to.host ! e.ok
c.move.frames
  INT frame.source,frame.destination:
  SEQ
    host.to.ttg3 ? frame.destination;frame.source
    frames[frame.destination] := frames[frame.source]
    ttg3.to.host ! e.ok
c.copy.to.screen
  INT position,side,alarm,active,secure:
  SEQ
    host.to.ttg3 ? alarm;position;side;active;secure
    Check.full(full.screen,dimensions,window.contents)
    s0 IS frames[alarm] :
    SEQ
      MOVE2D.strip(s0,0,0,screen,,side*x.alarm.offset),(position*y.a
      Text.Box.Zone.Alarm(dimensions,s0[0],position,side)
      Text.Box.Alarm(dimensions,s0[0],active,position,side)
    ttg3.to.host ! e.ok
c.copy.low.res
  INT position,side,alarm,active,secure:
```

```
SEQ
  host.to.ttg3? alarm;position;side;active;secure
  Check.full(full.screen,dimensions,window.contents)
  s0 IS frames[alarm]:
  low.res IS buffer:
  SEQ
    SEQ loop=0 FOR x.image.size
      IF
        (loop\2)=0
          SEQ loop2=0 FOR y.image.size
            IF
              (loop2\2)=0
                SEQ
                  low.res[loop][loop2]:=s0[loop][loop2]
                  low.res[loop][loop2+1]:=s0[loop][loop2]
                  low.res[loop+1][loop2+1]:=s0[loop][loop2]
                  low.res[loop+1][loop2]:=s0[loop][loop2]
              TRUE
                SKIP
        TRUE
          SKIP
    MOVE2D(low.res,0,0,screen,0,0,x.image.size,y.image.size)
  ttg3.to.host ! e.ok
c.update.screen
  INT position,side,alarm,active,secure:
  SEQ
    host.to.ttg3 ? alarm;position;side;active;secure
    Check.full(full.screen,dimensions,window.contents)
    s0 IS frames[alarm] :
    SEQ
      MOVE2D.strip(s0,0,0,screen,(side*x.alarm.offset),((position*y.
      Update.Text.Box(dimensions,s0[0],active,position,side,zoom.lev
    ttg3.to.host ! e.ok
c.blank.frame --!! modified to execute blank.box
  INT height,width,position,side,alarm,sequence,blanking.color,secur
  SEQ
    host.to.ttg3 ? position;side;blanking.color;secure
    IF
      secure = 1
        SEQ
          position := (position * y.image.size)+header.block.height
          height := (y.image.size+(2*border.line))
          width := x.half.screen
      TRUE
        SEQ
          position := (position * (y.alarm.offset))
          height := (y.image.size+((3*border.line)+bar.graph.height)
          width :=x.half.screen
    side := side * x.half.screen
    Blank.box (screen,position,side,width,height,blanking.color,0)
    ttg3.to.host ! e.ok
c.display.frame
  --INT zone.number,frame.number:
  [cameras.per.zone]INT zone.number:
  [cameras.per.zone]INT frame.number:
  INT position,side,active,secure:
  BOOL ok:
  SEQ
    host.to.ttg3 ? zone.number;frame.number;position;side;active;sec
    Check.full(full.screen,dimensions,window.contents)
    SEQ loop=0 FOR cameras.per.zone
      SEQ
        display.access.request ! zone.number[loop]; frame.number[loo
        display.access.reply   ? ok
        side:=loop
        IF
          ok
            SEQ
              s0 IS buffer :
              --!! changed buffer specs
              [y.image.size+1][(x.image.size/4)]INT buffer.int RETYP
              SEQ
                display.access.frame ? buffer
                display.access.clear ! zone.number[loop]; frame.numb
                IF
                  buffer.int[0][1] <> zone.number[loop]
                    CAUSEERROR()
```

```
                    buffer.int[0][2] <> frame.number[loop]
                      CAUSEERROR()
                    TRUE
                      SKIP
                  IF
                    secure = 1
                      INT secure.index:
                      SEQ
                        secure.index := loop+(2*position)
                        MOVE2D.strip(buffer,0,0,screen,(side*x.secure.
                        IF
                          secure.displayed[secure.index]
                            Update.Secure.Box(dimensions,position,s::e
                          TRUE
                            SEQ
                              Text.Box.Secure(dimensions,position,side
                              secure.displayed[secure.index] := TRUE
                    TRUE
                      SEQ
                        MOVE2D.strip(buffer,0,0,screen,(side*x.alarm.o
                        Update.Text.Box(dimensions,buffer[0],active,po
        TRUE
          SKIP
        ttg3.to.host ! e.ok
c.unmenu --!! new procedure
  INT position,side,alarm.state:
  SEQ
    host.to.ttg3 ? position
    host.to.ttg3 ? side
    host.to.ttg3 ? alarm.state
    IF
      alarm.state = 0
        Blank.box(screen,((position*y.secure.offset)+header.block.he
      TRUE  -- moves image back to screen
        MOVE2D(buffer3,0,0,screen,((side*x.alarm.offset)+x.menu.offs
    ttg3.to.host ! e.ok
c.scroll.menu
  --!! changed to include side
  INT Up.or.Down:
  INT position,side,items,x.text.start,y.text.start.up,y.text.start.
  INT y.text.finish.down,y.text.finish.up,width,menu.pos,menu.prev:
  [80]BYTE string,string2:
  SEQ
    host.to.ttg3 ? Up.or.Down
    host.to.ttg3 ? position
    host.to.ttg3 ? side
    host.to.ttg3 ? items
    host.to.ttg3 ? string;string2
    x.text.start:=((side*x.alarm.offset)+(x.text.offset+(x.menu.offs
    y.text.start.down:=(((position*y.alarm.offset)+y.menu.offset)+
                       ((y.menu.border+((2*menu.border.size)+
                       (2*text.height.1)))+y.text.offset))
    y.text.start.up:=(((position*y.alarm.offset)+y.menu.offset)+
                     ((y.menu.border+((2*menu.border.size)+
                     (text.height.1)))+y.text.offset))
    y.text.finish.down := (y.text.start.up+((items-1)*text.height.1))
    y.text.finish.up   := (y.text.start.up+((items-2)*text.height.1))
    width:= ((x.menu.window-((2*menu.border.size)-(2*x.menu.border))
    width:= (width*text.width.1)
    IF
      Up.or.Down = 1 -- Up
        SEQ
          MOVE2D(screen,x.text.start,y.text.start.up,
              buffer,0,0,width,((items-1)*text.height.1))
          MOVE2D(buffer,0,0,screen,x.text.start,y.text.start.down,
              width,(((items-1)*text.height.1)-char.line.spacing))
          menu.pos:=0
          menu.prev:=(menu.pos+1)
      TRUE -- Down
        SEQ
          MOVE2D(screen,x.text.start,y.text.start.down,
              screen,x.text.start,y.text.start.up,width,
              (((items-2)*text.height.1)-char.line.spacing))
          menu.pos:=(items-1)
          menu.prev:=(items-2)
```

```
      Select.Box(position,y.alarm.offset,y.menu.offset,y.menu.window,
                 side,x.alarm.offset,x.menu.offset,x.menu.window,
                 5,255,menu.pos,string,dimensions)
      Select.Box(position,y.alarm.offset,y.menu.offset,y.menu.window,
                 side,x.alarm.offset,x.menu.offset,x.menu.window,
                 255,5,menu.prev,string2,dimensions)
      ttg3.to.host ! e.ok
  c.invert
    INT side,position,items,len,menu.pos:
    INT menu.prev,menu.replace,menu.insert:
    [80]BYTE string,string2:
    INT foreground, background:
    SEQ
      host.to.ttg3 ? position;side;items;menu.pos;string
      host.to.ttg3 ? menu.prev;string2;foreground;background
      SEQ
        Select.Box(position,y.alarm.offset,y.menu.offset,y.menu.window
        Select.Box(position,y.alarm.offset,y.menu.offset,y.menu.window
      ttg3.to.host ! e.ok
  c.set.cause
    [menu.lines.char]BYTE cause.line:
    INT side,position,active.window,display.or.not,len:
    SEQ
      host.to.ttg3 ? side;position;Current.frame;display.or.not;len::c
      [frames[Current.frame][0] FROM hb.cause.1 FOR len] := [cause.lin
      IF
        display.or.not = 1
          SEQ--!! removed x.side, y.position
            Text.Box.Zone.Alarm(dimensions,frames[Current.frame][0],po
        TRUE
          SKIP
      ttg3.to.host ! e.ok
  c.zoom.reset
    SEQ
      zoom.level := 0
      zoom := FALSE
      ttg3.to.host ! zoom.level
  c.zoom.in.frame           -- page.down
    INT side,position,alarm,current.frame,zoom.level:
    INT factor:
    SEQ
      host.to.ttg3 ? side;position;Current.frame;window.contents;zoom.
      SEQ
        IF
          zoom AND (zoom.level > 2)
            SKIP
          zoom AND (zoom.level > 0)
            SEQ
              factor := 1 << (zoom.level - 1)
              ZOOM.strip(dimensions,Current.frame,
                  (((zoom.pos[0][0]*3) + zoom.pos[1][0])/4),
                  (((zoom.pos[0][1]*3) + zoom.pos[1][1])/4),
                  128/factor,120/factor,zoom.level+1,0,0,
                  side,position,1)
              zoom.level := zoom.level + 1
              temp := ((zoom.pos[0][0]*3) + zoom.pos[1][0])/4
              zoom.pos[1][0] := ((zoom.pos[1][0]*3) + zoom.pos[0][0])/
              zoom.pos[0][0] :=temp
              temp := ((zoom.pos[0][1]*3) + zoom.pos[1][1])/4
              zoom.pos[1][1] := ((zoom.pos[1][1]*3) + zoom.pos[0][1])/
              zoom.pos[0][1] :=temp
              zoom := TRUE
          zoom AND (zoom.level = (-2))
            SEQ
              ZOOM.to.full.screen(Current.frame,position,side,1,
                  dimensions)
              zoom.level := -1
          zoom AND (zoom.level < (-2))
            INT x.step, y.step, x.max, y.max:
            SEQ
              zoom.level := zoom.level + 1
              factor := (-zoom.level) - 1
              x.step := 128 >> factor
              y.step := 120 >> factor
              x.max  := x.image.size >> factor
              y.max  := y.image.size >> factor
              zoom.pos[0][0] := zoom.pos[0][0] - x.step
```

```
                zoom.pos[0][1] := zoom.pos[0][1] - y.step
                zoom.pos[1][0] := zoom.pos[1][0] + x.step
                zoom.pos[1][1] := zoom.pos[1][1] + x.step
                IF
                  zoom.pos[0][0] < 0
                    SEQ
                      zoom.pos[0][0] := 0
                      zoom.pos[1][0] := x.max
                  TRUE
                    SKIP
                IF
                  zoom.pos[0][1] <= 0
                    SEQ
                      zoom.pos[0][1] := 0
                      zoom.pos[1][1] := y.max
                  TRUE
                    SKIP
                IF
                  zoom.pos[1][0] >= 511
                    SEQ
                      zoom.pos[0][0] := x.image.size - x.max
                      zoom.pos[1][0] := 511
                  TRUE
                    SKIP
                IF
                  zoom.pos[1][1] >= 479
                    SEQ
                      zoom.pos[0][1] := y.image.size - y.max
                      zoom.pos[1][1] := 479
                  TRUE
                    SKIP
                ZOOM.strip(dimensions,Current.frame,zoom.pos[0][0],
                   zoom.pos[0][1], x.max, y.max, factor, 0, 0, side, po
                ZOOM.in.full.screen()
          full.screen          -- zoom.level = -1
            SEQ
              zoom.level := 0
              zoom := FALSE
              unfull.screen(dimensions,window.contents)
          TRUE
            SEQ    -- first zoom 
              zoom.pos := [[0,0],[x.image.size,y.image.size]]
              ZOOM.strip(dimensions,Current.frame,128,120,(x.image.siz
              zoom.level := 1
              temp := ((zoom.pos[0][0]*3) + zoom.pos[1][0])/4
              zoom.pos[1][0] := ((zoom.pos[1][0]*3) + zoom.pos[0][0])/
              zoom.pos[0][0] :=temp
              temp := ((zoom.pos[0][1]*3) + zoom.pos[1][1])/4
              zoom.pos[1][1] := ((zoom.pos[1][1]*3) + zoom.pos[0][1])/
              zoom.pos[0][1] :=temp
              zoom := TRUE
    IF
      full.screen
        ttg3.to.host ! e.full.screen;zoom.level
      TRUE
        INT active.window:
        SEQ
          active.window:=(position*2)+side
          Update.Text.Box(dimensions,frames[Current.frame][0],window
          ttg3.to.host ! e.ok;zoom.level
c.zoom.out.frame
  INT side,position,Current.frame,factor,zoom.level:
  SEQ
    host.to.ttg3 ? side;position;Current.frame;window.contents;zoom.
    s1 IS screenRAM:
    SEQ
      IF
        zoom AND (zoom.level > 1)
          SEQ
            zoom.level := zoom.level - 1
            factor := 1 << (zoom.level - 1)
            zoom.pos[0][0] := zoom.pos[0][0] - (64/factor)
            zoom.pos[0][1] := zoom.pos[0][1] - (60/factor)
            zoom.pos[1][0] := zoom.pos[1][0] + (64/factor)
```

```
              zoom.pos[1][1] := zoom.pos[1][1] + (64/factor)
              IF
                zoom.pos[0][0] < 0
                  SEQ
                    zoom.pos[0][0] := 0
                    zoom.pos[1][0] := 256/factor
                TRUE
                  SKIP
              IF
                zoom.pos[0][1] <= 0
                  SEQ
                    zoom.pos[0][1] := 0
                    zoom.pos[1][1] := 240/factor
                TRUE
                  SKIP
              IF
                zoom.pos[1][0] >= 511
                  SEQ
                    zoom.pos[0][0] := x.image.size - (256/factor)
                    zoom.pos[1][0] := 511
                TRUE
                  SKIP
              IF
                zoom.pos[1][1] >= 479
                  SEQ
                    zoom.pos[0][1] := y.image.size - (240/factor)
                    zoom.pos[1][1] := 479
                TRUE
                  SKIP
              ZOOM.strip(dimensions,Current.frame,zoom.pos[0][0],zoom.
        (zoom.level = 0) AND (NOT full.screen)
          SEQ
            ZOOM.to.full.screen(Current.frame,position,side,0,dimens
            full.screen := TRUE
            full.screen.frame := Current.frame
            zoom.level := -1
        zoom.level = 0
          SKIP
        zoom.level < (-3)
          SKIP
        zoom.level < 0
          SEQ
            factor := 1 << ((-zoom.level) - 1)
            IF
              zoom.level = (-1)
                SEQ
                  zoom.pos := [[0,0],[x.image.size,y.image.size]]
                  ZOOM.strip(dimensions,Current.frame,128,120,256,24
              TRUE
                SKIP
            ZOOM.strip(dimensions,Current.frame,(((zoom.pos[0][0]*3)
            zoom.level := zoom.level - 1
            temp := ((zoom.pos[0][0]*3) + zoom.pos[1][0])/4
            zoom.pos[1][0] := ((zoom.pos[1][0]*3) + zoom.pos[0][0])/
            zoom.pos[0][0] :=temp
            temp := ((zoom.pos[0][1]*3) + zoom.pos[1][1])/4
            zoom.pos[1][1] := ((zoom.pos[1][1]*3) + zoom.pos[0][1])/
            zoom.pos[0][1] :=temp
            zoom := TRUE
            ZOOM.in.full.screen()
        TRUE       -- zoom.level = 1    -- moves buffer to screen (res
          s0 IS frames[Current.frame] :
          SEQ
            MOVE2D.strip(s0,0,0,screen,side*x.alarm.offset,(position
            zoom := FALSE
            zoom.level := 0
            zoom.pos := [[0,0], [x.image.size,y.image.size]]
      IF
        full.screen
          ttg3.to.host ! e.full.screen; zoom.level
        TRUE
          INT active.window:
          SEQ
            active.window:=(position*2)+side
            Update.Text.Box(dimensions,frames[Current.frame][0],window
            ttg3.to.host ! e.ok; zoom.level
```

```
c.remove.gcursor
  INT x, y, position, side:
  [2]INT dimension:
  --!! many changes made to facilitate removal of the cursor
  SEQ
    host.to.ttg3 ? position;side;dimension[0];dimension[1]
    dimension[0]:=((dimension[0]*cursor.speed)+(y.half.screen/2))
    dimension[1]:=((dimension[1]*cursor.speed)+(x.half.screen/2))
    IF
      ((dimension[1] >= 0) AND (dimension[0] >= 0)) AND
        (((dimension[1]+cursorEdge) < x.image.size)) AND (((dimens::
        SEQ
          x:= (dimension[1]+(side*x.alarm.offset))
          y:= (dimension[0]+(position*y.alarm.offset))
          --screen IS screenRam:
          restoreUnderCursor ( screen, x, y )
          ttg3.to.host ! e.ok
      TRUE
        ttg3.to.host ! e.out.of.drawing.range
c.display.gcursor  --!! many changes made to store true screen posit
  INT x,y,position, side, screen.num:
  [2]INT dimension :
  SEQ
    host.to.ttg3 ? position;side;dimension[0];dimension[1];frame
    dimension[0]:=((dimension[0]*cursor.speed)+(y.half.screen/2))
    dimension[1]:=((dimension[1]*cursor.speed)+(x.half.screen/2))
    IF
      ((dimension[1] >= 0) AND (dimension[0] >= 0)) AND
        (((dimension[1]+cursorEdge) < x.image.size)) AND (((dimensio
        screen IS screenRam:
        [128]INT header.int RETYPES frames[frame][0]:
        SEQ
          x:= (dimension[1]+(side*x.alarm.offset))
          y:= (dimension[0]+(position*y.alarm.offset))
          saveCursor ( screen, x, y )
          drawCursor ( screen, cursor, x, y )
          header.int[hi.marker.x] := dimension[1]
          header.int[hi.marker.y] := dimension[0]
          header.int[hi.marker.on] := 1
          ttg3.to.host ! e.ok
      TRUE
        ttg3.to.host ! e.out.of.drawing.range
c.set.gcursor  --!! many changes made to store true screen position
  INT x,y,position, side, screen.num:
  [2]INT dimension :
  SEQ
    host.to.ttg3 ? position;side;frame
    screen IS screenRam:
    [128]INT header.int RETYPES frames[frame][0]:
    SEQ
      IF
        (header.int[hi.marker.on])=1
          SEQ
            x:= (header.int[hi.marker.x]+(side*x.alarm.offset))
            y:= (header.int[hi.marker.y]+(position*y.alarm.offset))
            saveCursor ( screen, x, y )
            drawCursor ( screen, savedcursor, x, y )
            ttg3.to.host ! e.ok
        TRUE
          ttg3.to.host ! e.out.of.drawing.range
c.add.pending.alarm
  INT alarm.count,active.window,side:
  BOOL PENDING.DISPLAY:
  [max.alarm][22]BYTE alarm.info:
  SEQ
    host.to.ttg3 ? active.window;side;alarm.count;PENDING.DISPLAY;a.
    VAL INT position IS (remove.sign((active.window/2)-1)):
    SEQ
      IF
        PENDING.DISPLAY
          INT height:
          SEQ
            x.width:=menu.border.size
            y.height:=menu.border.size
            height := ((alarm.count*text.height.1)+(((2*y.menu.borde
            IF
              height > y.alarm.window
                height:=y.alarm.window
```

```
                    TRUE
                        SKIP
                    MOVE2D(screen,((side*x.alarm.offset)+x.pending.offset),
                            ((position*y.alarm.offset)+y.pending.offset),
                            buffer4,0,0,(x.alarm.window+shadow.width),
                            (y.alarm.window+shadow.height))
                    Draw.Menu(position,y.alarm.offset,y.pending.offset,heigh
                    Write.Menu(position,y.alarm.offset,y.pending.offset,heig
                            side,x.alarm.offset,x.pending.offset,x.alarm.
                            alarm.foreground,alarm.background,alarm.count
          TRUE
              SKIP
      ttg3.to.host ! e.ok
c.draw.menu
    INT height, menu.items,menu.width,menu.max,len, position, side,sec
    [menu.lines.char]BYTE title:
    [((menu.lines+1))][80]BYTE menu.text:
    SEQ
        host.to.ttg3 ? position;side;len::title;foreground
        host.to.ttg3 ? background;secure;menu.max
        SEQ
          host.to.ttg3 ? [menu.text FROM 0 FOR menu.max]
          y.height:=menu.border.size
          x.width:=menu.border.size
          height := ((menu.max*text.height.1)+(((2*y.menu.border)+(3*men
          IF
              height>y.menu.window
                SEQ
                    height:=y.menu.window
                    menu.items:=((height-(((2*y.menu.border)+(3*menu.border.
              TRUE
                  menu.items:=menu.max
          IF
              secure = 0
                SEQ
                    MOVE2D(screen,((side*x.alarm.offset)+x.menu.offset),
                            ((position*y.alarm.offset)+y.menu.offset),
                            buffer3,0,0,(x.menu.window+shadow.width),
                            (y.menu.window+shadow.height))
                    Draw.Menu(position,y.alarm.offset,y.menu.offset,height,s
                    Write.Menu(position,y.alarm.offset,y.menu.offset,y.menu.
                            side,x.alarm.offset,x.menu.offset,x.menu.wind
                            foreground,background,menu.max,menu.text,1,di
              TRUE
                  SEQ
                      Draw.Menu(position,y.secure.offset,y.menu.offset,height,
                      Write.Menu(position,y.secure.offset,y.menu.offset,y.menu
                            side,x.secure.offset,x.menu.offset,x.menu.win
                            background,menu.max,menu.text,1,dimensions)
        ttg3.to.host ! menu.items
c.draw.question.box
    INT position,side,direction,secure,choices,max.question.title.leng
    [menu.lines.char]BYTE title:
    SEQ
        host.to.ttg3 ? position;side;direction;choices;len::title;secure
        [max.x.choices][max.question.chars]BYTE choice.text:
        INT height,width,max.question.title.length:
        BYTE old.foreground,old.background:
        SEQ
          host.to.ttg3 ? [choice.text FROM 0 FOR choices]
          y.height:=menu.border.size
          x.width:=menu.border.size
          height:=((((direction*(choices-1)))*((y.question.spacing+1)+q.
          width:=((((remove.sign(direction-1))*(choices-1))*((x.question
          max.question.title.length:=((width/text.width.1)+(width REM te
          IF
              len>max.question.title.length
                len:=max.question.title.length
              TRUE
                  SKIP
          old.foreground:=foreground.colour
          old.background:=background.colour
          foreground.colour:=(BYTE question.foreground)
          background.colour:=(BYTE question.background)
          IF
              secure > 0
```

```
            SEQ
              MOVE2D(screen,(side*x.alarm.offset),
                  (position*y.alarm.offset),
                  buffer2,0,0,x.image.size,
                  y.image.size)
              Blank.box(screen,((position*y.alarm.offset)+y.question.o
              Draw.box(screen,(((side*x.alarm.offset)+x.question.offse
              x.width:=1
              y.height:=1
              write(dimensions,(((side*x.alarm.offset)+x.question.offs
              foreground.colour:=(BYTE question.shadow)
              background.colour:=(BYTE question.background)
              SEQ loop=0 FOR choices
                INT y.offset,len,x.offset,x.center,x.text.offset,y.tex
                SEQ
                  y.offset:=(((direction*loop)*(y.question.spacing+q.b
                  y.offset:=y.offset+((((position*y.alarm.offset)+y.qu
                  x.offset:=((((remove.sign(direction-1))*loop)*(x.que
                  x.offset:=x.offset+((((side*x.alarm.offset)+x.questi
                  x.width:=menu.border.size
                  y.height:=menu.border.size
                  IF
                    loop=0
                      Blank.box(screen,y.offset,x.offset ,q.box.width,
                    TRUE
                      Blank.box(screen,y.offset,x.offset ,q.box.width,
                  Draw.box(screen,x.offset,y.offset,q.box.width,q.box.
                  len:=SIZE(choice.text[loop])
                  IF
                    len>max.question.chars
                      SEQ
                        len:=max.question.chars
                        x.center:=0
                    TRUE
                      x.center:=(((max.question.chars-len)/2)*text.wid
                  x.width:=1
                  y.height:=1
                  x.text.offset:=(q.box.width-(text.width.1*max.questi
                  y.text.offset:=(q.box.height-text.height.1)/2
                  IF
                    loop=0
                      background.colour:=(BYTE question.foreground)
                    TRUE
                      SKIP
                  write(dimensions,(x.offset+(x.text.offset+x.center))
                  background.colour:=(BYTE question.background)
        TRUE
          SEQ
            SKIP
      foreground.colour:=old.foreground
      background.colour:=old.background
      ttg3.to.host ! e.ok
c.question.choice
  INT position,side,direction,secure,len,choices,new.choice,old.choi
  [menu.lines.char]BYTE title:
  SEQ
    host.to.ttg3 ? position;side;direction;choices;new.choice;old.ch
    [max.x.choices][max.question.chars]BYTE choice.text:
    INT height,width:
    BYTE old.foreground,old.background:
    SEQ
      host.to.ttg3 ? [choice.text FROM 0 FOR choices]
      y.height:=menu.border.size
      x.width:=menu.border.size
      height:=((((direction*(choices-1)))*((y.question.spacing+1)+q.
      width:=((((remove.sign(direction-1))*(choices-1))*((x.question
      old.foreground:=foreground.colour
      old.background:=background.colour
      foreground.colour:=(BYTE question.foreground)
      background.colour:=(BYTE question.background)
      IF
        secure > 0
          SEQ
            SEQ
              INT x.center,y.center,x.offset,y.offset,x.text.offset,
              SEQ
                foreground.colour:=(BYTE question.foreground)
```

```
                    background.colour:=(BYTE question.background)
                    y.offset:=(((direction*new.choice)*(y.question.spaci
                    y.offset:=y.offset+((((position*y.alarm.offset)+y.qu
                    x.offset:=((((remove.sign(direction-1))*new.choice)*
                    x.offset:=x.offset+((((side*x.alarm.offset)+x.questi
                    Blank.box(screen,y.offset+menu.border.size,x.offset+
                    --polygon.fill(x.offset+menu.border.size,y.offset+me
                    x.width:=1
                    y.height:=1
                    x.text.offset:=((q.box.width-(text.width.1*max.quest
                    y.text.offset:=((q.box.height-text.height.1)/2)
                    foreground.colour:=(BYTE question.shadow)
                    background.colour:=(BYTE question.foreground)
                    len:=SIZE(choice.text[new.choice])
                    IF
                      len>max.question.chars
                        SEQ
                          len:=max.question.chars
                          x.center:=0
                      TRUE
                        x.center:=(((max.question.chars-len)/2)*text.wid
                    write(dimensions,(x.offset+(x.text.offset+x.center)
                    foreground.colour:=(BYTE question.background)
                    background.colour:=(BYTE question.background)
                    y.offset:=(((direction*old.choice)*(y.question.spaci
                    y.offset:=y.offset+((((position*y.alarm.offset)+y.qu
                    x.offset:=((((remove.sign(direction-1))*old.choice)*
                    x.offset:=x.offset+((((side*x.alarm.offset)+x.questi
                    Blank.box(screen,y.offset+menu.border.size,x.offset+
                    --polygon.fill(x.offset+menu.border.size,y.offset+me
                    x.width:=1
                    y.height:=1
                    foreground.colour:=(BYTE question.shadow)
                    len:=SIZE(choice.text[old.choice])
                    IF
                      len>max.question.chars
                        SEQ
                          len:=max.question.chars
                          x.center:=0
                      TRUE
                        x.center:=(((max.question.chars-len)/2)*text.wid
                    write(dimensions,(x.offset+(x.text.offset+x.center))
              TRUE
                SEQ
                  SKIP
            foreground.colour:=old.foreground
            background.colour:=old.background
            ttg3.to.host ! e.ok
        c.remove.question
          INT secure,side,position:
          SEQ
            host.to.ttg3 ? position;side;secure
            IF
              secure>0
                MOVE2D(buffer2,0,0,screen,(side * x.alarm.offset),(position
              TRUE
                MOVE2D(buffer2,0,0,screen,(side * x.secure.offset),(position
            ttg3.to.host ! e.ok
        c.set.active
          INT active.window:
          SEQ
            host.to.ttg3 ? active.window
            IF
              active.window = 0
                set.active.inactive.zone(bottom.color, bot.color.in, top.col
              active.window = 1
                set.active.inactive.zone(bottom.color, bot.color.in, top.col
              active.window = 2
                set.active.inactive.zone(top.color, top.color.in, bottom.col
              active.window = 3
                set.active.inactive.zone(top.color, top.color.in, bot.color.
              TRUE
                SKIP
            ttg3.to.host ! e.ok
        ELSE -- TRUE
          ttg3.to.host ! e.invalid.command
      windows[curs.pos] := cursor.pos
dead := TRUE
:
```

Bubble 4

```
PROC bus(CHAN OF [8]BYTE  down.channel.out,up.channel.out,
                          down.channel.in ,up.channel.in,BYTE Board.ID,
         CHAN OF ANY time.request,time.reply,CHAN OF INT send.time.reply,
         CHAN OF BYTE send.vidlink.control.request,
         send.vidlink.off.reply,send.vidlink.on.reply,
         send.vidlink.on.request,send.vidlink.off.request,send.time.request)
#INCLUDE "protocol.inc"
#INCLUDE "bus.inc"
#INCLUDE "ttgscon.inc"
VAL [8]BYTE dummy.packet IS [BYTE 0,BYTE 0,BYTE 0,BYTE 0,BYTE 0,BYTE 0,BYTE 0,
BYTE any:
CHAN OF [8]BYTE down.channel.out.1,down.channel.out.2,down.channel.out.3,
                down.channel.out.4,down.channel.out.5,down.channel.out.6,
                down.channel.out.7,down.channel.out.8:
CHAN OF [8]BYTE up.channel.out.1,up.channel.out.2,up.channel.out.3,
                up.channel.out.4,up.channel.out.5,up.channel.out.6,
                up.channel.out.7,up.channel.out.8:
SEQ
  PAR
    WHILE TRUE
      [8]BYTE transfer.packet:
      SEQ
        ALT
          down.channel.out.1 ? transfer.packet
            down.channel.out ! transfer.packet
          down.channel.out.2 ? transfer.packet
            down.channel.out ! transfer.packet
          down.channel.out.3 ? transfer.packet
            down.channel.out ! transfer.packet
          down.channel.out.4 ? transfer.packet
            down.channel.out ! transfer.packet
          down.channel.out.5 ? transfer.packet
            down.channel.out ! transfer.packet
          down.channel.out.6 ? transfer.packet
            down.channel.out ! transfer.packet
          down.channel.out.7 ? transfer.packet
            down.channel.out ! transfer.packet
          down.channel.out.8 ? transfer.packet
            down.channel.out ! transfer.packet WHILE TRUE
      [8]BYTE transfer.packet:
      SEQ
        ALT
          up.channel.out.1   ? transfer.packet
            up.channel.out   ! transfer.packet
          up.channel.out.2   ? transfer.packet
            up.channel.out   ! transfer.packet
          up.channel.out.3   ? transfer.packet
            up.channel.out   ! transfer.packet
          up.channel.out.4   ? transfer.packet
            up.channel.out   ! transfer.packet
          up.channel.out.5   ? transfer.packet
            up.channel.out   ! transfer.packet
          up.channel.out.6   ? transfer.packet
            up.channel.out   ! transfer.packet
          up.channel.out.7   ? transfer.packet
            up.channel.out   ! transfer.packet
          up.channel.out.8   ? transfer.packet
            up.channel.out   ! transfer.packet

[8]BYTE send.packet:
    [8]BYTE pop.packet:
    BOOL ok:
    WHILE TRUE
      SEQ
        ok := FALSE
        ALT
          up.channel.in ? pop.packet
            IF
              pop.packet[Dest.board] <> Board.ID
                up.channel.out.1 ! pop.packet
              TRUE
                ok := TRUE
```

```
          down.channel.in ? pop.packet
            IF
              pop.packet[Dest.board] <> Board.ID
                down.channel.out.1 ! pop.packet
              TRUE
                ok := TRUE
      IF
        ok
          CASE pop.packet[Command]
            send..time
              INT intrnl.time,intrnl.utc.time:
              SEQ
                send.packet := dummy.packet
                time.request ! BYTE 0
                time.reply ? intrnl.time; intrnl.utc.time
                send.packet[Dest.board] := pop.packet[Source.board]
                send.packet[Source.board] := Board.ID
                send.packet[Command] := send..time..reply
                [2]INT int.send.packet RETYPES send.packet:
                SEQ
                  int.send.packet[1] := intrnl.time
                  up.channel.out.2 ! send.packet
            send..time..reply
              [2]INT int.send.packet RETYPES pop.packet:
              SEQ
                send.time.reply ! int.send.packet[1]
            send..vidlink..request
              BOOL ok:
              SEQ
                send.vidlink.control.request ! pop.packet[Param1]
                send.packet := dummy.packet
                send.packet[Dest.board] := pop.packet[Source.board]
                send.packet[Source.board] := Board.ID
                IF
                  pop.packet[Param1] = Vidlink.OFF
                    send.packet[Command] := send..vidlink..disconnect..ok
                  pop.packet[Param1] = Vidlink.ON
                    send.packet[Command] := send..vidlink..connect..ok
                  TRUE
                    STOP
                down.channel.out.6 ! send.packet
            send..vidlink..disconnect..ok
              send.vidlink.off.reply ! pop.packet[Source.board]
            send..vidlink..connect..ok
              send.vidlink.on.reply !  pop.packet[Source.board]
              NUL..command
                SKIP
              ELSE -- TRUE
                CAUSEERROR()
        TRUE
          SKIP WHILE TRUE
  [8]BYTE send.packet:
  BYTE any:
  BYTE vidlink.end:
  INT  key:
  SEQ
    send.packet := dummy.packet
    ALT
      send.time.request ? any
        SEQ
          send.packet[Dest.board] := BYTE 0
          send.packet[Source.board] := Board.ID
          send.packet[Command] := send..time
          down.channel.out.3 ! send.packet
      send.vidlink.on.request ? vidlink.end
        SEQ
          send.packet[Dest.board] := vidlink.end
          send.packet[Source.board] := Board.ID
          send.packet[Command] := send..vidlink..request
          send.packet[Param1] := Vidlink.ON
          up.channel.out.4 ! send.packet
      send.vidlink.off.request ? vidlink.end
        SEQ
          send.packet[Dest.board] := vidlink.end
          send.packet[Source.board] := Board.ID
```

```
            send.packet[Command] := send..vidlink..request
            send.packet[Param1] := Vidlink.OFF
            up.channel.out.5 ! send.packet
:
```

Bubble 5

```
PROC host.clock(CHAN OF BYTE time.request,CHAN OF ANY time.reply,
         CHAN OF ANY clock.request,clock.reply)
  SEQ
    --==>> occam clock <<==--
    INT intrnl.time,intrnl.utc.time:
    INT start.time,intrnl.time.frac:
    INT time.now:
    INT any2:
    TIMER clock:
    SEQ
      time.request ! (BYTE 0)
      time.reply ? intrnl.time ; intrnl.utc.time
      clock ? start.time
      intrnl.time.frac := 0
      WHILE TRUE
        SEQ
          clock.request ? any2
          clock ? time.now
          intrnl.time.frac := intrnl.time.frac + (time.now MINUS start.time)
          WHILE (intrnl.time.frac > 15625)
            SEQ
              intrnl.time.frac := intrnl.time.frac - 15625
              intrnl.time := intrnl.time + 1
          clock.reply ! intrnl.time; intrnl.time.frac
          clock ? start.time
:
```

Bubble 6

```
PROC vidlink(CHAN OF BYTE send.vidlink.on.reply,send.vidlink.off.reply,
             send.vidlink.on.request,send.vidlink.off.request,
             send.vidlink.control.request,
             vidlink.control.state.request,vidlink.control.state.reply,
             CHAN OF ANY alarm.ok,alarm.control)
  #INCLUDE "bus.inc"
  INT vidlink.connection,last.connection:
  BYTE new.zone,last.zone:
  TIMER clock:
  INT time:
  SEQ
    vidlink.connection := 1
    send.vidlink.on.request  ! BYTE vidlink.connection
    send.vidlink.on.reply ?  new.zone
    WHILE TRUE
      INT alarm.zone,alarm:
      SEQ
        alarm.control ? alarm.zone
        IF
          alarm.zone <> vidlink.connection
            SEQ
              send.vidlink.off.request ! BYTE vidlink.connection
              last.connection := vidlink.connection
              vidlink.connection := alarm.zone
              send.vidlink.on.request  ! BYTE vidlink.connection
              PAR
                SEQ
                  send.vidlink.off.reply ? last.zone
                  IF
                    (BYTE last.connection) = last.zone
                      SKIP
                    TRUE
                      CAUSEERROR()
```

```
              SEQ
                send.vidlink.on.reply ?  new.zone
                IF
                  (BYTE vidlink.connection) = new.zone
                    SKIP
                  TRUE
                    CAUSEERROR()
            clock ? time
            clock ? AFTER time PLUS 1562
         TRUE
           SKIP
      alarm.ok ! 0
:
```

A.3. I/O BOARD - FIGURE 11

Bubble 1

```
PROC comms(CHAN OF [2]BYTE to.host, from.host, to.module2, from.module2,
          CHAN OF BYTE to.comms1, from.comms1, to.comms4, from.comms4)
  [2]BYTE return.val:
  BYTE rxd:
  WHILE TRUE
    ALT
      from.comms1 ? rxd    -- REC2 PORT
        SEQ
          return.val[0]:= 1 (BYTE)
          return.val[1]:= rxd
          to.host ! return.val from.comms4 ? rxd -- BAD PORT?? LO
        SEQ
          return.val[0]:= 4 (BYTE)
          return.val[1]:= rxd
          to.host ! return.val from.module2 ? return.val
        SEQ
          to.host ! return.val from.host ? return.val
        to.module2 ! return.val
:

PROC comms2(CHAN OF [2]BYTE to.module2, from.module2,
            CHAN OF BYTE to.comms2, from.comms2,
                        to.comms3, from.comms3,
                        to.printer, from.printer)
  [2]BYTE return.val:
  BYTE rxd:
  WHILE TRUE
    ALT
      from.comms2 ? rxd -- REC1 PORT
        SEQ
          return.val[0]:= 2 (BYTE)
          return.val[1]:= rxd
          from.module2 ! return.val from.comms3 ? rxd
        SEQ
          return.val[0]:= 3 (BYTE)   -- BAD PORT ?? LO
          return.val[1]:= rxd
          from.module2 ! return.val to.module2 ? return.val
        SEQ
          to.printer ! return.val[1]
:
```

```
#INCLUDE "states.inc"

PROC driver (CHAN OF PACKET to.states1, from.states1,
                          to.states2, from.states2,
                          to.states3, from.states3,
             CHAN OF PACKET to.recognizer1, to.recognizer2, to.recognizer3,
             CHAN OF BYTE from.host1, from.host2, from.host3,
             CHAN OF [2]BYTE data.from.rs232, data.to.rs232,
             CHAN OF BYTE to.alarm.handler, CHAN OF [512]BYTE alarm.in,
             CHAN OF [513]BYTE query.from.tss, query.to.tss)

VAL printer    IS   BYTE #05:  -- Printer device
  VAL function   IS   BYTE #46:  -- F
  VAL commentf   IS   BYTE #03:  -- ^C, Function BYTE #
  VAL commentty  IS   BYTE #00:  -- NUL, Function type BYTE #
  VAL commentch  IS   BYTE #50:  -- # Chars in comment
  VAL commenttp  IS   BYTE #01:  -- Code to indicate we are now sending comment st INT err.len :
  [512]BYTE alarm.data:
  BOOL fatal.error, printing:
  CHAN OF [2]BYTE from.char.buffer:
  CHAN OF BYTE from.kybd.buffer, data.from.kybd, to.kybd.handler:

--#USE "hostio.lib"

#INCLUDE "driveinit.occ" -- READ FROM FILES -N- SEND STATE DATA TO STATES.OCC

PROC send(VAL [15]BYTE data)
    INT ptr:
    [2]BYTE temp:
    SEQ
      temp[0]:= BYTE printer
      temp[1]:= 32 (BYTE)
      SEQ ptr = 0 FOR 65
        data.to.rs232 ! temp -- PAD
      SEQ ptr = 0 FOR 15
        SEQ
          temp[1]:= data[ptr]
          data.to.rs232 ! temp
  :

-->> MAIN LOOP, EVERYTHING GOES THROUGH HERE EVENTUALLY <<--

PROC run()
    BOOL running :
    INT  port.num, alarm.num, dummy :
    BYTE key, result:
    [513]BYTE query:
    [2]BYTE str :
    CHAN OF [2]BYTE rsdata:
    CHAN OF [513]BYTE handlequery:

PAR
      BYTE key:
      [513]BYTE temp:
      [80]BYTE comment:
      [15]BYTE data:
      [2]BYTE str:
      INT packets:
      INT command,temp1,temp2:
      WHILE TRUE
        SEQ
          handlequery ? query
          command := INT query[0]
          --so.write.string.nl(fs,ts,"(QUERY)") -- DEBUG
          IF
            (command = 1)
              SEQ
                to.alarm.handler ! 13 (BYTE) -- REQUEST ALARM
                alarm.in ? alarm.data
                --so.write.string.nl(fs,ts,alarm.data) -- DEBUG
                [temp FROM 1 FOR 512] := alarm.data
                temp[0]:= BYTE command
```

```
            query.to.tss ! temp
      TRUE
        SKIP
    IF
      (command = 2)
        SEQ
          to.kybd.handler ! 13 (BYTE) -- REQ A key
          from.kybd.buffer ? key
          --so.write.char(fs,ts,key) -- DEBUG
          temp[0]:= BYTE command
          temp[1]:= key
          query.to.tss ! temp
      TRUE
        SKIP
    IF
      (command = 3) -- GAAAK!  PRINT
        IF
          (printing = FALSE)
            SEQ
              temp := query -- 1'st packet, this is the header
              packets:= 0
              str[0]:= printer
              SEQ i=0 FOR 80
                comment[i]:= 32 (BYTE)
              str[1]:= BYTE printer
              [comment FROM 0 FOR 42] := "BG&E    CALVERT CLIFFS NUCLEAR P str[1]:= #7F (BYTE)
              data.to.rs232 ! str -- Supposedly clears print buffer
              str[1]:= #1B (BYTE)
              data.to.rs232 ! str
              str[1]:= function
              data.to.rs232 ! str -- F
              str[1]:= commentf
              data.to.rs232 ! str -- ^C, Function #
              str[1]:= commentty
              data.to.rs232 ! str -- NUL, Function Type #
              str[1]:= commentch
              data.to.rs232 ! str -- # of chars
              SEQ i=0 FOR 79
                SEQ
                  str[1]:= BYTE comment[i]
                  data.to.rs232 ! str
              str[1]:= #1B (BYTE)
              data.to.rs232 ! str
              str[1]:= function
              data.to.rs232 ! str
              str[1]:= commentf
              data.to.rs232 ! str
              str[1]:= commenttp
              data.to.rs232 ! str -- Do side text str[1]:= 13 (BYTE)
              data.to.rs232 ! str data := "ZONE # 76       "
              --ata FROM 6 FOR 8] := [temp FROM 316 FOR 8]
              send(data)

data := "CAMERA # 22     "
              --[data FROM 9 FOR 5] := [temp FROM    FOR  ]
              send(data)

data := "(Side Gate     )"
              send(data)

data := "                "
              send(data)

data := "TIME: 09:25:43 "
              --[data FROM 6 FOR 8] := [temp FROM 256 FOR 8]
              send(data)

data := "DATE:  7/30/91 "
              --[data FROM 6 FOR 8] := [temp FROM 265 FOR 8]
              send(data)
```

```
        data := "              "
        send(data)

data := "ZOOM LEVEL: 1x "
        send(data)

data := "              "
        send(data)

data := "CAUSE:         "
        send(data)

data := "Suspicious     "
        --data := [temp FROM 276 FOR 15]
        send(data)

data := "Persons        "
        --data := [temp FROM 291 FOR 15]
        send(data)

data := "              "
        send(data)

str[1]:= #1B (BYTE) -- esc
        data.to.rs232 ! str str[1]:= 'W' (BYTE)   -- vcpgraph1
        data.to.rs232 ! str
        str[1]:= #00 (BYTE)   -- vcpgraph2
        data.to.rs232 ! str   --{ ESC Code [ESC+W+00]
        str[1]:= #00 (BYTE)   -- vcpxst1
        data.to.rs232 ! str
        str[1]:= #00 (BYTE)   -- vcpxst2
        data.to.rs232 ! str   --{ X Start
        str[1]:= #00 (BYTE)   -- vcpyst1
        data.to.rs232 ! str
        str[1]:= #00 (BYTE)   -- vcpyst2
        data.to.rs232 ! str   --{ Y Start
        str[1]:= #01 (BYTE)   -- vcpxen1
        data.to.rs232 ! str
        str[1]:= #FF (BYTE)   -- vcpxen2
        data.to.rs232 ! str   --{ X End
        str[1]:= #01 (BYTE)   -- vcpyen1
        data.to.rs232 ! str
        str[1]:= #DF (BYTE)   -- vcpyen2
        data.to.rs232 ! str   --{ Y End
        printing:= TRUE
        temp[0]:= BYTE 3
        query.to.tss ! temp
    (printing=TRUE)
      SEQ
        temp:= query
        str[0] := BYTE 5
        SEQ i= 0 FOR 256
          SEQ
            temp1:= INT temp[(i*2)+1]
            temp2:= INT temp[(i*2)+2]
            temp1 := temp1 >> 4
            temp2 := temp2 /\ #000000F0
            temp[i+1] := BYTE ((temp1 \/ temp2)/\ #00000FF)
            str[1]:= temp[i+1]
            data.to.rs232 ! str
        packets:= packets + 1
        IF
          packets = 481
            printing:= FALSE
          TRUE
            SEQ
              temp[0] := BYTE 3
              query.to.tss ! temp
    TRUE
      SKIP
(command = 4) -- CHECK
  SEQ
    --so.write.string.nl(fs,ts,"(CHECK REQ)")
    temp[0]:= BYTE 4 -- Reply with command #
    query.to.tss ! temp
```

```
        TRUE
          SKIP

-->> All RS232 stuff gets routed through here <<--
WHILE TRUE
  SEQ
    rsdata ? str
    IF
      str[0] = (BYTE 2) -- FROM PORT #2?
        IF -- YES
          str[1] <> (BYTE #07) -- ISSIT A BEL CHARACTER? (ASCII 07)?
            SEQ
              --so.write.char(fs,ts,str[1])
              from.host1 ! str[1] -- NOPE, SEND IT TO REC1
          TRUE
            SKIP
      str[0] = (BYTE 1) -- FROM PORT #1?
        IF -- YUP, SURE IS
          str[1] <> (BYTE #07) -- ISSIT A BEL CHARACTER?
            SEQ
              --so.write.char(fs,ts,str[1])
              from.host2 ! str[1] -- NOPE, SEND IT TO REC2
          TRUE
            SKIP
      str[0] = (BYTE 3) -- YOU SHOULD GET THE IDEA BY NOW, ISSIT FROM PORT
        IF
          str[1] <> (BYTE #07)
            SEQ
              from.host3 ! str[1] -- SEND TO REC3
          TRUE
            SKIP
      str[0] = (BYTE 4 ) -- TSS Keyboard
        IF
          str[1] <> (BYTE #07)
            SEQ
              --data[0]:= BYTE 4
              --data[1]:= BYTE 4
              --[data FROM 2 FOR 4]:= "TEST"
              --query.to.tss ! data
              data.from.kybd ! str[1]
          TRUE
            SKIP
      TRUE
        CAUSEERROR() -- INVALID SOURCE NUMBER -->>  MAIN  <<--
SEQ
  --query[0]:= BYTE 4 -- SEND CHECK REPLY (DEBUG)
  --query.to.tss ! query
  WHILE TRUE
    ALT
      query.from.tss ? query
        handlequery ! query from.char.buffer ? str
        rsdata ! str

--> BUFFER EVERYTHING COMMING FROM RS232 <--

[512][2]BYTE data.buffer:
INT tptr, hptr:
[2]BYTE hold:

SEQ       -- A Cheesy 512 byte RS232 buffer
  tptr:=0
  hptr:=0
  PAR
    WHILE TRUE
      SEQ
        data.from.rs232 ? data.buffer[hptr]   -- PUT STUFF IN
        hptr := hptr +1
        IF
          hptr = 512
            hptr:= 0
          TRUE
            SKIP
```

```
              IF
                hptr = tptr
                  CAUSEERROR()   -- BIG ERROR, BUFFER FULL, DIE, STOP, DO NOT PA:
                TRUE
                  SKIP
        WHILE TRUE
          IF
            tptr <> hptr
              SEQ
                from.char.buffer ! data.buffer[tptr] -- YANK IT OUT :)
                tptr:= tptr+1
                IF
                  tptr = 512
                    tptr:= 0
                  TRUE
                    SKIP
            TRUE
              SKIP

--> BUFFER KEYBOARD INPUT <--

[64]BYTE data.buffer:
INT tptr, hptr:
BYTE hold:

SEQ
  tptr:=0
  hptr:=0
  PAR
    WHILE TRUE
      SEQ
        data.from.kybd ? data.buffer[hptr]   -- PUT STUFF IN
        --CAUSEERROR()
        hptr := hptr +1
        IF
          hptr = 64
            hptr:= 0
          TRUE
            SKIP
        IF
          hptr = tptr
            CAUSEERROR()   -- BIG ERROR, BUFFER FULL, DIE, STOP, DO NOT PAS
          TRUE
            SKIP
    WHILE TRUE
      SEQ
        to.kybd.handler ? hold -- DELAY TILL REQUEST
        IF
          (tptr <> hptr)
            SEQ
              from.kybd.buffer ! data.buffer[tptr] -- YANK IT OUT :)
              tptr:= tptr+1
              IF
                tptr = 64
                  tptr:= 0
                TRUE
                  SKIP
          TRUE
            from.kybd.buffer ! 0 (BYTE) -- Send NUL cuz BUFFER EMPTY..

:
BYTE key, result :
SEQ
  fatal.error := FALSE
  printing:= FALSE
  read.strings.from.file1() -- TAKE A WILD GUESS
  read.strings.from.file2()
  read.strings.from.file3()
  IF
    NOT fatal.error
      SEQ
        init.recognizer1()
        init.recognizer2()
        init.recognizer3()
        --so.write.nl(fs, ts)
        --so.write.string.nl(fs, ts, "RS-232 Data")
```

```
        --so.write.string.nl(fs,ts,  "------------")
          run()
      TRUE
        SKIP
    --so.exit(fs, ts, sps.success)
    -- THATS ALL FOLKS!
:
```

Bubble 2

```
PROC cent.out (CHAN OF BYTE FromJohn, ToJohn)
  -- placement
  VAL linkout2 IS 2 :
  VAL linkin2  IS 6 :
  CHAN OF ANY ToDiscEng   :
  CHAN OF BYTE FromDiscEng :
  PLACE ToDiscEng    AT linkout2 :
  PLACE FromDiscEng AT linkin2  :

-- vals
  -- system vals
  VAL rx.data.size IS 256 :  -- input buffer size (bytes = chars)

VAL ascii.mask IS #7F :  -- 7 bit ascii
  -- VAL ascii.mask IS #FF :  -- 8 bit ascii -- pia vals
  -- this must be a bit which is set in both cmd0.ReadReg and cmd0.WriteReg, viz
  VAL HardTask.mask            IS                   #80 :

VAL task.PiaAData           IS HardTask.mask \/ #00 :
  VAL task.PiaADirection      IS HardTask.mask \/ #01 :
  VAL task.PiaAChange         IS HardTask.mask \/ #02 :
  VAL task.PiaAPad            IS HardTask.mask \/ #03 :
  VAL task.PiaBData           IS HardTask.mask \/ #04 :
  VAL task.PiaBDirection      IS HardTask.mask \/ #05 :
  VAL task.PiaBChange         IS HardTask.mask \/ #06 :
  VAL task.PiaBPad            IS HardTask.mask \/ #07 :

-- command values
  VAL  cmd0.ReadReg         IS #C0 :
  VAL  cmd0.WriteReg        IS #80 :

-- port values
  VAL notACK     IS #01 :
  VAL PaperOut   IS #02 :
  VAL Busy       IS #04 :

VAL Selected   IS #10 :
  VAL notFault   IS #20 :
  VAL notPrime   IS #40 :
  VAL strobe     IS #80 :

VAL Off IS  0 :
  VAL On  IS  1 :
  [4]INT Latch :
  PLACE Latch AT #3FF8 :
  BOOL roll.over   :
  BYTE char:
  INT input.pointer, output.pointer :
  [rx.data.size] BYTE rx.data.buffer :
  TIMER clock :
  INT time :

PROC get.mask.position( VAL INT Mask, INT Position )
```

```
    INT TempMask :
    SEQ
      TempMask := -Mask
      Position := 0
      WHILE ((TempMask /\ #01) = 1)
        SEQ
          TempMask := TempMask >> 1
          Position := Position + 1
:
PROC read.task( VAL INT Task, INT Value )
  BYTE ByteValue :
  SEQ
    -- write ones to non-existent register to avoid PIA glitch bug
    ToDiscEng ! BYTE (cmd0.WriteReg \/ #3F)
    ToDiscEng ! BYTE #FF
    -- HardTask.mask bit is set in cmd0.ReadReg so we needn't mask out
    ToDiscEng   ! BYTE (cmd0.ReadReg \/ Task)
    FromDiscEng ? ByteValue
    Value := INT ByteValue
:
PROC write.task( VAL INT Task, Value )
  SEQ
    -- HardTask.mask bit is set in cmd0.WriteReg so we needn't mask out
    ToDiscEng ! BYTE (cmd0.WriteReg \/ Task)
    ToDiscEng ! BYTE Value
:
PROC write.task.masked( VAL INT Task, Mask, Value )
  INT Position, OldValue :
  SEQ
    read.task( Task, OldValue )
    get.mask.position( Mask, Position )
    write.task( Task, ((Value << Position) /\ Mask) \/ (OldValue /\ (-Mask)) )
:

PROC write.task.masked.inverted( VAL INT Task, Mask, Value )
  write.task.masked( Task, Mask, -Value )
:
SEQ
  VAL set.pia.as.output IS #FF :
  VAL set.pia.as.input  IS  0 :
  VAL output IS   1 :
  VAL input  IS   0 :
  VAL Off    IS   0 :
  VAL On     IS   1 :
  SEQ
    write.task (task.PiaADirection, set.pia.as.output)
    write.task (task.PiaAChange, 0)
    Latch[2] := 1
    Latch[1] := 1
    Latch[0] := 0
    Latch[3] := 1
    write.task.masked (task.PiaBDirection, strobe,   output)
    write.task.masked (task.PiaBDirection, notPrime, output)
    write.task.masked (task.PiaBDirection, notACK,   input)
    write.task.masked (task.PiaBDirection, Busy,     input)
    write.task.masked (task.PiaBDirection, PaperOut, input)
    write.task.masked (task.PiaBDirection, Selected, input)
    write.task.masked (task.PiaBDirection, notFault, input)
    --ToJohn ! 65 (BYTE)
    write.task (task.PiaBChange, 0)
    write.task.masked.inverted (task.PiaBData, notPrime, Off )
    write.task.masked.inverted (task.PiaBData, strobe,   Off )
    input.pointer, output.pointer := 0, 0
    roll.over         := FALSE
VAL strobe.length   IS    10 :    -- 1000 -- 100 -- 10 --us
PRI PAR
  -- test input from host & export to parallel o/p
  WHILE TRUE
    -- variables
    INT Byte :

SEQ
      -- output character from buffer
      IF
        ((output.pointer < input.pointer) AND (roll.over = FALSE)) OR
          ((input.pointer <= output.pointer) AND (roll.over = TRUE))
          -- output char to centronics
```

```
        INT control :
        BOOL busy, Ack :
        SEQ
          read.task (task.PiaBPad, control)
          --  set busy  TRUE
          busy := BOOL ((control /\ Busy) <> 0)

--  set ack
          Ack := BOOL ((control /\ notACK) = 0)

IF
            (NOT busy) AND (NOT Ack)
              SEQ
                write.task(task.PiaAData, INT(rx.data.buffer[output.pointe
                --  strobe set
                write.task.masked.inverted (task.PiaBData, strobe, On )

clock ? time
                --  adjust output pointer
                output.pointer := output.pointer + 1
                IF
                  output.pointer = rx.data.size
                    SEQ
                      output.pointer := 0
                      roll.over      := FALSE
                  TRUE
                    SKIP clock ? AFTER time PLUS strobe.length
                --  strobe reset
                write.task.masked.inverted (task.PiaBData, strobe, Off )

--  look for ack comming back
                INT change.ack :
                SEQ
                  change.ack := 0
                  WHILE (change.ack /\ notACK) = 0
                    read.task (task.PiaBChange, change.ack)
                  write.task (task.PiaBChange, 0)

TRUE
              SKIP

TRUE
          SKIP

--  get char and place in buffer
  SEQ
    IF
      ((input.pointer = output.pointer) AND (roll.over = TRUE)) OR
          ((input.pointer = rx.data.size) AND (output.pointer = 0))
        SKIP
      TRUE
        PRI ALT
          FromJohn ? char                              -- get character
            --  place character into buffer
            SEQ
              rx.data.buffer[input.pointer] := char
              input.pointer := input.pointer + 1
              IF
                input.pointer = rx.data.size
                  SEQ
                    input.pointer := 0
                    roll.over     := TRUE
                TRUE
                  SKIP

TRUE & SKIP
            SKIP

SKIP
```

```
PROC print(CHAN OF [246784]BYTE data.in, CHAN OF BYTE out.to.vcp)
  [246784]BYTE vcpdata:
  [80]BYTE comment:
  [15]BYTE data :
  BYTE temp1, temp2:

PROC send(VAL [15]BYTE data, CHAN OF ANY buffer.to.t2)
    INT ptr:
    SEQ
      SEQ ptr = 0 FOR 65
        buffer.to.t2 ! 32 (BYTE)
      SEQ ptr = 0 FOR 15
        buffer.to.t2 ! BYTE data[ptr]
  :

running:= TRUE
WHILE running
  SEQ
    data.in ? vcpdata
    SEQ i=0 FOR 80
      comment[i]:= 32 (BYTE)
    [comment FROM 0 FOR 23] := "BG&E   CALVERT CLIFF*'S"
    data.to.rs232 ! #18 (BYTE)-- Clear Buffer
    data.to.rs232 ! #1B (BYTE)-- ESC
    data.to.rs232 ! #46 (BYTE)-- F
    data.to.rs232 ! #03 (BYTE)-- ^C, Function #
    data.to.rs232 ! #00 (BYTE)-- NUL, Function Type #
    data.to.rs232 ! #50 (BYTE)-- # of chars
    SEQ i=0 FOR 79
      data.to.rs232 ! BYTE comment[i]
    data.to.rs232 ! #1B (BYTE)
    data.to.rs232 ! 'F' (BYTE)
    data.to.rs232 ! #03 (BYTE)
    data.to.rs232 ! #01 (BYTE)
    data.to.rs232 ! 13 (BYTE)
    data := "ZONE # ????????"
    [data FROM 6 FOR 8] := [vcpdata FROM 316 FOR 8]
    send(data,data.to.rs232)
    data := "(??????????????)"
    send(data,data.to.rs232)
    data := "                "
    send(data,data.to.rs232)
    data := "CAMERA # ??????"
    --[data FROM 9 FOR 5] := [vcpdata FROM   FOR  ]
    send(data,data.to.rs232)
    data := "                "
    send(data,data.to.rs232)
    data := "TIME:          "
    [data FROM 6 FOR 8] := [vcpdata FROM 256 FOR 8]
    send(data,data.to.rs232)
    data := "DATE:          "
    [data FROM 6 FOR 8] := [vcpdata FROM 265 FOR 8]
    send(data,data.to.rs232)
    data := "               "
    send(data,data.to.rs232)
    data := "CAUSE:         "
    send(data,data.to.rs232)
    data := "               "
    data := [data FROM 276 FOR 15]
    send(data,data.to.rs232)
    data := "               "
    data := [vcpdata FROM 291 FOR 15]
    send(data,data.to.rs232)
    data.to.rs232 ! #1B (BYTE)
    data.to.rs232 ! 'W' (BYTE)
    data.to.rs232 ! #00 (BYTE) --{ ESC Code [ESC+W+00]
    data.to.rs232 ! #00 (BYTE)
    data.to.rs232 ! #00 (BYTE) --{ X Start
    data.to.rs232 ! #00 (BYTE)
    data.to.rs232 ! #00 (BYTE) --{ Y Start
    data.to.rs232 ! #01 (BYTE)
    data.to.rs232 ! #FF (BYTE) --{ X End
    data.to.rs232 ! #01 (BYTE)
    data.to.rs232 ! #DF (BYTE) --{ Y End
    SEQ i= 512 FOR length/2
```

```
      SEQ
        temp1:= INT vcpdata[i*2]
        temp2:= INT vcpdata[(i*2)+1]
        temp1 := temp1 >> 4
        temp2 := temp2 /\ #000000F0
        string2[i] := BYTE ((temp1 \/ temp2)/\ #00000FF)
        out.to.vcp ! vcpdata[i]
   :
```

Bubble 3

```
PROC bus(CHAN OF [8]BYTE  down.channel.out,up.channel.out,
                          down.channel.in ,up.channel.in,BYTE Board.ID,
         CHAN OF ANY time.request,time.reply,CHAN OF INT send.time.reply,
         CHAN OF BYTE send.vidlink.control.request,
         send.vidlink.off.reply,send.vidlink.on.reply,
         send.vidlink.on.request,send.vidlink.off.request,send.time.request)
#INCLUDE "protocol.inc"
#INCLUDE "bus.inc"
#INCLUDE "ttgscon.inc"
VAL [8]BYTE dummy.packet IS [BYTE 0,BYTE 0,BYTE 0,BYTE 0,BYTE 0,BYTE 0,BYTE 0,
BYTE any:
CHAN OF [8]BYTE down.channel.out.1,down.channel.out.2,down.channel.out.3,
                down.channel.out.4,down.channel.out.5,down.channel.out.6,
                down.channel.out.7,down.channel.out.8:
CHAN OF [8]BYTE up.channel.out.1,up.channel.out.2,up.channel.out.3,
                up.channel.out.4,up.channel.out.5,up.channel.out.6,
                up.channel.out.7,up.channel.out.8:
SEQ
  PAR
    WHILE TRUE
      [8]BYTE transfer.packet:
      SEQ
        ALT
          down.channel.out.1 ? transfer.packet
            down.channel.out ! transfer.packet
          down.channel.out.2 ? transfer.packet
            down.channel.out ! transfer.packet
          down.channel.out.3 ? transfer.packet
            down.channel.out ! transfer.packet
          down.channel.out.4 ? transfer.packet
            down.channel.out ! transfer.packet
          down.channel.out.5 ? transfer.packet
            down.channel.out ! transfer.packet
          down.channel.out.6 ? transfer.packet
            down.channel.out ! transfer.packet
          down.channel.out.7 ? transfer.packet
            down.channel.out ! transfer.packet
          down.channel.out.8 ? transfer.packet
            down.channel.out ! transfer.packet WHILE TRUE
      [8]BYTE transfer.packet:
      SEQ
        ALT
          up.channel.out.1   ? transfer.packet
            up.channel.out   ! transfer.packet
          up.channel.out.2   ? transfer.packet
            up.channel.out   ! transfer.packet
          up.channel.out.3   ? transfer.packet
            up.channel.out   ! transfer.packet
          up.channel.out.4   ? transfer.packet
            up.channel.out   ! transfer.packet
          up.channel.out.5   ? transfer.packet
            up.channel.out   ! transfer.packet
          up.channel.out.6   ? transfer.packet
            up.channel.out   ! transfer.packet
          up.channel.out.7   ? transfer.packet
            up.channel.out   ! transfer.packet
          up.channel.out.8   ? transfer.packet
            up.channel.out   ! transfer.packet
```

```
[8]BYTE send.packet:
[8]BYTE pop.packet:
BOOL ok:
WHILE TRUE
  SEQ
    ok := FALSE
    ALT
      up.channel.in ? pop.packet
        IF
          pop.packet[Dest.board] <> Board.ID
            up.channel.out.1 ! pop.packet
          TRUE
            ok := TRUE
      down.channel.in ? pop.packet
        IF
          pop.packet[Dest.board] <> Board.ID
            down.channel.out.1 ! pop.packet
          TRUE
            ok := TRUE
    IF
      ok
        CASE pop.packet[Command]
          send..time
            INT intrnl.time,intrnl.utc.time:
            SEQ
              send.packet := dummy.packet
              time.request ! BYTE 0
              time.reply ? intrnl.time; intrnl.utc.time
              send.packet[Dest.board] := pop.packet[Source.board]
              send.packet[Source.board] := Board.ID
              send.packet[Command] := send..time..reply
              [2]INT int.send.packet RETYPES send.packet:
              SEQ
                int.send.packet[1] := intrnl.time
                up.channel.out.2 ! send.packet
          send..time..reply
            [2]INT int.send.packet RETYPES pop.packet:
            SEQ
              send.time.reply ! int.send.packet[1]
          send..vidlink..request
            BOOL ok:
            SEQ
              send.vidlink.control.request ! pop.packet[Param1]
              send.packet := dummy.packet
              send.packet[Dest.board] := pop.packet[Source.board]
              send.packet[Source.board] := Board.ID
              IF
                pop.packet[Param1] = Vidlink.OFF
                  send.packet[Command] := send..vidlink..disconnect..ok
                pop.packet[Param1] = Vidlink.ON
                  send.packet[Command] := send..vidlink..connect..ok
                TRUE
                  STOP
              down.channel.out.6 ! send.packet
          send..vidlink..disconnect..ok
            send.vidlink.off.reply ! pop.packet[Source.board]
          send..vidlink..connect..ok
            send.vidlink.on.reply !  pop.packet[Source.board]
          NUL..command
            SKIP
          ELSE -- TRUE
            CAUSEERROR()
      TRUE
        SKIP WHILE TRUE
  [8]BYTE send.packet:
  BYTE any:
  BYTE vidlink.end:
  INT  key:
  SEQ
    send.packet := dummy.packet
    ALT
      send.time.request ? any
        SEQ
          send.packet[Dest.board] := BYTE 0
          send.packet[Source.board] := Board.ID
```

```
            send.packet[Command] := send..time
            down.channel.out.3 ! send.packet
        send.vidlink.on.request ? vidlink.end
          SEQ
            send.packet[Dest.board] := vidlink.end
            send.packet[Source.board] := Board.ID
            send.packet[Command] := send..vidlink..request
            send.packet[Param1] := Vidlink.ON
            up.channel.out.4 ! send.packet
        send.vidlink.off.request ? vidlink.end
          SEQ
            send.packet[Dest.board] := vidlink.end
            send.packet[Source.board] := Board.ID
            send.packet[Command] := send..vidlink..request
            send.packet[Param1] := Vidlink.OFF
            up.channel.out.5 ! send.packet
:
```

Bubble 5

```
#INCLUDE "states.inc"
#INCLUDE "hostio.inc"
PROC alarm.handler(CHAN OF [512]BYTE alarm1.in, alarm2.in, alarm3.in,
                   CHAN OF BYTE query.in, CHAN OF [512]BYTE alarm.in,
                   CHAN OF SP fs,ts)
  #USE "hostio.lib"

BOOL running :
  INT alarmin.ptr, alarmout.ptr:    -- POINTERS FOR ALARM BUFFER
  BYTE query, last.cam:             -- ASK FOR ALARM FROM BUFFER, TEMPORARY CAMERA
  [512]BYTE alarm.data:             -- RECOGNIZED STRING FROM RECOGNIZER CODE
  [20][512]BYTE alarm.queue:        -- BUFFER ARRAY
  CHAN OF [512]BYTE queue:          -- USED FOR SEND ALARM HERE TO ENQUEUE
  VAL max.buffer IS 20:             -- SIZE OF ALARM BUFFER, 20 ENTRIES 512 BYTES PROC main(VAL INT port.num)
    INT alarm.number:
    SEQ
      alarm.data[510]:= BYTE port.num  -- PLACE PORT # IN ELEMENT 510
      alarm.number:= INT alarm.data[511]
      IF
        (port.num = 2) OR (port.num = 1)
          queue ! alarm.data
        TRUE
          SKIP
      IF
        (port.num = 3) -- ISSIT FROM PORT #3 (SWITCHER)?
          IF
            (last.cam <> alarm.data[3]) -- KEEP FROM SETTING ALARMS ON REPEATED
              SEQ
                last.cam := alarm.data[3] -- KEEP TRACK OF LAST MESSAGE
                queue ! alarm.data  -- ENQUEUE IT
            TRUE
              SKIP
        TRUE
          SKIP
  :
  PAR
    SEQ
      running := TRUE
      WHILE running
        ALT
          alarm1.in ? alarm.data  -- GET DATA FROM RECOGNIZER1
            main(INT 1) -- SEND UPSTAIRS WITH PORT #
          alarm2.in ? alarm.data  -- GET DATA FROM RECOGNIZER2
            main(INT 2)
          alarm3.in ? alarm.data  -- GET DATA FROM RECOGNIZER3
            main(INT 3)
    SEQ
      alarmin.ptr :=0 -- ENQUEUE POINTER
      alarmout.ptr :=0 -- DEQUEUE POINTER
      running := TRUE
```

```
        WHILE running
          ALT
            query.in ? query    -- SOMEONE ASKED US TO DEQUEUE ONE
              IF
                alarmout.ptr <> alarmin.ptr  -- ARE THERE ANY IN QUEUE?
                  SEQ -- YUP
                    alarm.in ! alarm.queue[alarmout.ptr] -- SEND 'EM ONE
                    alarmout.ptr := alarmout.ptr +1 -- FIX POINTERS
                    IF
                      alarmout.ptr > max.buffer -- REALLY FIX POINTERS
                        alarmout.ptr := 0
                      TRUE
                        SKIP
                TRUE
                  SEQ -- NOPE, NOTHING TO SEND
                    alarm.data[0]:= BYTE 0 -- TELL 'EM ABOUT IT
                    alarm.in ! alarm.data -- SHIP IT OFF
            queue ? alarm.queue[alarmin.ptr] -- SOMEONE WANTS TO PUT SOMETHING IN
              SEQ
                alarmin.ptr := alarmin.ptr +1 -- FIX POINTER
                IF
                  alarmin.ptr > max.buffer -- REALLY FIX POINTER
                    alarmin.ptr := 0
                  TRUE
                    SKIP
                IF
                  alarmin.ptr = alarmout.ptr -- OOPS, BUFFER FULL
                    CAUSEERROR() -- END, DIE, STOP, HALT, DO NOT PASS GO!
                  TRUE
                    SKIP
:
```

Bubble 6

```
#INCLUDE "states.inc"

PROC make.states(CHAN OF PACKET from.driver, CHAN OF PACKET to.driver)

[max.branch][4]INT branch :      -- contains state, letter, next, alarm
  [max.state][2]INT state.data :   -- contains message.pointer, string length
  [max.message][max.string]BYTE messages :
  [max.message]INT message.len :   -- contains the length of each message INT state.count :                -- points at next state to add
  INT branch.ndx :                 -- points at next branch entry
  INT message.count :              -- points at next entry to message
  INT good.states, good.branches, good.messages :   -- save for error handling
  BOOL running :
  BOOL error.set :

INT FUNCTION get.action(VAL INT current.state, VAL BYTE letter)
     -- this function returns the action which would result on receiving
     -- letter in the state current.state.  the start.state is the default
     -- action
     INT i, final :
     BOOL running :
     VALOF
       SEQ
         i := 0
         running := TRUE
         final := start.state
         WHILE running
           IF
             i >= branch.ndx
               running := FALSE
             (branch[i][0] = current.state) AND (branch[i][1] = (INT letter))
               SEQ
                 running := FALSE
                 final := branch[i][2]
             TRUE
               i := i + 1
       RESULT final
:
```

```
PROC add.action(VAL INT current.state, letter, new.state, alarm)
  -- This procedure adds an action to the array branch.  Before adding the
  -- action, get.action is called to make sure the action doesn't already
  -- exist.
  INT state :
  BYTE byte.letter :
  SEQ
    IF
      error.set
        SKIP
      TRUE
        SEQ
          byte.letter := BYTE letter
          state := get.action(current.state, byte.letter)
          IF
            state = start.state        -- if this action is not found
              SEQ
                branch[branch.ndx][0] := current.state
                branch[branch.ndx][1] := letter
                branch[branch.ndx][2] := new.state
                branch[branch.ndx][3] := alarm
                branch.ndx := branch.ndx + 1
                IF
                  branch.ndx >= max.branch
                    SEQ
                      to.driver ! error; 19::"EXCEEDED BRANCH MAX"
                      error.set := TRUE
                  TRUE
                    SKIP
            TRUE
              SKIP
:
INT FUNCTION find.first.string(VAL INT str.ptr, str.len)
  -- This function returns the pointer to the first string in messages
  -- which contains the first str.len letters of str.ptr
  INT msg.ptr, indx, i :
  BOOL matching :
  [max.string]BYTE string :
  VALOF
    SEQ
      msg.ptr := message.count      -- invalid value
      indx := 0                     -- index into messages
      string := messages[str.ptr]
      WHILE (msg.ptr = message.count) AND (indx < message.count)
        SEQ
          matching := TRUE
          i := 0                    -- index into messages[indx]
          WHILE matching AND (i < str.len)
            IF
              messages[indx][i] = string[i]
                i := i + 1
              TRUE
                matching := FALSE
          IF
            matching
              msg.ptr := indx
            TRUE
              indx := indx + 1
    RESULT msg.ptr
:
INT FUNCTION find.state(VAL INT str.pointer, str.length)
  -- This function returns the state acheived when the first str.length
  -- characters of the string messages[str.pointer] have been read.
  INT return.val, msg.ptr, i :
  VALOF
    SEQ
      return.val := state.count + 1
      msg.ptr := find.first.string(str.pointer, str.length)
      i := first.state
      WHILE (return.val > state.count) AND (i < state.count)
        IF
          (state.data[i][0] = msg.ptr) AND (state.data[i][1] = str.length)
            return.val := i
          TRUE
            i := i + 1
    RESULT return.val
:
```

```
INT FUNCTION find.string(VAL []BYTE string, VAL INT str.length)
  -- This function returns the index of the message which equals string
  INT indx, msg.ptr, i :
  BOOL matching :
                branch.ndx := branch.ndx + 1
                IF
                  branch.ndx >= max.branch
                    SEQ
                      to.driver ! error; 19::"EXCEEDED BRANCH MAX"
                      error.set := TRUE
                    TRUE
                      SKIP
              TRUE
                SKIP
:
INT FUNCTION find.first.string(VAL INT str.ptr, str.len)
  -- This function returns the pointer to the first string in messages
  -- which contains the first str.len letters of str.ptr
  INT msg.ptr, indx, i :
  BOOL matching :
  [max.string]BYTE string :
  VALOF
    SEQ
      msg.ptr := message.count      -- invalid value
      indx := 0                     -- index into messages
      string := messages[str.ptr]
      WHILE (msg.ptr = message.count) AND (indx < message.count)
        SEQ
          matching := TRUE
          i := 0                    -- index into messages[indx]
          WHILE matching AND (i < str.len)
            IF
              messages[indx][i] = string[i]
                i := i + 1
              TRUE
                matching := FALSE
          IF
            matching
              msg.ptr := indx
            TRUE
              indx := indx + 1
    RESULT msg.ptr
:
INT FUNCTION find.state(VAL INT str.pointer, str.length)
  -- This function returns the state acheived when the first str.length
  -- characters of the string messages[str.pointer] have been read.
  INT return.val, msg.ptr, i :
  VALOF
    SEQ
      return.val := state.count + 1
      msg.ptr := find.first.string(str.pointer, str.length)
      i := first.state
      WHILE (return.val > state.count) AND (i < state.count)
        IF
          (state.data[i][0] = msg.ptr) AND (state.data[i][1] = str.length)
            return.val := i
          TRUE
            i := i + 1
    RESULT return.val
:
INT FUNCTION find.string(VAL []BYTE string, VAL INT str.length)
  -- This function returns the index of the message which equals string
  INT indx, msg.ptr, i :
  BOOL matching :
  VALOF
    SEQ
      msg.ptr := message.count      -- invalid value
      indx := 0                     -- index into messages
      WHILE (msg.ptr = message.count) AND (indx < message.count)
        IF
          message.len[indx] = str.length
            SEQ
              matching := TRUE
              i := 0                -- index into messages[indx]
              WHILE matching AND (i < str.length)
                IF
```

```
                      messages[indx][i] := string[i]
                        i := i + 1
                    TRUE
                      matching := FALSE
              IF
                matching AND (i = str.length)
                  msg.ptr := indx
                TRUE
                  indx := indx + 1
          TRUE
            indx := indx + 1
    RESULT msg.ptr
:
PROC combine.states(INT old.ptr, new.ptr)
  -- This procedure compares two strings and adds states to recognize
  -- the first string within the second string
  [max.string]BYTE old.string, newstring :
  INT old.length, new.length, alarm.num, count, int.letter, state, new.state :
  SEQ
    old.string := messages[old.ptr]
    newstring := messages[new.ptr]
    old.length := message.len[old.ptr]
    new.length := message.len[new.ptr]
    SEQ i = 1 FOR (old.length - 1)
      SEQ
        count := 0
        WHILE ((i + count) < old.length) AND
              (count < new.length)       AND
              (old.string[(i+count)] = newstring[count])
          count := count + 1
        IF
          (count > 0) AND ((i + count) < old.length)
            SEQ
              state := find.state(old.ptr, i + count)
              IF
                state > state.count
                  CAUSEERROR()
                TRUE
                  SKIP
              new.state := find.state(new.ptr, count + 1)
              IF
                new.state > state.count
                  SEQ
                    new.state := final.state
                    alarm.num := find.string(newstring, count + 1)
                TRUE
                  alarm.num := state.data[new.state][0]
              int.letter := INT newstring[count]
              add.action(state, int.letter, new.state, alarm.num)
          TRUE
            SKIP
:
PROC add.state(INT len, []BYTE str)
  -- This procedure adds all the necessary states to process a string
  INT current.state, state, message.ptr :
  SEQ
    messages[message.count] := str
    message.len[message.count] := len
    message.ptr := message.count
    message.count := message.count + 1
    IF
      message.count >= max.message
        SEQ
          to.driver ! error; 20::"EXCEEDED MESSAGE MAX"
          error.set := TRUE
      TRUE
        SKIP
    current.state := start.state
    SEQ i = 0 FOR len    -- for each letter in the string
      IF
        error.set
          SKIP
        i = (len - 1)    -- if this is the last letter
          add.action(current.state, INT str[i], final.state, message.ptr)
        TRUE
          SEQ
```

```
              state := get.action(current.state, str[i])
              IF
                state = start.state   -- if no action exists for this letter
                  SEQ
                    add.action(current.state, INT str[i], state.count, 0 )
                    state.data[state.count][0] := message.ptr
                    state.data[state.count][1] := i + 1  -- # of letters read
                    current.state := state.count   -- equals the state just adde
                    state.count := state.count + 1
                    IF
                      state.count >= max.state
                        SEQ
                          to.driver ! error; 18::"EXCEEDED STATE MAX"
                          error.set := TRUE
                      TRUE
                        SKIP
                TRUE
                  current.state := state   -- action already existed
      INT i :
      SEQ
        i := 0
        WHILE (i < message.ptr) AND (NOT error.set)
          SEQ
            combine.states(i, message.ptr)
            combine.states(message.ptr, i)
            i := i + 1
:

PROC send.branches()
  -- output branches sorted by state
  -- first send the number of messages, states, branches
  INT alarm :
  SEQ
    --to.driver ! element; good.messages; good.states; good.branches; 0
    SEQ state = 0 FOR good.states
      SEQ i = 0 FOR good.branches
        IF
          branch[i][0] = state
            SEQ
              IF
                branch[i][2] = final.state
                  alarm := branch[i][3]
                TRUE
                  alarm := good.messages
              to.driver ! element; branch[i][0]; branch[i][1]; branch[i][2]; a
          TRUE
            SKIP
:

INT str.length :
[max.string]BYTE string :
SEQ
  good.states, state.count := first.state, first.state
  good.messages, message.count := 0, 0
  good.branches, branch.ndx := 0, 0
  running := TRUE
  error.set := FALSE
  WHILE running
    SEQ
      from.driver ? CASE
        new.string; str.length::string
          IF
            error.set
              SKIP
            str.length = 0
              SKIP
            TRUE
              add.state(str.length, string)
        terminate
          running := FALSE
      IF
        error.set
          SKIP
        TRUE
          SEQ
            good.states := state.count
            good.branches := branch.ndx
```

```
              good.messages := message.count
    send.branches()
    to.driver ! terminated
:
#INCLUDE "states.inc"
--PROC recognize(CHAN OF PACKET from.driver, to.driver
PROC recognize(CHAN OF PACKET from.driver,
               CHAN OF [512]BYTE to.alarm, CHAN OF BYTE from.host)
  -- This procedure reads one character at a time, and transitions
  -- to a new state based on the value of the current state, and the character
  -- received.  If an alarm state is reached, the alarm number will be sent
  -- to the switcher.

VAL wildcard.char IS INT '?' :
  VAL buffer.size   IS 512 :

[512]BYTE alarm.data:
  INT alarm.ptr:

[max.branch][3]INT branch.data :   -- contains letter, next, alarm
  [max.state]INT state.indx :
  INT current.state :                -- points to the current state INT i :
  BOOL going :
  BYTE letter :

PROC read.branch.array()
    -- This proc reads branch data for each branch from the host and
    -- stores this data in branch.data
    --INT msg.count, state.count, branch.count :
    INT  state, letter, next, alarm :
    INT  state.num, i :
    BOOL running :
    SEQ
      state.num := 0
      state.indx[0] := 0
      i := 0
      running := TRUE
      WHILE running
        from.driver ? CASE
          element; state; letter; next; alarm
            SEQ
              branch.data[i][0] := letter
              branch.data[i][1] := next
              branch.data[i][2] := alarm
              WHILE state > state.num
                SEQ
                  state.indx[state.num + 1] := i   -- first branch for the state
                  state.num := state.num + 1
              i := i + 1
          terminated
            running := FALSE
      state.indx[state.num + 1] := i
  :
  PROC send.alarms(VAL [512]BYTE alarm.data)
    SEQ
      to.alarm ! alarm.data
      alarm.ptr := 1
  :
  -- this function returns the next state.  If the next state is the
  -- final state, the alarm number is also returned
  INT, INT FUNCTION get.next.state(VAL INT first, end, letter)
    INT newstate, temp.state, branch.ptr, alarm:
    VALOF
      SEQ
        newstate := start.state
        temp.state := start.state
        branch.ptr := first
        -- look first for action leading to final state
        -- if no action to final state, store match on letter input
        WHILE (newstate = start.state) AND (branch.ptr < end)
          SEQ
            IF
              branch.data[branch.ptr][0] = letter
                IF
```

```
                    branch.data[branch.ptr][1] = final.state
                      newstate := final.state
                   TRUE
                      temp.state := branch.data[branch.ptr][1]
              TRUE
                SKIP
            branch.ptr := branch.ptr + 1
       IF
          (newstate = start.state) AND (temp.state <> start.state)
            newstate := temp.state
          TRUE
            SKIP
       IF
          newstate = final.state
            alarm := branch.data[branch.ptr - 1][2]
          TRUE
            alarm := max.message
     RESULT newstate, alarm
:

PROC set.state(VAL BYTE letter)
  INT first.ptr, end.ptr, int.letter :
  INT newstate, alarm.number :
  SEQ
    first.ptr := state.indx[current.state]
    end.ptr := state.indx[current.state + 1]
    int.letter := INT letter
    newstate, alarm.number := get.next.state(first.ptr, end.ptr, wildcard.char
    -- if no action was found, look for action on wildcard character
    IF
      newstate = start.state
        SEQ
          newstate, alarm.number := get.next.state(first.ptr, end.ptr, int.let
      TRUE
        SKIP
    -- If the current.state is not the start state, and no match was
    -- found for the input letter, check branches from the start state
    IF
      (current.state <> start.state) AND (newstate = start.state)
        SEQ
          alarm.ptr := 1
          newstate, alarm.number := get.next.state(0, state.indx[1], int.let''
          IF
            newstate = start.state
              newstate, alarm.number := get.next.state(0, state.indx[1], -..
            TRUE
              SKIP
  INT newstate, temp.state, branch.ptr, alarm:
  VALOF
    SEQ
      newstate := start.state
      temp.state := start.state
      branch.ptr := first
      -- look first for action leading to final state
      -- if no action to final state, store match on letter input
      WHILE (newstate = start.state) AND (branch.ptr < end)
        SEQ
          IF
            branch.data[branch.ptr][0] = letter
              IF
                branch.data[branch.ptr][1] = final.state
                  newstate := final.state
                TRUE
                  temp.state := branch.data[branch.ptr][1]
            TRUE
              SKIP
          branch.ptr := branch.ptr + 1
     IF
        (newstate = start.state) AND (temp.state <> start.state)
          newstate := temp.state
        TRUE
          SKIP
     IF
        newstate = final.state
          alarm := branch.data[branch.ptr - 1][2]
        TRUE
          alarm := max.message
```

```
      RESULT newstate, alarm
  :

PROC set.state(VAL BYTE letter)
    INT first.ptr, end.ptr, int.letter :
    INT newstate, alarm.number :
    SEQ
      first.ptr := state.indx[current.state]
      end.ptr := state.indx[current.state + 1]
      int.letter := INT letter
      newstate, alarm.number := get.next.state(first.ptr, end.ptr, wildcard.char
      -- if no action was found, look for action on wildcard character
      IF
        newstate = start.state
          SEQ
            newstate, alarm.number := get.next.state(first.ptr, end.ptr, int.let
        TRUE
          SKIP
      -- If the current.state is not the start state, and no match was
      -- found for the input letter, check branches from the start state
      IF
        (current.state <> start.state) AND (newstate = start.state)
          SEQ
            alarm.ptr := 1
            newstate, alarm.number := get.next.state(0, state.indx[1], int.lette
            IF
              newstate = start.state
                newstate, alarm.number := get.next.state(0, state.indx[1], wildc
              TRUE
                SKIP
        TRUE
          SKIP
      current.state := newstate
      IF
        (current.state > start.state)
          SEQ
            alarm.ptr := alarm.ptr +1
            alarm.data[alarm.ptr]:= letter
        TRUE
          SKIP
      IF
        current.state = final.state
          SEQ
            alarm.data[1]:= BYTE (alarm.ptr - 1)
            alarm.data[511]:= BYTE alarm.number
            send.alarms(alarm.data)
            current.state := 0
        TRUE
          SKIP
      --to.driver ! debug2; current.state
  :

SEQ
    read.branch.array()
    current.state := start.state
    alarm.ptr := 1
    going := TRUE
    WHILE going
      SEQ
        from.host ? letter
        set.state(letter)
:
BOOL debugging, keyboarding :
INT err.len :
[512]BYTE alarm.data:
[513]BYTE data:
BOOL fatal.error :
[max.string]BYTE error.str :
CHAN OF [2]BYTE from.buffer:

-- read in search strings from a file
PROC read.strings.from.file1()
  CHAN OF BOOL reader.to.writer, writer.to.reader :
  INT length :
  [16]BYTE file.name :
  [max.string]BYTE string :
```

```
INT32 streamid :
BYTE result :
BOOL error.found, done, error.signal :
SEQ
  data[0]:= BYTE 0
  data[1]:= BYTE 1
  [data FROM 3 FOR 5]:= "TEST1"
  data[2]:= BYTE 5
  query.to.tss ! data
  query.from.tss ? data
  result := data[1]
  --so.open(fs, ts, [file.name FROM 0 FOR length], spt.text, spm.input, stream
  IF
    result = (BYTE 0)
      SEQ
        error.found := FALSE
        done := FALSE
        PAR
          WHILE NOT done
            PRI ALT
              from.states1 ? CASE
                error; err.len::error.str
                  SEQ
                    reader.to.writer ! TRUE
                    error.found := TRUE    -- flag to print messages
                    done := TRUE           -- flag to exit loop
                writer.to.reader ? done
                  SKIP
              TRUE & SKIP
                SKIP
          WHILE result = (BYTE 0)
            PRI ALT
              reader.to.writer ? error.signal
                result := BYTE 0
              TRUE & SKIP
                SEQ
                  data[0]:= BYTE 0
                  data[1]:= BYTE 2
                  query.to.tss ! data
                  query.from.tss ? data
                  result := data[1]
                  length := INT data[2]
                  --so.gets(fs, ts, streamid, length, string, result)
                  [string FROM 0 FOR length]:= [data FROM 3 FOR length]
                  IF
                    result = 0 (BYTE)
                      IF
                        string[0] <> 35 (BYTE)
                          SEQ
                            --so.write.string.nl(fs, ts, [string FROM 0 FOR le
                            to.states1 ! new.string; length :: string
                        TRUE
                          SKIP
                    TRUE
                      writer.to.reader ! TRUE
        data[0]:= BYTE 0
        data[1]:= BYTE 3
        query.to.tss ! data
        --so.close(fs, ts, streamid, result)
        --so.write.string.nl(fs,ts,"Read.strings.from.file1() .. Completed")
    TRUE
      SEQ
        CAUSEERROR()
        --so.write.string(fs, ts, "UNABLE TO OPEN FILE ")
        --so.write.string.nl(fs, ts, [file.name FROM 0 FOR length])
        fatal.error := TRUE
  PRI ALT
    from.states1 ? CASE
      error; err.len::error.str
        error.found := TRUE
    TRUE & SKIP
      SKIP
  to.states1 ! terminate
  IF
    error.found
      SEQ
```

```
                    --so.write.string.nl(fs, ts, [error.str FROM 0 FOR err.len])
                    --so.write.string.nl(fs, ts, "NOT ALL MESSAGES PROCESSED")
            TRUE
                SKIP
:

-- pass state information to recognizer
PROC init.recognizer1()
  INT state, letter, next, alarm.num :
  INT msg.count, state.count, branch.count, dummy :
  BOOL running :
  SEQ
    --so.write.string.nl(fs,ts,"Beginning INIT.RECOGNIZER1()")
    running := TRUE
    WHILE running
      SEQ
        from.states1 ? CASE
          element; state; letter; next; alarm.num
            --SEQ
              to.recognizer1 ! element; state; letter; next; alarm.num
                --so.write.string(fs, ts, "STATE: ")
                --so.write.int(fs, ts, state, 2)
                --so.write.string(fs, ts, ", ON ")
                --so.write.char(fs, ts, BYTE letter)
                --so.write.string(fs, ts, " TO STATE ")
                --so.write.int( fs, ts, next, 2)
                --IF
                  --next = final.state
                    --SEQ
                      --so.write.string(fs, ts, " SETTING ALARM ")
                      --so.write.int(fs, ts, alarm.num, 2)
                  --TRUE
                    --SKIP
                --so.write.nl(fs, ts)
          terminated
            SEQ
              to.recognizer1 ! terminated
              running := FALSE
    --so.write.string.nl(fs,ts,"INIT.RECOGNIZER2() .. Completed")
:

-- read in search strings from a file
PROC read.strings.from.file2()
  CHAN OF BOOL reader.to.writer, writer.to.reader :
  INT length :
  [16]BYTE file.name :
  [max.string]BYTE string :
  INT32 streamid :
  BYTE result :
  BOOL error.found, done, error.signal :
  SEQ
    data[0]:= BYTE 0
    data[1]:= BYTE 1
    [data FROM 3 FOR 5]:= "TEST2"
    data[2]:= BYTE 5
    query.to.tss ! data
    query.from.tss ? data
    result := data[1]
    --so.open(fs, ts, [file.name FROM 0 FOR length], spt.text, spm.input, stream
    IF
      result = 0 (BYTE)
        SEQ
          error.found := FALSE
          done := FALSE
          PAR
            WHILE NOT done
              PRI ALT
                from.states2 ? CASE
                  error; err.len::error.str
                    SEQ
                      reader.to.writer ! TRUE
                      error.found := TRUE     -- flag to print messages
                      done := TRUE            -- flag to exit loop
                writer.to.reader ? done
                  SKIP
```

```
                    TRUE & SKIP
                       SKIP
                WHILE result = (BYTE 0)
                   PRI ALT
                      reader.to.writer ? error.signal
                         result := BYTE 0
                      TRUE & SKIP
                         SEQ
                            data[0]:= BYTE 0
                            data[1]:= BYTE 2
                            query.to.tss ! data
                            query.from.tss ? data
                            result := data[1]
                            length := INT data[2]
                            [string FROM 0 FOR length]:= [data FROM 3 FOR length]
                            --so.gets(fs, ts, streamid, length, string, result)
                            IF
                               result = 0 (BYTE)
                                  IF
                                     string[0] <> 35 (BYTE)
                                        SEQ
                                           --so.write.string.nl(fs, ts, [string FROM 0 FOR le
                                           to.states2  ! new.string; length :: string
                                     TRUE
                                        SKIP
                               TRUE
                                  writer.to.reader ! TRUE
             data[0]:= BYTE 0
             data[1]:= BYTE 3
             query.to.tss ! data
             --so.close(fs, ts, streamid, result)
             --so.write.string.nl(fs,ts,"Read.strings.from.file1() .. Completed")
        TRUE
           SEQ
              CAUSEERROR()
              --so.write.string(fs, ts, "UNABLE TO OPEN FILE ")
              --so.write.string.nl(fs, ts, [file.name FROM 0 FOR length])
              fatal.error := TRUE
      PRI ALT
         from.states2 ? CASE
            error; err.len::error.str
               error.found := TRUE
            TRUE & SKIP
               SKIP
         to.states2 ! terminate
      IF
         error.found
            SEQ
               --so.write.string.nl(fs, ts, [error.str FROM 0 FOR err.len])
               --so.write.string.nl(fs, ts, "NOT ALL MESSAGES PROCESSED")
         TRUE
            SKIP
:

--  pass state information to recognizer
PROC init.recognizer2()
  INT  state, letter, next, alarm.num :
  INT  msg.count, state.count, branch.count, dummy :
  BOOL running :
  SEQ
     --so.write.string.nl(fs,ts,"Beginning INIT.RECOGNIZER2()")

running := TRUE
     WHILE running
        SEQ
           from.states2 ? CASE
              element; state; letter; next; alarm.num
                 --SEQ
                 to.recognizer2 ! element; state; letter; next; alarm.num
                    --so.write.string(fs, ts, "STATE: ")
                    --so.write.int(fs, ts, state, 2)
                    --so.write.string(fs, ts, ", ON ")
                    --so.write.char(fs, ts, BYTE letter)
                    --so.write.string(fs, ts, " TO STATE ")
                    --so.write.int( fs, ts, next, 2)
                    --IF
```

```
                    --next = final.state
                      --SEQ
                        --so.write.string(fs, ts, " SETTING ALARM ")
                        --so.write.int(fs, ts, alarm.num, 2)
                    --TRUE
                      --SKIP
                  --so.write.nl(fs, ts)
              terminated
                SEQ
                  to.recognizer2 ! terminated
                  running := FALSE
        --so.write.string.nl(fs,ts,"INIT.RECOGNIZER2() .. Completed")
:

-- read in search strings from a file
PROC read.strings.from.file3()
  CHAN OF BOOL reader.to.writer, writer.to.reader :
  INT length :
  [16]BYTE file.name :
  [max.string]BYTE string :
  INT32 streamid :
  BYTE result :
  BOOL error.found, done, error.signal :
  SEQ
    data[0]:= BYTE 0
    data[1]:= BYTE 1
    [data FROM 3 FOR 5]:= "TEST3"
    data[2]:= BYTE 5
    query.to.tss ! data
    query.from.tss ? data
    result := data[1]
    --so.open(fs, ts, [file.name FROM 0 FOR length], spt.text, spm.input, stream
    IF
      result = 0 (BYTE)
        SEQ
          error.found := FALSE
          done := FALSE
          PAR
            WHILE NOT done
              PRI ALT
                from.states3 ? CASE
                  error; err.len::error.str
                    SEQ
                      reader.to.writer ! TRUE
                      error.found := TRUE      -- flag to print messages
                      done := TRUE             -- flag to exit loop
                writer.to.reader ? done
                  SKIP
                TRUE & SKIP
                  SKIP
            WHILE result = (BYTE 0)
              PRI ALT
                reader.to.writer ? error.signal
                  result := BYTE 0
                TRUE & SKIP
                  SEQ
                    data[0]:= BYTE 0
                    data[1]:= BYTE 2
                    query.to.tss ! data
                    query.from.tss ? data
                    result := data[1]
                    length := INT data[2]
                    [string FROM 0 FOR length]:= [data FROM 3 FOR length]
                    --so.gets(fs, ts, streamid, length, string, result)
                    IF
                      result = 0 (BYTE)
                        IF
                          string[0] <> 35 (BYTE)
                            SEQ
                              --so.write.string.nl(fs, ts, [string FROM 0 FOR le
                              to.states3 ! new.string; length :: string
                          TRUE
                            SKIP
                      TRUE
                        writer.to.reader ! TRUE
```

```
                    data[0] := BYTE 0
                    data[1] := BYTE 3
                    query.to.tss ! data
                    ----so.close(fs, ts, streamid, result)
                    --so.write.string.nl(fs,ts,"Read.strings.from.file1() .. Completed")
            TRUE
              SEQ
                CAUSEERROR()
                --so.write.string(fs, ts, "UNABLE TO OPEN FILE ")
                --so.write.string.nl(fs, ts, [file.name FROM 0 FOR length])
                fatal.error := TRUE
          PRI ALT
            from.states3 ? CASE
              error; err.len::error.str
                error.found := TRUE
            TRUE & SKIP
              SKIP
          to.states3 ! terminate
          IF
            error.found
              SEQ
                --so.write.string.nl(fs, ts, [error.str FROM 0 FOR err.len])
                --so.write.string.nl(fs, ts, "NOT ALL MESSAGES PROCESSED")
            TRUE
              SKIP
:

--   pass state information to recognizer
PROC init.recognizer3()
    INT  state, letter, next, alarm.num :
    INT  msg.count, state.count, branch.count, dummy :
    BOOL running :
    SEQ
      --so.write.string.nl(fs,ts,"Beginning INIT.RECOGNIZER3()")
      running := TRUE
      WHILE running
        SEQ
          from.states3 ? CASE
            element; state; letter; next; alarm.num
              --SEQ
                to.recognizer3 ! element; state; letter; next; alarm.num
                  --so.write.string(fs, ts, "STATE: ")
                  --so.write.int(fs, ts, state, 2)
                  --so.write.string(fs, ts, ", ON  ")
                  --so.write.char(fs, ts, BYTE letter)
                  --so.write.string(fs, ts, "  TO STATE  ")
                  --so.write.int( fs, ts, next, 2)
                  --IF
                    --next = final.state
                      --SEQ
                        --so.write.string(fs, ts, "  SETTING ALARM  ")
                        --so.write.int(fs, ts, alarm.num, 2)
                    --TRUE
                      --SKIP
                  --so.write.nl(fs, ts)
            terminated
              SEQ
                to.recognizer3 ! terminated
                running := FALSE
      --so.write.string.nl(fs,ts,"INIT.RECOGNIZER3() .. Completed")
:
```

A.4.  BUFFER BOARD - FIGURE 12

Bubble 1

```
PROC buffer.board(CHAN OF [8]BYTE  up.channel.in,down.channel.out,
                                   up.channel.out,down.channel.in,
                  BYTE Board.ID)

#INCLUDE "ttgscon.inc"
  #INCLUDE "linkaddr.inc"
  VAL buffer.alarms IS 6:
```

```
CHAN OF ANY Vidlink.in, Vidlink.out:
PLACE Vidlink.in AT link3.in:
PLACE Vidlink.out AT link3.out:
PROC data.manager()
  [buffer.alarms][num.frames][481][512]BYTE frame.store:
  INT buffer.pointer:
  SEQ
    buffer.pointer := 0
    WHILE TRUE
      INT mode,alarm.num:
      ALT
        Vidlink.in ? mode
          SEQ
            IF
              mode = storage
                SEQ
                  IF
                    buffer.pointer := (buffer.alarms - 1)
                      CAUSEERROR()
                    TRUE
                      SKIP
                  SEQ loop = 0 FOR num.frames
                    Vidlink.in ? frame.store[buffer.pointer][loop]
                  buffer.pointer := buffer.pointer + 1
              mode = retrieval
                SEQ
                  SEQ loop = 0 FOR num.frames
                    Vidlink.out ! frame.store[0][loop]
                  buffer.pointer := buffer.pointer + 1
                  SEQ loop = 0  FOR buffer.pointer
                    frame.store[loop] := frame.store[loop+1]
            TRUE
              SKIP

:
```

Bubble 2

```
PROC bus(CHAN OF [8]BYTE  down.channel.out,up.channel.out,
                          down.channel.in ,up.channel.in,BYTE Board.ID,
         CHAN OF ANY time.request,time.reply,CHAN OF INT send.time.reply,
         CHAN OF BYTE send.vidlink.control.request,
         send.vidlink.off.reply,send.vidlink.on.reply,
         send.vidlink.on.request,send.vidlink.off.request,send.time.request)
#INCLUDE "protocol.inc"
#INCLUDE "bus.inc"
#INCLUDE "ttgscon.inc"
VAL [8]BYTE dummy.packet IS [BYTE 0,BYTE 0,BYTE 0,BYTE 0,BYTE 0,BYTE 0,BYTE 0,
BYTE any:
CHAN OF [8]BYTE down.channel.out.1,down.channel.out.2,down.channel.out.3,
                down.channel.out.4,down.channel.out.5,down.channel.out.6,
                down.channel.out.7,down.channel.out.8:
CHAN OF [8]BYTE up.channel.out.1,up.channel.out.2,up.channel.out.3,
                up.channel.out.4,up.channel.out.5,up.channel.out.6,
                up.channel.out.7,up.channel.out.8:
SEQ
  PAR
    WHILE TRUE
      [8]BYTE transfer.packet:
      SEQ
        ALT
          down.channel.out.1 ? transfer.packet
            down.channel.out ! transfer.packet
          down.channel.out.2 ? transfer.packet
            down.channel.out ! transfer.packet
          down.channel.out.3 ? transfer.packet
            down.channel.out ! transfer.packet
          down.channel.out.4 ? transfer.packet
            down.channel.out ! transfer.packet
          down.channel.out.5 ? transfer.packet
            down.channel.out ! transfer.packet
          down.channel.out.6 ? transfer.packet
            down.channel.out ! transfer.packet
          down.channel.out.7 ? transfer.packet
            down.channel.out ! transfer.packet
          down.channel.out.8 ? transfer.packet
```

```
                  down.channel.out ! transfer.packet

WHILE TRUE
  [8]BYTE transfer.packet:
  SEQ
    ALT
      up.channel.out.1    ? transfer.packet
        up.channel.out    ! transfer.packet
      up.channel.out.2    ? transfer.packet
        up.channel.out    ! transfer.packet
      up.channel.out.3    ? transfer.packet
        up.channel.out    ! transfer.packet
      up.channel.out.4    ? transfer.packet
        up.channel.out    ! transfer.packet
      up.channel.out.5    ? transfer.packet
        up.channel.out    ! transfer.packet
      up.channel.out.6    ? transfer.packet
        up.channel.out    ! transfer.packet
      up.channel.out.7    ? transfer.packet
        up.channel.out    ! transfer.packet
      up.channel.out.8    ? transfer.packet
        up.channel.out    ! transfer.packet

[8]BYTE send.packet:
[8]BYTE pop.packet:
BOOL ok:
WHILE TRUE
  SEQ
    ok := FALSE
    ALT
      up.channel.in ? pop.packet
        IF
          pop.packet[Dest.board] <> Board.ID
            up.channel.out.1 ! pop.packet
          TRUE
            ok := TRUE
      down.channel.in ? pop.packet
        IF
          pop.packet[Dest.board] <> Board.ID
            down.channel.out.1 ! pop.packet
          TRUE
            ok := TRUE
    IF
      ok
        CASE pop.packet[Command]
          send..time
            INT intrnl.time,intrnl.utc.time:
            SEQ
              send.packet := dummy.packet
              time.request ! BYTE 0
              time.reply ? intrnl.time; intrnl.utc.time
              send.packet[Dest.board] := pop.packet[Source.board]
              send.packet[Source.board] := Board.ID
              send.packet[Command] := send..time..reply
              [2]INT int.send.packet RETYPES send.packet:
              SEQ
                int.send.packet[1] := intrnl.time
              up.channel.out.2 ! send.packet
          send..time..reply
            [2]INT int.send.packet RETYPES pop.packet:
            SEQ
              send.time.reply ! int.send.packet[1]
          send..vidlink..request
            BOOL ok:
            SEQ
              send.vidlink.control.request ! pop.packet[Param1]
              send.packet := dummy.packet
              send.packet[Dest.board] := pop.packet[Source.board]
              send.packet[Source.board] := Board.ID
              IF
                pop.packet[Param1] = Vidlink.OFF
                  send.packet[Command] := send..vidlink..disconnect..ok
                pop.packet[Param1] = Vidlink.ON
                  send.packet[Command] := send..vidlink..connect..ok
                TRUE
                  STOP
```

```
                    down.channel.out.6 ! send.packet
                send..vidlink..disconnect..ok
                  send.vidlink.off.reply ! pop.packet[Source.board]
                send..vidlink..connect..ok
                  send.vidlink.on.reply !  pop.packet[Source.board]
                NUL..command
                  SKIP
                ELSE -- TRUE
                  CAUSEERROR()
            TRUE
              SKIP WHILE TRUE
          [8]BYTE send.packet:
          BYTE any:
          BYTE vidlink.end:
          INT  key:
          SEQ
            send.packet := dummy.packet
            ALT
              send.time.request ? any
                SEQ
                  send.packet[Dest.board]   := BYTE 0
                  send.packet[Source.board] := Board.ID
                  send.packet[Command]      := send..time
                  down.channel.out.3 ! send.packet
              send.vidlink.on.request ? vidlink.end
                SEQ
                  send.packet[Dest.board]   := vidlink.end
                  send.packet[Source.board] := Board.ID
                  send.packet[Command]      := send..vidlink..request
                  send.packet[Param1]       := Vidlink.ON
                  up.channel.out.4 ! send.packet
              send.vidlink.off.request ? vidlink.end
                SEQ
                  send.packet[Dest.board]   := vidlink.end
                  send.packet[Source.board] := Board.ID
                  send.packet[Command]      := send..vidlink..request
                  send.packet[Param1]       := Vidlink.OFF
                  up.channel.out.5 ! send.packet
:
```

Bubble 3

```
PROC vidlink.control(CHAN OF BYTE send.vidlink.control.request)
  BYTE vidlink.state:
  INT control.word:
  INT status.port:
  PLACE status.port AT #20000020:
  PORT OF INT control.port:
  PLACE control.port AT #2000003C:
  SEQ
    control.word := #00400000
    control.port ! control.word
    WHILE TRUE
      SEQ
        send.vidlink.control.request ? vidlink.state
        IF
          vidlink.state = Vidlink.ON
            control.port ! #00000000
          vidlink.state = Vidlink.OFF
            control.port ! #00400000
          TRUE
            CAUSEERROR()
:
```

Bubble 4

```
CHAN OF [6]BYTE send.packet.request:
CHAN OF BYTE server.packet.request:
CHAN OF BYTE send.time.request:
```

```
CHAN OF INT send.time.reply:
CHAN OF ANY time.request, time.reply:
CHAN OF BYTE send.vidlink.on.reply,send.vidlink.off.reply:
CHAN OF BYTE send.vidlink.on.request,send.vidlink.off.request:
CHAN OF BYTE send.vidlink.control.request:
CHAN OF BYTE vidlink.control.state.request,vidlink.control.state.reply:
CHAN OF ANY display.access.request,display.access.clear:
CHAN OF ANY display.access.frame:
CHAN OF BOOL display.access.reply,fg.access.reply:
CHAN OF ANY fg.access.request,fg.access.clear:
CHAN OF ANY display.frame.request,display.frame.ready:
#USE "bus.c8h"
PAR
   bus(down.channel.out,up.channel.out,down.channel.in ,up.channel.in,
       Board.ID,time.request,time.reply,send.time.reply,
       send.vidlink.control.request,
       send.vidlink.off.reply,send.vidlink.on.reply,
       send.vidlink.on.request,send.vidlink.off.request,send.time.request)
   data.manager()
   vidlink.control(send.vidlink.control.request)
:
```

It is to be understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Therefore, it should be appreciated that the invention is not limited to the disclosed embodiments but may be practiced within the full scope of the appended claims.

I claim:

1. A system for retrofitting to an existing security system, said existing security system including a plurality of sensors, a plurality of video cameras each monitoring a particular zone of interest and computing means for detecting an alarm condition in zones monitored by said plurality of video cameras based on information monitored by said sensors or said plurality of video cameras, the retrofitting system comprising:
   control means for connection with said computing means of said existing security system and providing functional control signals for said retrofitting system;
   a plurality of frame grabbing circuit means, each of said frame grabbing circuit means being connected to a predetermined number of said plurality of video cameras and including digitizing means for digitizing frames of video images from any one of the corresponding predetermined number of video cameras;
   a plurality of video monitors;
   a plurality of display circuit means, each of said display circuit means being connected to a respective one of said plurality of video monitors and including graphics controller means;
   a video link for providing at one time two way communication between any two of the control means, display circuit means and frame grabbing circuit means under control of said functional control signals of said control means; and
   a control link connecting between said control means and said plurality of frame grabbing circuit means in a cascaded configuration, and between said control means and said plurality of display circuit means in a cascaded configuration.

2. The system of claim 1, wherein each of said plurality of frame grabbing circuit means comprises a plurality of processor expansion sites for receiving first additional processing modules interactive with the associated frame grabbing circuit means.

3. The system of claim 2, wherein said first additional processing modules comprise motion detection means.

4. The system of claim 1, wherein each of said plurality of display circuit means comprises a plurality of processor expansion sites for receiving second additional processing modules interactive with the associated display circuit means.

5. The system of claim 1, wherein said second additional processing modules comprise change detection means.

6. The system of claim 1, wherein said control means comprises a plurality of processor expansion sites for receiving optional processing modules interactive with the control means.

7. The system of claim 1, wherein each of said frame grabbing circuit means comprises switch means for connecting one of said predetermined number of video cameras to said digitizing means.

8. The system of claim 1, wherein said control means is responsive to alarm conditions detected by said plurality of alarm sensors of said existing security system, said control means activating a particular display circuit means to interact with a particular frame grabbing circuit means to display images in the zone in which the alarm conditions occur.

9. The system of claim 1, and further comprising interface means connected between said computing means of said existing security system and the control means.

10. The system of claim 1, and further comprising an alarm sequence buffer board connected to each display board for storing alarm sequence images.

11. The system of claim 1, wherein each of said frame grabbing circuit means comprises frame grabbing parallel processing means for controlling said digitizing means.

12. The system of claim 1, wherein said control means comprises controller parallel processing means.

13. The system of claim 1, wherein each of said display circuit means comprises display circuit parallel processing means for controlling said graphics controller means.

14. A system for monitoring secured areas comprising:
   a security system including a plurality of sensors, a plurality of video cameras each monitoring a particular zone of interest and computing means for detecting an alarm condition in zones monitored by said plurality of video cameras based on information monitored by said sensors or said plurality of video cameras:

control means for connection with said computing means of said existing security system and providing functional control signals;

a plurality of frame grabbing circuit means, each of said frame grabbing circuit means being connected to a predetermined number of said plurality of video cameras and including digitizing means for digitizing frames of video images from any one of the corresponding predetermined number of video cameras;

a plurality of video monitors;

a plurality of display circuit means, each of said display circuit means being connected to a respective one of said plurality of video monitors and including graphics controller means;

a video link for providing at one time two way communication between any two of the control means, display circuit means and frame grabbing circuit means under control of said functional control signals of said control means under control of said functional control signals of said control means; and a control link connecting between said control means and said plurality of frame grabbing circuit means in a cascaded configuration, and between said control means and said plurality of display circuit means in a cascaded configuration.

15. The system of claim 14, wherein each of said plurality of frame grabbing circuit means comprises a plurality of processor expansion sites for receiving first additional processing modules interactive with the associated frame grabbing circuit means.

16. The system of claim 15, wherein said first additional processing modules comprise motion detection means.

17. The system of claim 14, wherein each of said plurality of display circuit means comprises a plurality of processor expansion sites for receiving second additional processing modules interactive with the associated display circuit means.

18. The system of claim 14, wherein said control means comprises a plurality of processor expansion sites for receiving optional processing modules interactive with the control means.

19. The system of claim 14, wherein each of said frame grabbing circuit means comprises switch means for connecting one of said predetermined number of video cameras to said digitizing means.

20. The system of claim 14, wherein said control means is responsive to alarm conditions detected by said plurality of alarm sensors of said existing security, said control means activating a particular display circuit means to interact with a particular frame grabbing circuit means to display images in the zone in which the alarm conditions occur.

21. The system of claim 14, and further comprising an alarm sequence buffer board connected to each display board for storing alarm sequence images.

22. The system of claim 14, wherein each of said frame grabbing circuit means comprises frame grabbing parallel processing means for controlling said digitizing means.

23. The system of claim 14, wherein said control means comprises controller parallel processing means.

24. The system of claim 14, wherein each of said display circuit means comprises display circuit parallel processing means for controlling said graphics controller means.

25. A method for providing surveillance to secured areas by retrofitting to an existing security system, said existing security system including a plurality of sensors, a plurality of video cameras each monitoring a particular zone of interest and computing means for detecting an alarm condition in zones monitored by said plurality of video cameras based on information monitored by said sensors or said plurality of video cameras, the method comprising the steps of:

connecting a control means with said computing means of said existing security system and providing functional control signals for said retrofitting system;

connecting a plurality of frame grabbing circuit means, each to a predetermined number of said plurality of video cameras and including digitizing means for digitizing frames of video images from any one of the corresponding predetermined number of video cameras;

providing a plurality of video monitors;

connecting a plurality of display circuit means, each of said display circuit means being connected to a respective one of said plurality of video monitors and including graphics controller means;

linking at one time for two way communication of image data between, any two of the control means, display circuit means and frame grabbing circuit means under control of said functional control signals of said control means; and linking said control means and said plurality of frame grabbing circuit means in a cascaded configuration, and said control means and said plurality of display circuit means in a cascaded configuration for communication of functional control signals of said control means.

26. The method of claim 25, and further comprising the step of controlling display of alarm sequences via an operator controller keyboard interfaced with said control means.

27. The method of claim 25, and further comprising the steps of responding to alarm conditions detected by said plurality of alarm sensors of said existing security system through intreaction with said control means, and activating a particular display circuit means to interact with a particular frame grabbing circuit means to display images in the zone in which the alarm conditions occur.

* * * * *